United States Patent
Hinrichs

[19]

[11] Patent Number: 6,164,404

[45] Date of Patent: Dec. 26, 2000

[54] RADIAL TORQUE DRIVE SYSTEM

[76] Inventor: Dennis C. Hinrichs, 5 Harbor Point Dr. #205, Mill Valley, Calif. 94941

[21] Appl. No.: 09/097,989

[22] Filed: Jun. 16, 1998

Related U.S. Application Data

[60] Provisional application No. 60/050,988, Jun. 21, 1997.

[51] Int. Cl.[7] ................................................. B60K 17/10
[52] U.S. Cl. ............................................ 180/367; 180/337
[58] Field of Search ................................... 180/218, 230, 180/307, 308, 337, 367; 280/200, 201, 210, 216, 259; 60/491; 417/379, 380, 381, 383, 390, 405–407

[56] References Cited

U.S. PATENT DOCUMENTS

| | | |
|---|---|---|
| 1,061,206 | 5/1913 | Tesla . |
| 3,941,075 | 3/1976 | Rupenian ..................................... 115/2 |
| 4,568,097 | 2/1986 | Farooq .................................... 280/116 |

FOREIGN PATENT DOCUMENTS

| | | |
|---|---|---|
| 714 638 | 11/1931 | France . |
| 976 447 | 3/1951 | France . |
| 2 477 659 | 9/1981 | France . |

*Primary Examiner*—Matthew C. Graham
*Assistant Examiner*—C. T. Bartz
*Attorney, Agent, or Firm*—Johnson & Stainbrook, LLP; Craig M. Stainbrook; Larry D. Johnson

[57] ABSTRACT

A torque converting linkage (10) comprising two turbines, an impeller and a reactor (12 & 14), which rotate on shafts (16 & 18) within separate fluid-filled housings (20 & 22) is disclosed. Each housing (20 & 22) includes an outlet port and an inlet port (24 & 30, 28 & 26) which are coupled by two conduits (32 & 34). An external torque applied to shaft (16) turns the impeller turbine (12). Vanes (38) on the impeller turbine (12) force the fluid (36) out of the impeller housing (20) through a first conduit (34) into the reactor housing (22). The fluid (36) entering the reactor housing (22) acts on the vanes (38) of the reactor turbine (14), causing it to rotate and to transfer rotational energy to shaft (18).

56 Claims, 44 Drawing Sheets

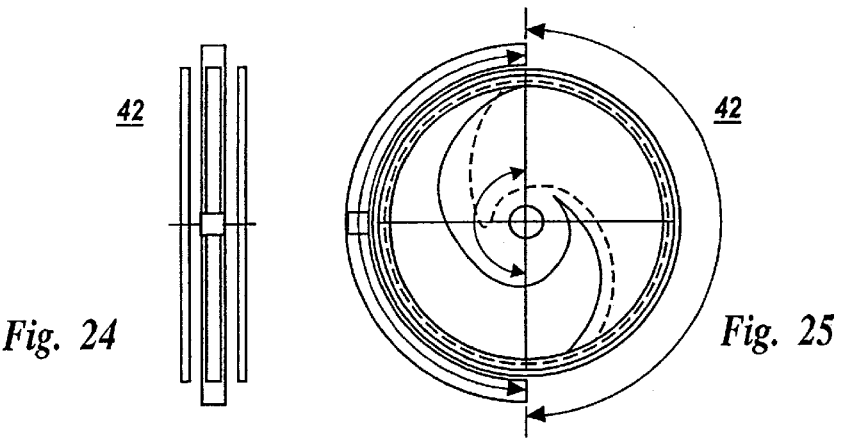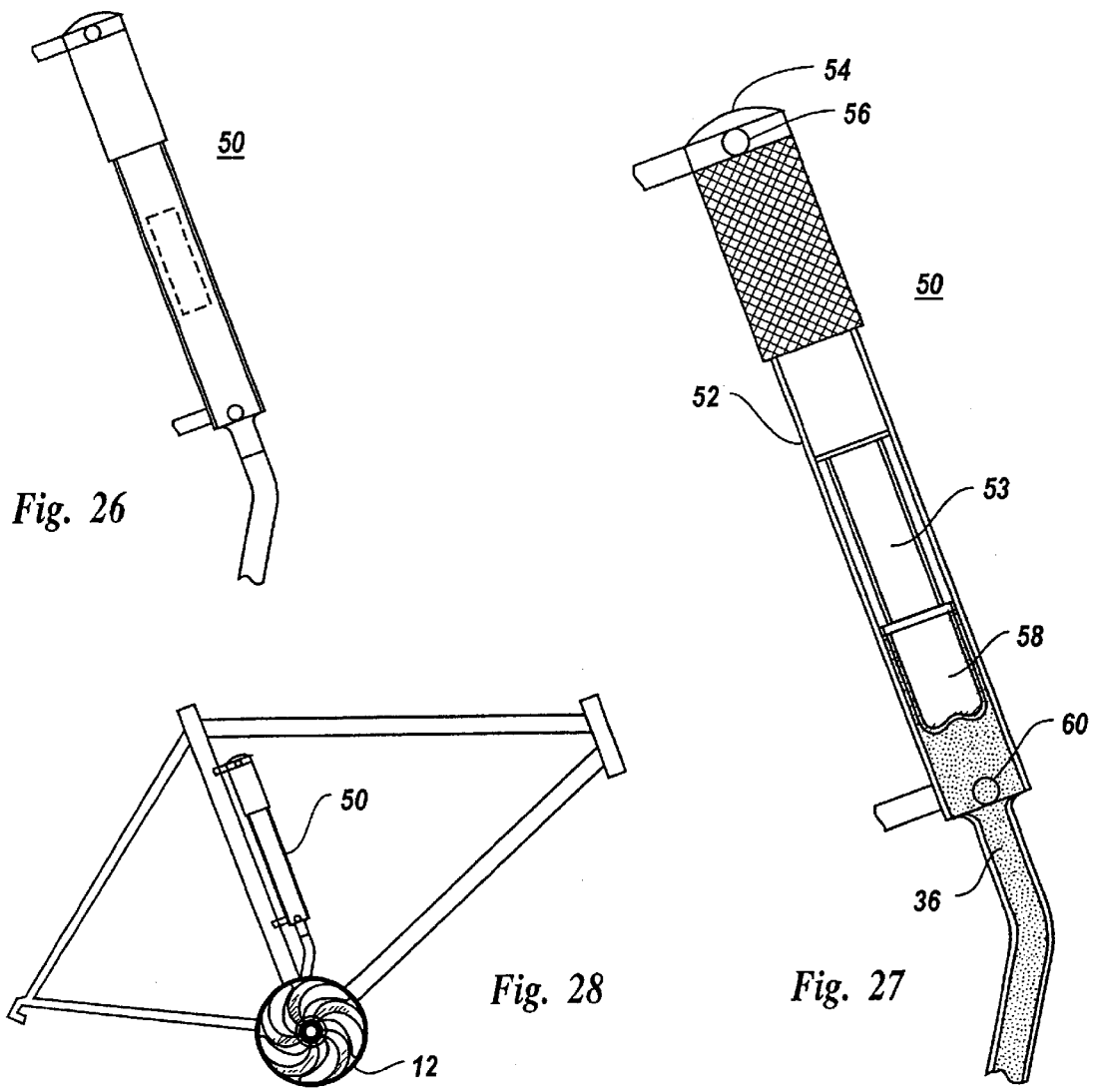

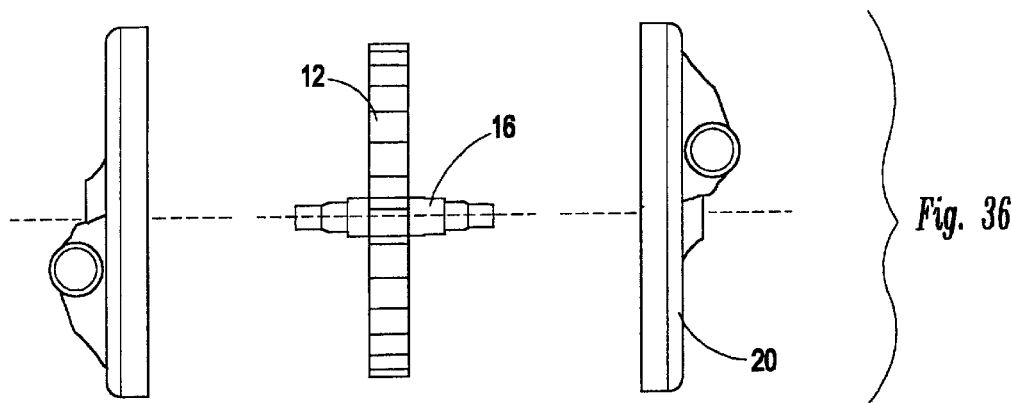
Fig. 36
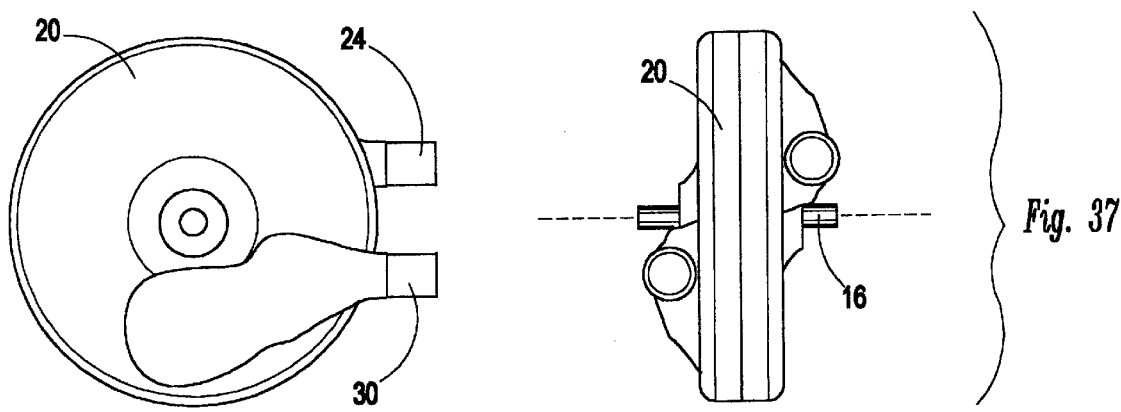
Fig. 37
Fig. 38A
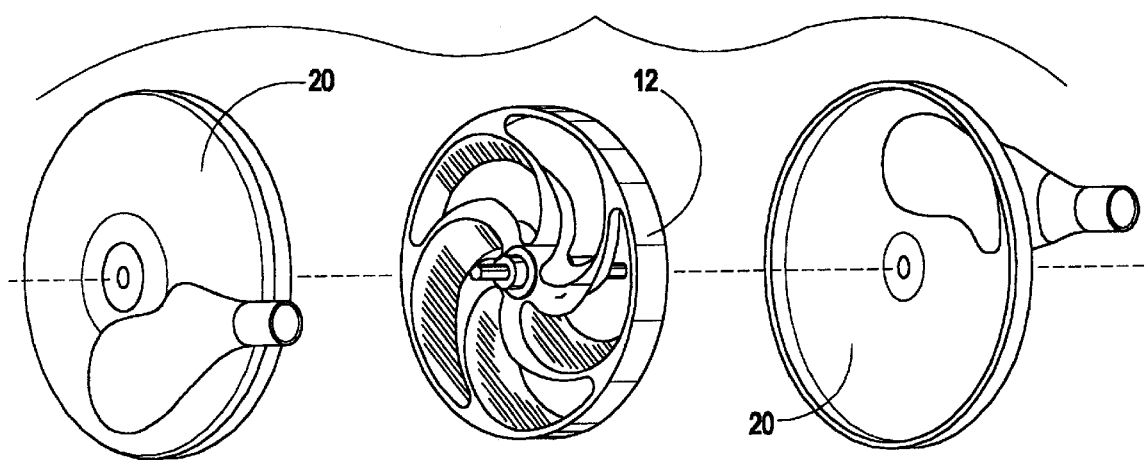

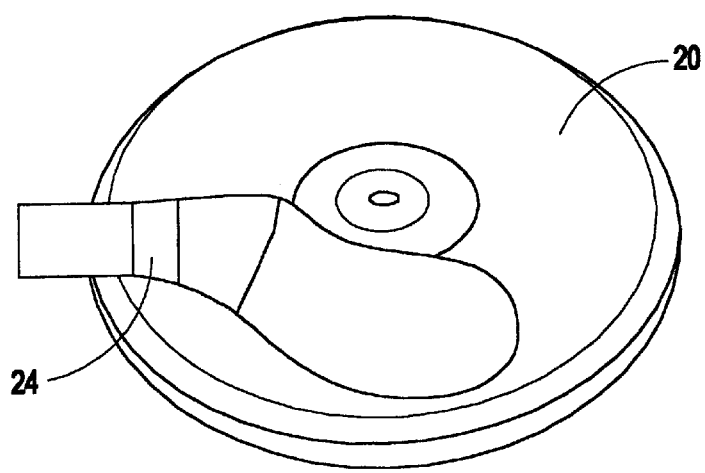
Fig. 39
Fig. 40
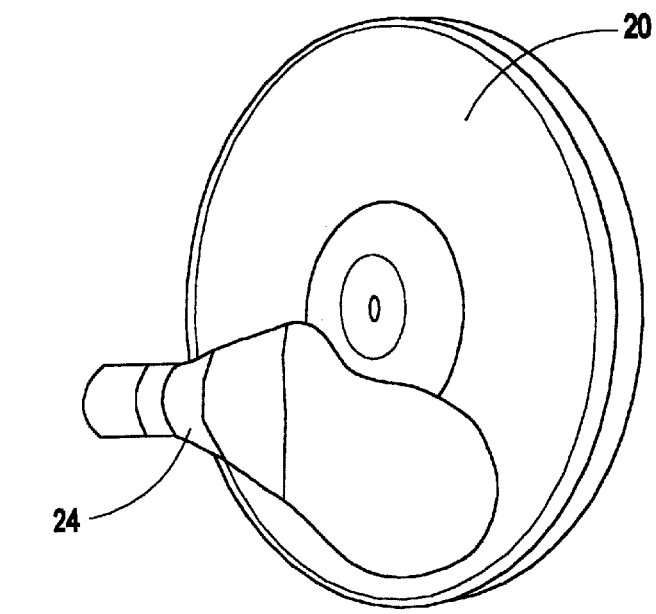
Fig. 41

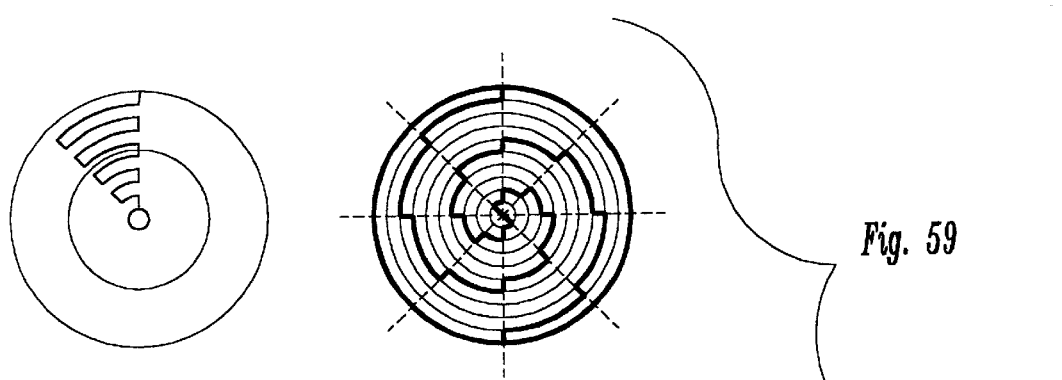
Fig. 59
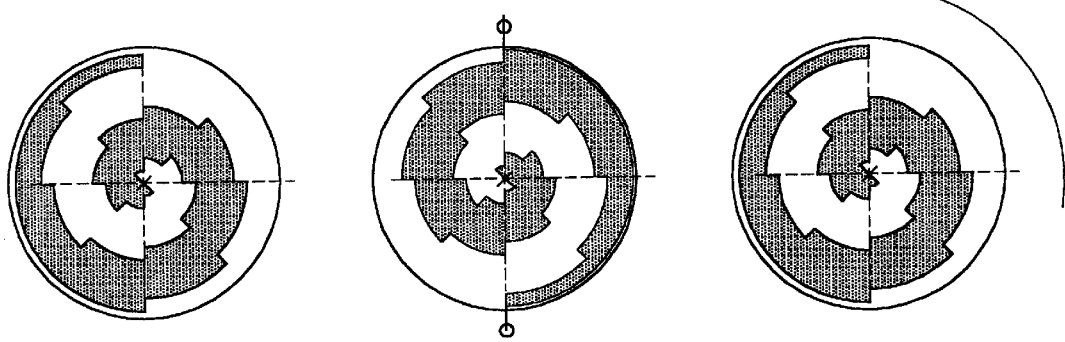
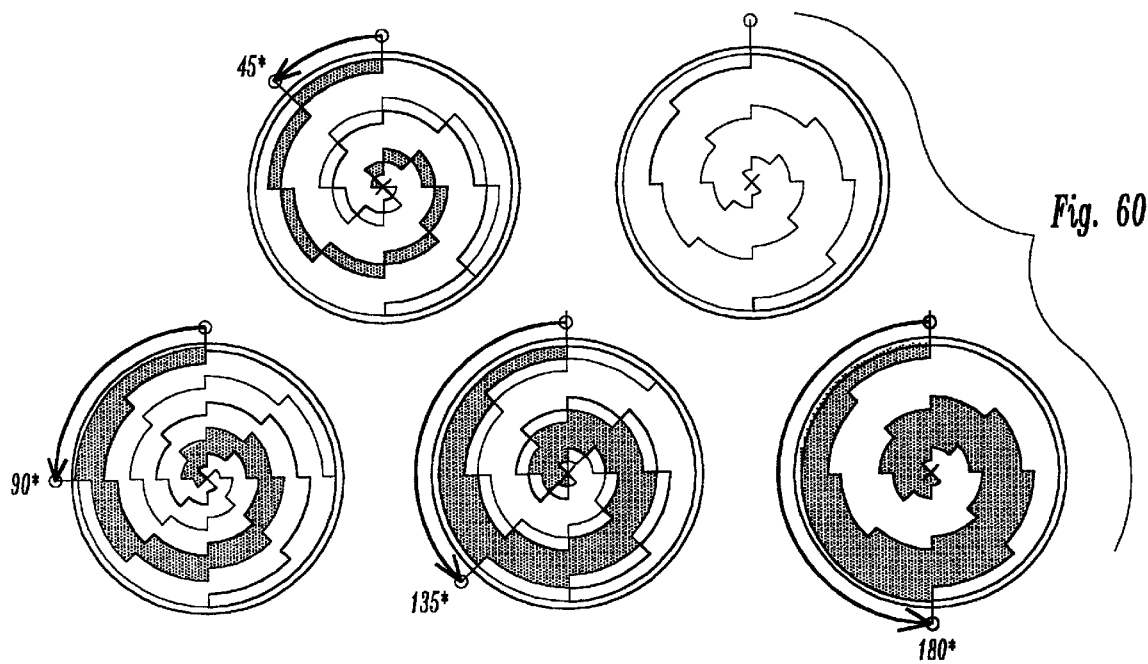
Fig. 60

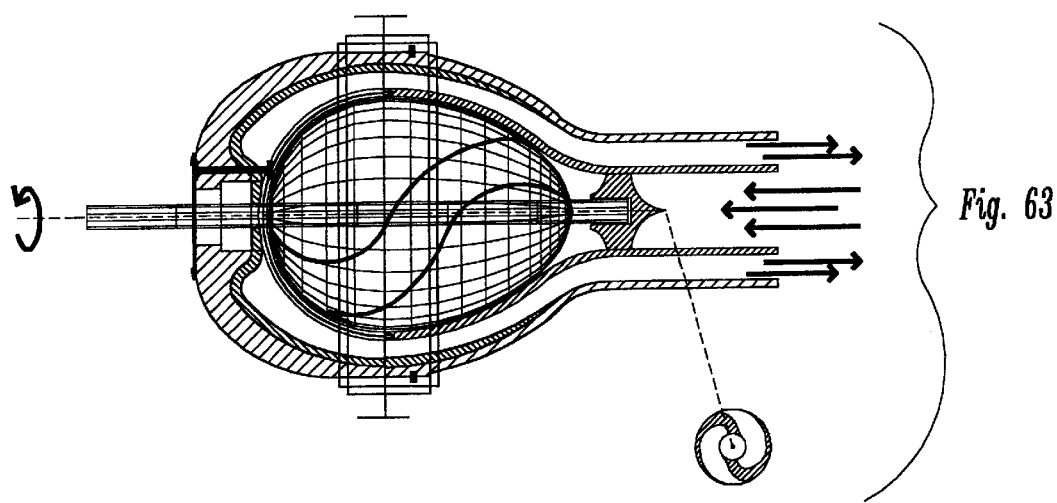
Fig. 63
Fig. 64
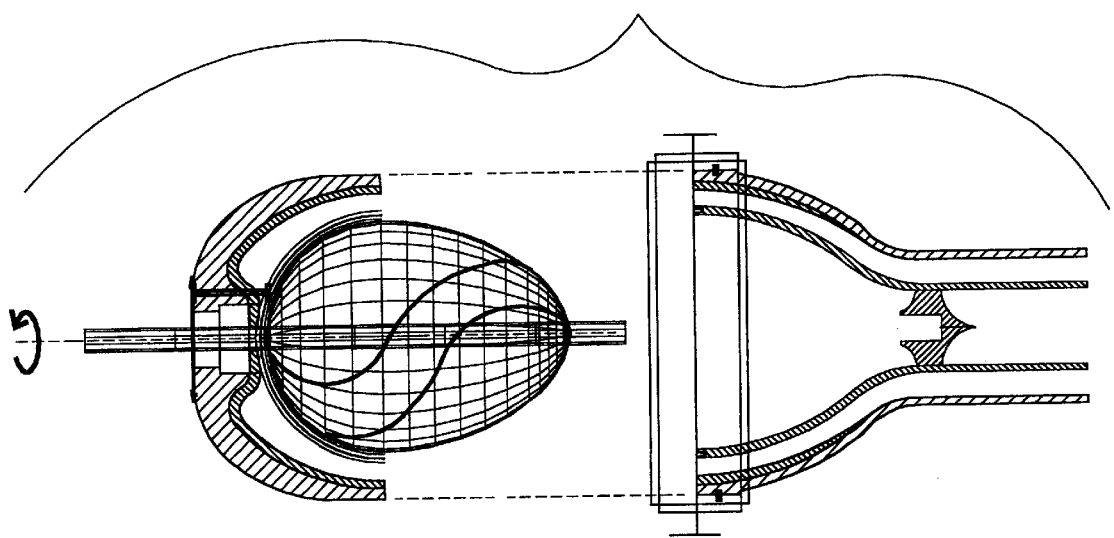

RADIAL TORQUE DRIVE SYSTEM

CROSS REFERENCE TO RELATED PATENT APPLICATIONS & CLAIMS FOR PRIORITY

The present Patent Application is a Continuation-in-Part Application based on the following commonly-owned U.S. Provisional Patent Application:

U.S. Provisional Patent Application No. 60/050,988, filed on Jun. 21, 1997 and entitled Radial Torque Drive System.

The Applicant hereby claims the benefit of priority of all filing dates for any and all subject matter that is commonly disclosed in this previous Provisional Patent Application.

FEDERALLY SPONSORED RESEARCH OR DEVELOPMENT

Not Applicable.

FIELD OF THE INVENTION

The present invention pertains to fluid drive systems. More particularly, one embodiment of the present invention concerns a drive system for bicycles.

BACKGROUND OF THE INVENTION

Previous transmissions have utilized a wide variety of devices to transfer rotary power from one location to another. Conventional automobile transmissions employ a complex combination of gear and fluid drive systems. Conventional bicycles usually depend upon rotating sprockets, chains and derailleurs. Several examples of attempts to provide improved mechanical transmissions are described below.

In U.S. Pat. No. 3,850,448, issued on Nov. 26, 1974, Stewart describes a vehicle that can be bodily powered without the aid of a combustion motor.

In U.S. Pat. No. 4,313,714, issued on Feb. 2, 1982, Kubeczka discloses a high pressure radial pump for delivering a stream of liquid at high velocity for cleaning of various surfaces.

In U.S. Pat. No. 4,546,990, issued on Oct. 15, 1985, Harriger describes a hydraulic drive system having a variable speed drive mechanism.

In U.S. Pat. No. 4,684,143, issued on Aug. 4, 1987, Sato discloses a stepless speed change device.

In U.S. Pat. No. 4,688,815, Smith discloses a manually powered hydraulically driven bicycle.

In U.S. Pat. No. 4,975,025, issued Dec. 4, 1990, Yamamura et al. disclose a hydraulic radial piston pump having a set of pistons arranged radially around the rotary shaft for sequential reciprocating motion for suction and delivery of working oil.

U.S. Pat. No. 5,112,111, issued May 12, 1992 to Addington Resources, Inc. describes an apparatus for mining aggregate material from a seam.

In U.S. Pat. No. 5,116,070, issued May 26, 1992, Becoat describes a dual wheel driven bicycle which uses an elongate flexible shaft or cable to provide rotational movement to the front wheel.

U.S. Pat. No. 5,230,519, issued on Jul. 27, 1993 to Honda Motor Co., Ltd. discloses a hydraulically operated power transmission apparatus.

In U.S. Pat. No. 5,281,104, issued on Jan. 25, 1994, Bublitz discloses a sequential displacement piston pump.

In U.S. Pat. No. 5,342,075, issued on Aug. 30, 1994, Williams discloses a variable speed drive for a bicycle.

In U.S. Pat. No. 5,346,234, issued on Sep. 13, 1994, Kadaja describes a hydraulic drive mechanism for tricycles and the like that comprises a variable volume, positive displacement hydraulic pump and a hydraulic motor.

In U.S. Pat. No. 5,351,575, issued on Oct. 4, 1994, Overby discloses a pumping propulsion system.

U.S. Pat. No. 5,354,082, issued on Oct. 11, 1994 to Topeak, Inc. discloses a mudguard for a bicycle.

U.S. Pat. No. 5,358,078, issued on Oct. 25, 1994 to Fichtel & Sachs, AG discloses a hydraulically operable disk brake for bicycles or similar vehicles.

U.S. Pat. No. 5,385,359, issued on Jan. 31, 1991, discloses a stabilization device for front wheel drive bicycles.

In U.S. Pat. No. 5,362,278, issued on Nov. 8, 1994, Bergles et al. discloses a chain driving mechanism for a bicycle or the like.

U.S. Pat. No. 5,378,201, issued on Jan. 3, 1995, discloses a multi-geared bicycle transmission assembly comprising internal gear sets.

In U.S. Pat. No. 5,3387,000, issued on Feb. 7, 1995, Sato discloses a hydraulic drive system for bicycles and the like.

U.S. Pat. No. 5,390,565, issued on Feb. 21, 1995 to Maeda Industries, Ltd., discloses a bicycle speed change system.

U.S. Pat. No. 5,390,946, issued on Feb. 21, 1995, discloses a sifting clutch for a dual-wheel driven bicycle.

U.S. Pat. No. 5,407,395, issued on Apr. 18, 1995, discloses a steplessly variable belt drive for bicycles.

A brochure from Banjo Corporation in Crawfordsville, Ind., advertises a product called "Dry Mate Polypropylene Dry Disconnect" and provides specifications for the product.

SUMMARY OF THE INVENTION

The present invention comprises a torque converting linkage which employs two turbines in fluid filled chambers. An external torque rotates the first turbine, which forces fluid into a chamber containing a second turbine. The displaced fluid rotates the second turbine, furnishing rotational power to a device attached to a shaft which the second turbine rotates. The housings enclosing the two turbines are filled with a force transmitting fluid, and are coupled by two conduits. Each housing has an inlet and an outlet which provide connections for the conduits.

In an alternative embodiment of the invention, the housing includes a volute which directs fluid against the vanes of the turbines to optimize the transfer of energy. The invention may also include a ratio adjustment device, which controls the flow of fluid to the turbines, and a pressure adjustment device, which changes the working pressure within the housings. Other features which may be incorporated into the invention include a quick connect device, a dual flow conduit, a dual flow quick connect device, a reversing valve and automatic shifting and torque adjustment devices.

One embodiment of the invention is intended for use with bicycles. The invention offers the advantage of transferring power from one location to another even if the two shafts are not in line, or if the two turbines are not mounted in the same plane or their locations are moving with respect to each other. The invention may be utilized in a wide variety of mechanical devices, including automobiles, machinery, tools and appliances.

An appreciation of other aims and objectives of the present invention and a more complete and comprehensive understanding of this invention may be achieved by referring to the description of preferred and alternative embodiments, and by referring to the accompanying drawings.

A BRIEF DESCRIPTION OF THE DRAWINGS

FIGS. 1, 2 and 3 present views of the present invention mounted on a bicycle. FIG. 1 shows an embodiment which provides rear wheel drive. FIG. 2 shows an embodiment which provides front wheel drive. FIG. 3 shows an embodiment which provides both front and rear wheel drive.

FIGS. 4, 5 and 6 offer views of one embodiment of the present invention, showing a driver turbine and a reactor turbine each mounted in housings coupled by fluid-filled conduits.

FIGS. 7, 8, 9 and 10 supply exploded views of one embodiment of the invention, revealing a turbine, a shaft, a volute, a housing and fluid ports.

FIGS. 11, 12, 13, 14 and 15 furnish views of a ratio adjustment device, which functions as an adjustable aperture that controls fluid flow to the turbines.

FIGS. 16 and 17 contain additional views of the ratio adjustment device.

FIGS. 18, 19, 20, 21, 22, 23, 24 and 25 depict various embodiments of the ratio adjustment device.

FIGS. 26, 27 and 28 exhibit three views of the pressure adjustment device that is employed to change the working pressure experienced by the turbines.

FIGS. 29, 30 and 31 portray a quick connect assembly that is used to connect or disconnect the fluid conduits from the turbine housings.

FIG. 32 supples views of some of the various impeller configurations which may be used to implement the invention.

FIGS. 33 and 34 provide illustrations of an auto-dial assembly, which is used to adjust the ratio adjustment device to maintain constant torque pressure on the driver turbine to facilitate automatic shifting or ratio adjustment.

FIG. 35 offers exploded views of the invention, showing the mechanical relationships among the turbines, shafts, volutes, housing, ports and conduits.

FIGS. 36, 37 and 38A exhibit additional exploded views of the elements depicted in FIG. 35.

FIGS. 38B, 38C, 38D and 38E offer exploded views showing various possible locations for the ratio adjusting device within the assembly.

FIGS. 39, 40 and 41 offer views of a housing with integrally formed ports.

FIGS. 42, 43 and 44 supply views of a housing with integrated dual flow ports.

FIG. 45A furnishes exploded views of one embodiment of a ratio adjustment device.

FIGS. 45B and 45C contain additional exploded views illustrating the turbine drive system including a ratio adjustment device.

FIGS. 45D, 45E and 45F present views of one example of a turbine.

FIGS. 46, 47, 48, 49, 50 and 51 provide detailed depictions of a quick connect and disconnect device.

FIG. 52 supplies examples of turbine cross-sections.

FIG. 53 portrays various leading edge vane contours, while FIG. 54 portrays trailing edge vane contours.

FIGS. 55 and 56 furnish views of various turbine vane shapes, while FIG. 57 furnishes views of a variety of turbine vane arrays.

FIGS. 57A and 57B supply illustrations of one embodiment of the ratio adjustment device.

FIGS. 59 and 60 illustrate a spiral section ratio adjustment device.

FIGS. 61, 62, 63 and 64 show the details of a drive end assembly.

DETAILED DESCRIPTION OF PREFERRED & ALTERNATIVE EMBODIMENTS

I. Preferred Embodiments of the Invention

Figure 1:
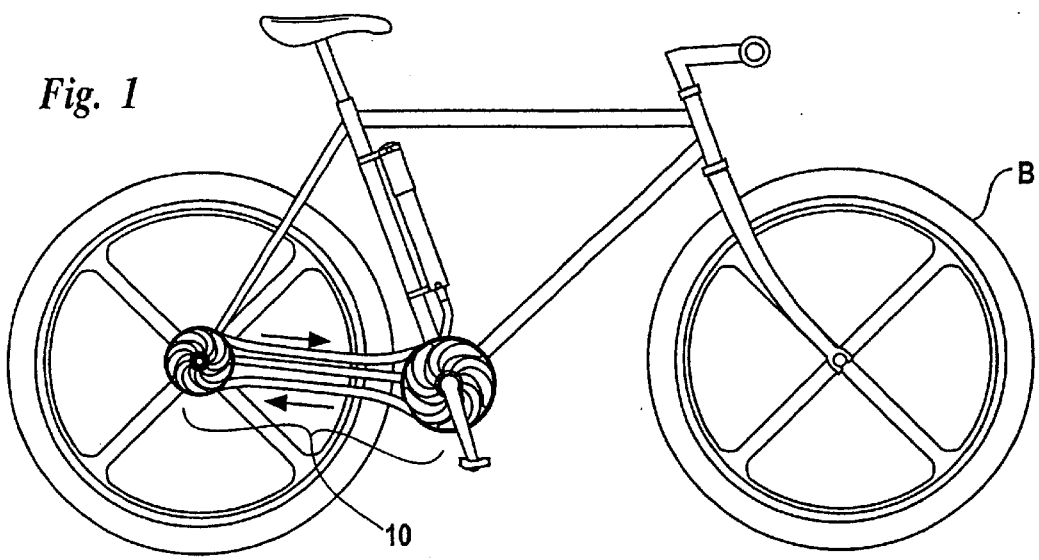
Figure 2:
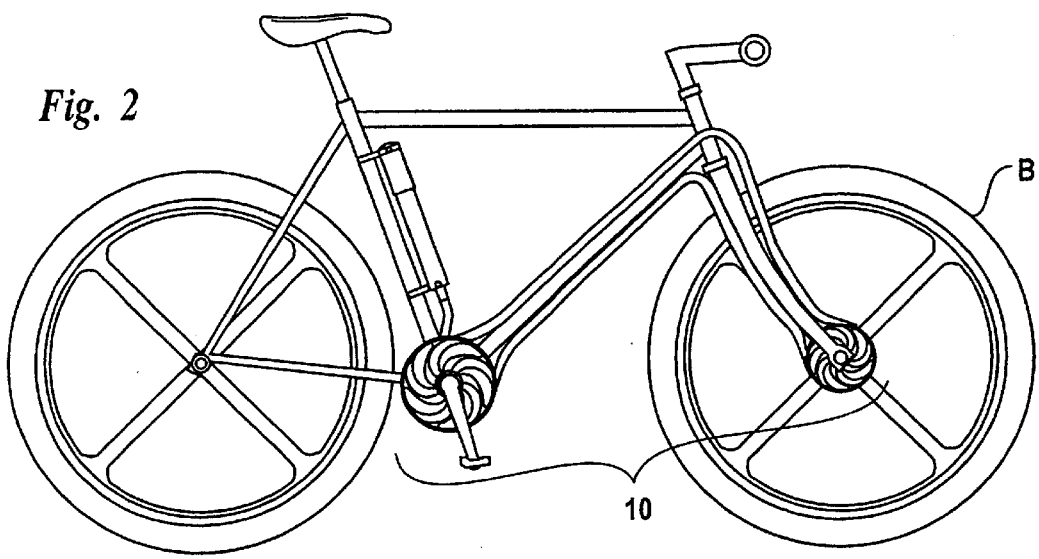
Figure 3:
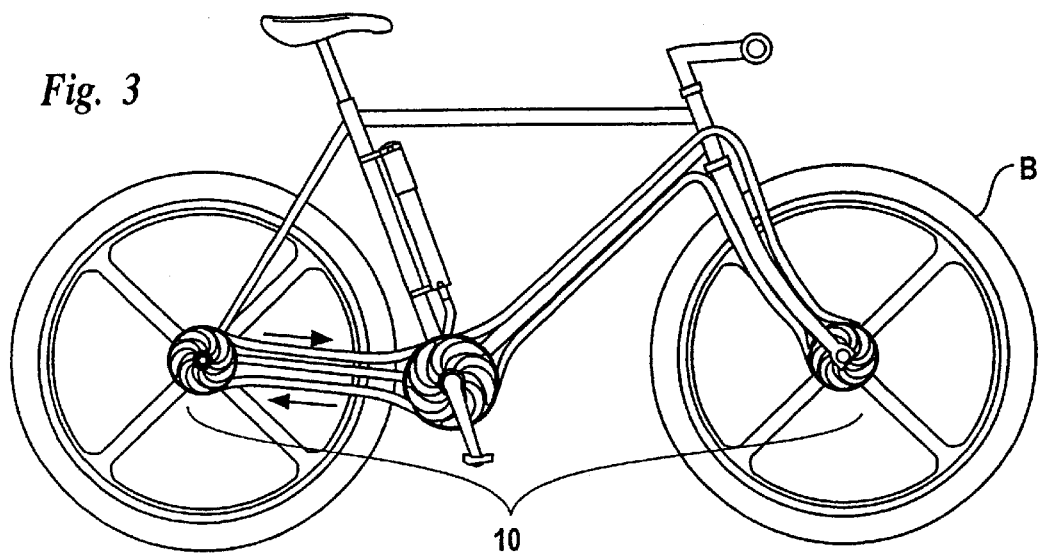
Figure 4:
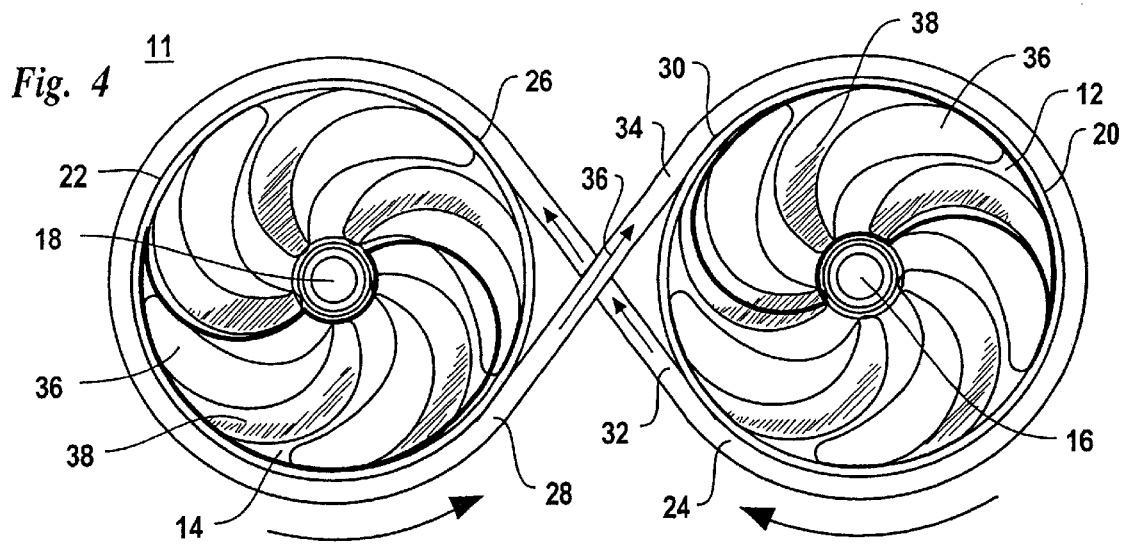
Figure 5:
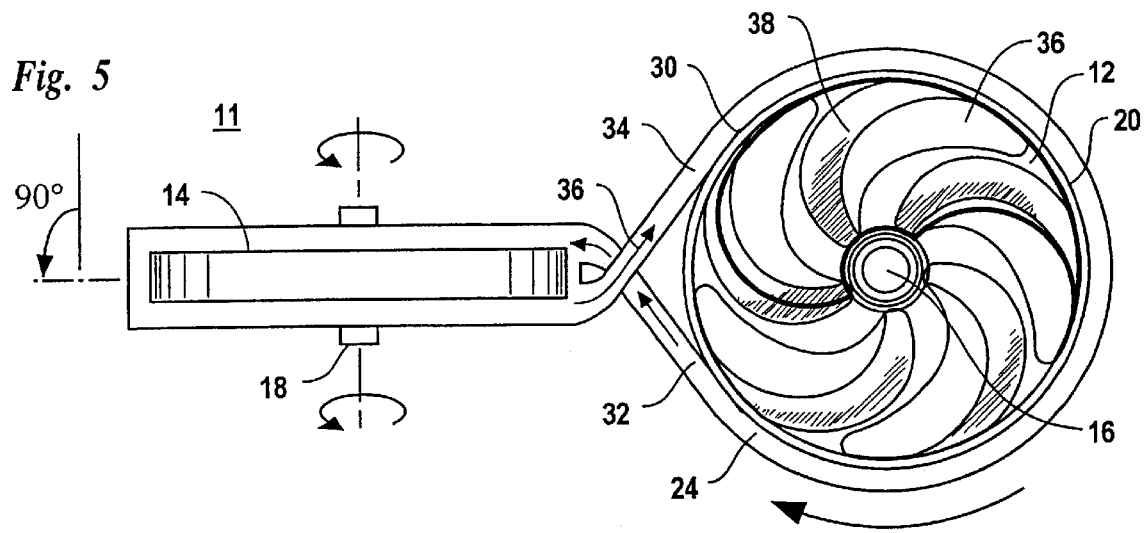
Figure 6:
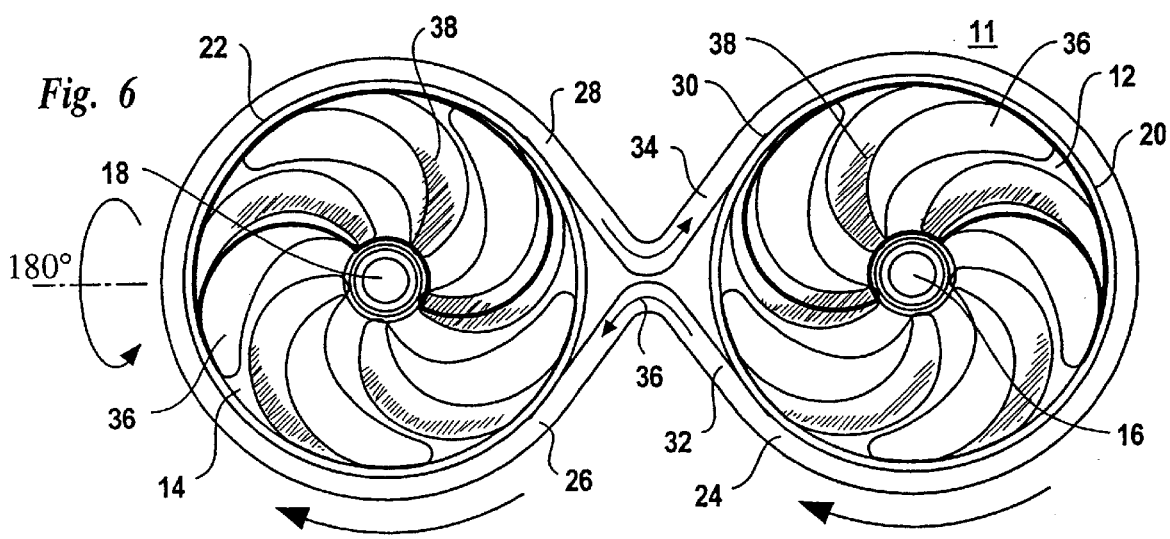

FIGS. 1, 2 and 3 supply views of one embodiment of the present invention 10 mounted on a conventional bicycle B. FIGS. 4, 5 and 6 reveal the details of a generalized embodiment of the present invention 11. The embodiment portrayed in FIGS. 4, 5 and 6 comprises two disc-shaped turbines 12 & 14 which rotate on shafts 16 & 18, and which are enclosed by housings 20 & 22. Each housing has a pair of fluid ports, an inlet and outlet. The inlet and outlet ports on the impeller turbine housing 20 are marked 24 & 30. The inlet and outlet ports on the reactor turbine housing 22 are marked 26 & 28. The two housings 20 & 22 are coupled by a pair of conduits 32 & 34, forming a closed loop. Conduit 32, the driver conduit, connects the outlet port 24 on the impeller housing 20 to the inlet port 26 on the reactor housing 22. Conduit 34, the return conduit, connects the outlet port 28 on the reactor housing 22 to the inlet port 30 on the impeller housing 20. The housings 20 & 22, as well as the conduits 32 & 34, are all filled with a generally incompressible fluid 36. The first turbine functions as an impeller 12, which is rotated by an external force which is applied to the impeller turbine shaft 16. The second turbine functions as a reactor 14, which is turned by the motion of the fluid 36 that is forced by direct pressure away from the impeller turbine 12 and through driver conduit 32. The fluid 36 then acts on the passive reactor turbine 14, inducing the reactor turbine 14 to rotate its shaft 18. The spent fluid 36 then returns to the housing containing the impeller turbine 12 through return conduit 34. In one embodiment of the invention, the fluid 36 is a natural or synthetic gel or lubricant that is capable of withstanding high temperatures and that has a very low freezing temperature.

One of the important features of the present invention pertains to its ability to be adapted into a wide variety of mechanical configurations. The invention comprises a means for converting rotational energy into directional energy at one location, and then transferring that directional energy to another location where the directional energy is converted to rotational energy once again without regard for position or alignment of the axes of rotation.

Each turbine 12 and 14 includes generally spiral-shaped vanes 38 which radiate from their centers of rotation. The vanes 38 each have a convex and a concave side. In FIG. 4, the impeller turbine 12 is shown rotating in the clockwise direction as a result of the external torque imposed on shaft 16. In the specific case of a bicycle, a crank with pedals would be fixed to shaft 16. When the external torque rotates the impeller turbine, the fluid 36 is "caught" against the concave side of each vane 38 and pushed out of the impeller housing 20 into its outlet port 24, which is connected to driver conduit 32. The fluid 36 then enters the reactor housing 22 through its inlet port 26, and is then caught by the vanes 38 on the concave side of the reactor turbine 14. The displaced fluid forces the reactor turbine 14 to rotate its shaft 18, and then exits the reactor housing 22 by passing through reactor housing outlet port 28 into the return conduit 34. The fluid 36 is completes its journey by arriving back in the impeller housing 20 through its inlet port 30.

The embodiments shown in FIGS. 4, 5 and 6 are generalized versions of the invention, and are provided only to disclose the invention in one of its more simple forms. The turbines 12 & 14 represent only one of the many embodiments of the invention. Similarly, the spiral vanes 38 constitute only one of the many variations which may be employed to implement the invention. Any means which transmits a medium under pressure from a first rotating turbine to a second rotating turbine may be utilized to practice the invention.

In another embodiment of the invention, the turbine utilizes its convex side to move the fluid out of the housing 20 into conduit 32 toward reactor turbine 14.

FIG. 5 discloses an important benefit offered by the invention. Because the conduits 32 & 34 may be flexible, the turbines 12 & 14 may be located in different planes as shown in FIG. 5. Unlike a conventional chain drive on a bicycle, where the rotating sprockets must be located in-line and generally in the same plane in a fixed location, the present invention offers a means for transmitting power without the geometric constraints of previous mechanical drive systems and may be moved to other locations while in operation.

FIG. 6 illustrates an alternative embodiment of the invention, showing the housings 20 & 22 connected in a configuration which is different from that shown in FIG. 4. In FIG. 4, the impeller and the reactor turbines rotate in opposite directions. By changing the position of the turbine housings as shown in FIG. 6, both turbines may be made to rotate in the same direction.

Figure 7:
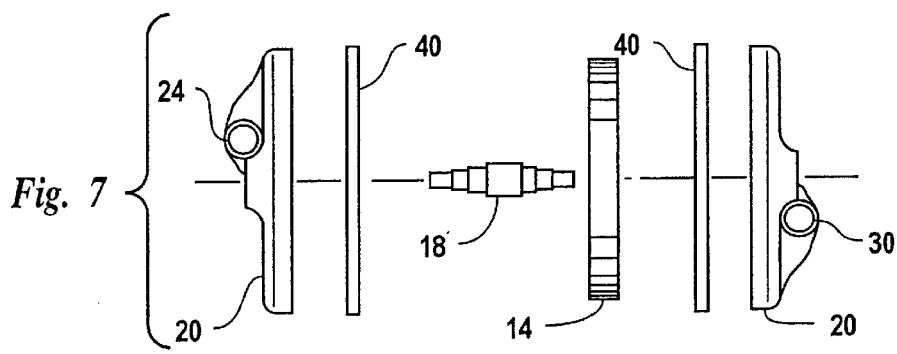

FIG. 7 furnishes an exploded view of an embodiment of the present invention which includes a turbine 12, a shaft 16, a housing 20, inlet and outlet ports 24 and 30, and a volute 40. In one embodiment of the invention, the volute 40 comprises two pieces and encloses the turbine (12 or 14 or both) within the turbine housing (20 or 22 or both). The volute may be a generally disc-shaped element which is shaped to direct the flow of the fluid 36 within the housings to optimize the transfer of power to and from the turbines. The volute 40 may comprise two separate pieces which are installed on either side of a turbine, or may be integrally formed as part of a housing. A volute 40 that is separate from the housing offers the advantage of providing a replaceable and interchangeable part. The volute 40 may have a number of openings 41 formed in its sides, or may incorporate venturi or contours which are designed to direct the fluid flow within a turbine housing.

In one embodiment of the invention, the volute 40 and the turbine 12 and 14 form an alignment bearing race and bearing surface at the outer circumference to provide alignment of the rotating surface interaction between the various parts under load conditions.

Figure 8:
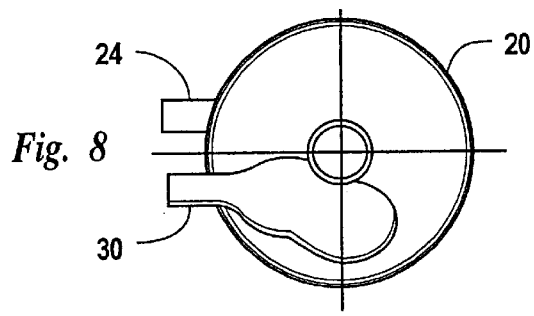
Figure 9:
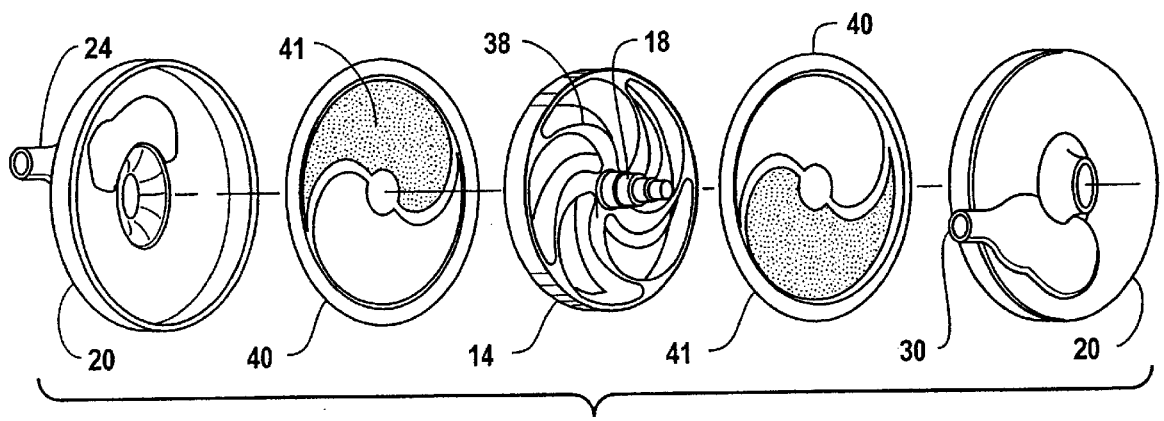
Figure 10:
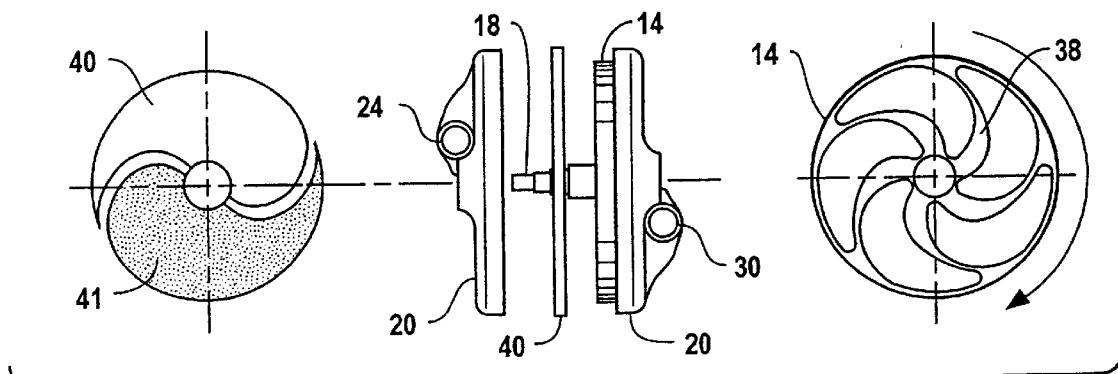
Figure 11:
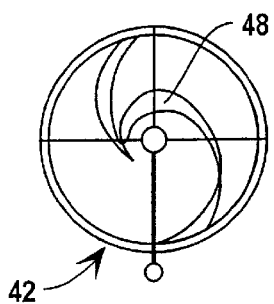
Figure 12:
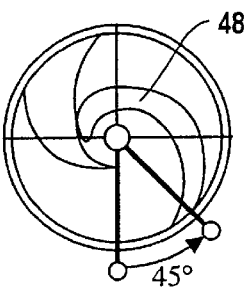
Figure 13:
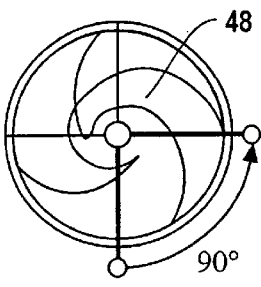
Figure 14:
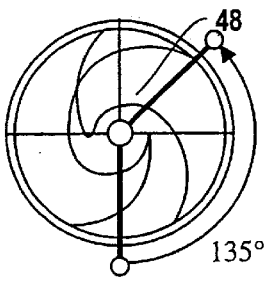
Figure 15:
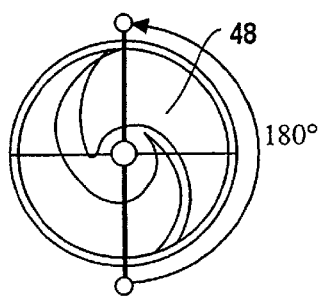
Figure 18:
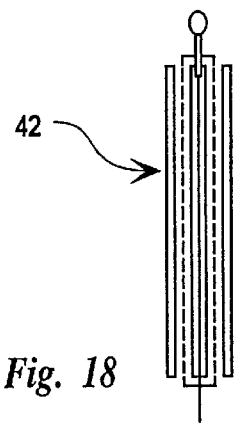
Figure 19:
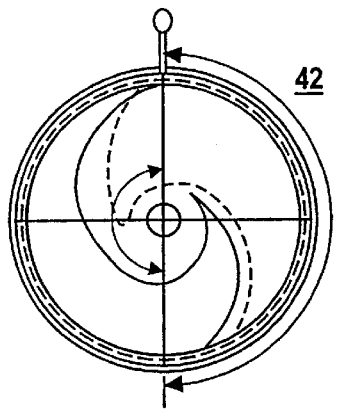

FIG. 8 presents a side view of a housing 20, showing an inlet and an outlet port 24 & 30. FIG. 9 offers another exploded rendering, depicting the turbine 12, shaft 16, housing 20 and volute 40 in a perspective view. FIG. 10 furnishes yet another illustration of this same embodiment of the present invention.

In one embodiment of the invention, shaft bearings 92 are installed in the housings 20 and 22 to provide shaft alignment and freedom of rotation. In another embodiment of the invention, shaft seals 94 are provided to seal the fluid 36 within the volute 40 against the shafts.

FIGS. 11, 12, 13, 14 and 15 contain sequential views of a ratio adjustment device 42, which functions as an adjustable aperture or iris that controls fluid flow to or from the turbines. When employed in a bicycle, this feature provides a smooth and step-less gear change, contrasted to the discrete and set ratios of conventional bicycles. In one embodiment of the invention, the ratio adjustment device 42 changes the torque ratio and/or speed of one of the shafts 16 with respect to another of the turbine shafts 18. The ratio adjustment device 42 may comprise two discs mounted side by side. Both the first fixed disc 44 and the second movable disc 46 are formed with spiral-shaped openings 48. The second movable disc 46 is rotated so that the overlap of the spiral openings on each disc create a variable aperture for the flow of the force transmitting fluid 36. The volume and position of fluid that flows to a turbine is determined by the size and shape of the opening that is created by the superposition of the two discs 44 and 46.

Figure 16:
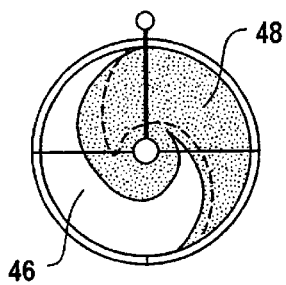
Figure 20:
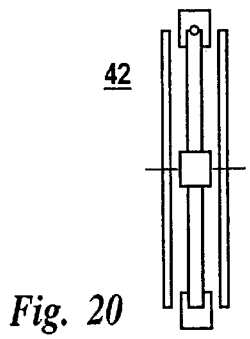
Figure 21:
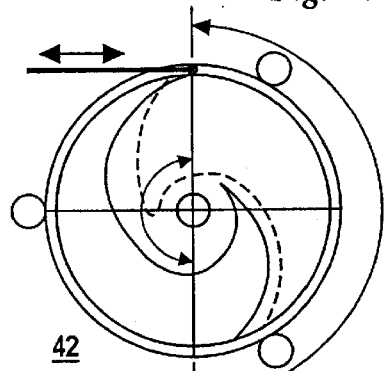
Figure 17:
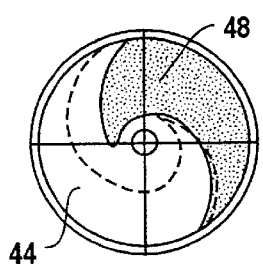
Figure 22:
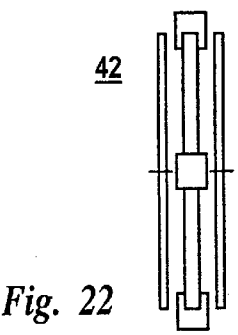
Figure 23:
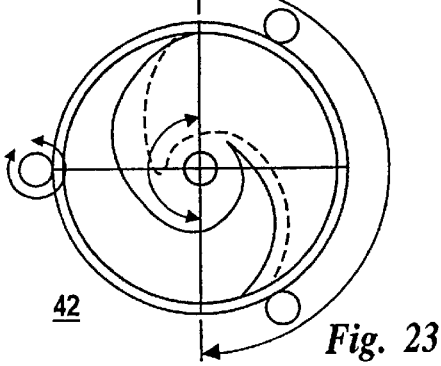

FIGS. 16 and 17 contain additional views of the ratio adjustment device for describing the general shape of the fixed and movable aperture openings 48. The ratio adjustment device 42 may be integrated with a volute 40 or with a housing 20, or may be manufactured as a separate unit. The ratio adjustment device 42 may be controlled by a variety of different mechanisms, including a lever, a cable, a belt, gears, rollers or springs or magnetic actuator, as shown in FIGS. 18 through 25.

FIGS. 26, 27 and 28 illustrate a pressure adjustment device 50 that is used to control the fluid pressure inside the turbine housings 20 & 22. In one embodiment of the invention, the pressure adjustment device 50 comprises a pump which increases or reduces the pressure in the space inside one or both of the housings 20 and 22. FIG. 27 depicts a pressure adjustment device 50 comprising a housing 52, a pressure gauge 54, a release valve 56, a bladder membrane 58, a pumping mechanism 53 and a vent 60. FIG. 28 shows a pressure adjustment device 50 mounted on a bicycle frame. The pressure adjustment device may also be employed to capture any gas that may accumulate in the force transmitting fluid 36.

Figure 29:
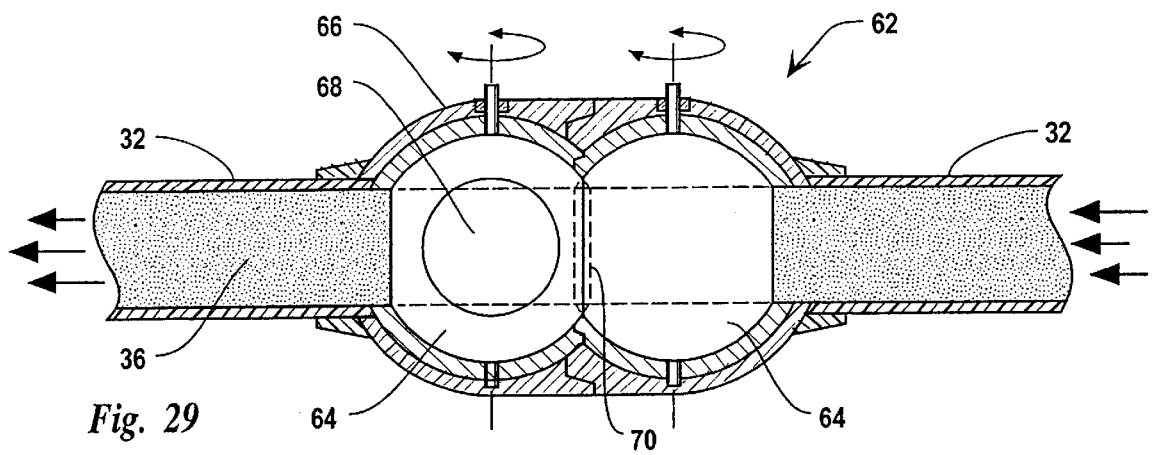
Figure 30:
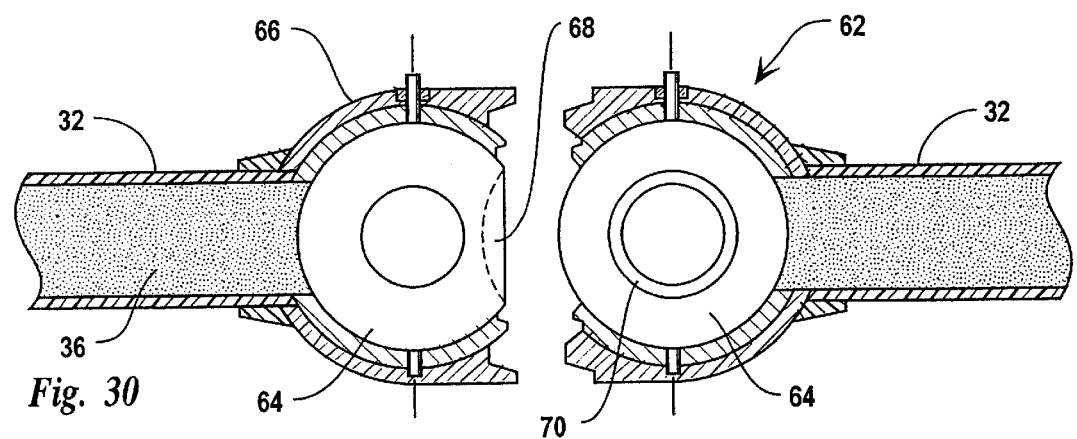
Figure 31:
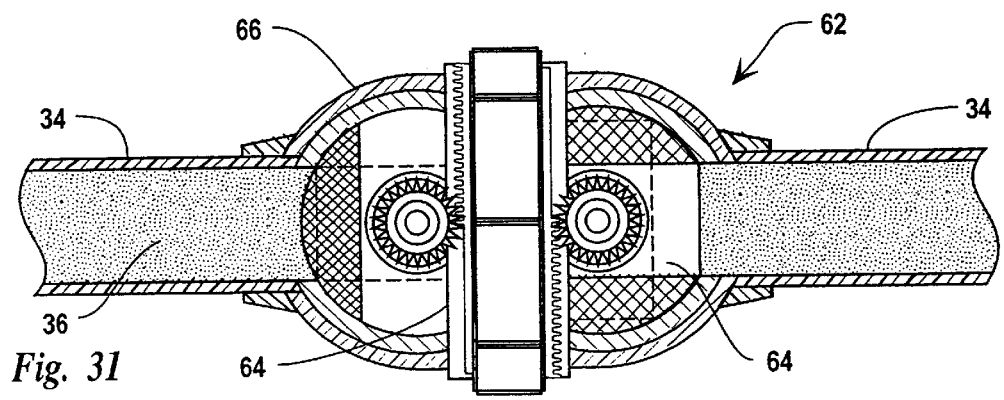

FIGS. 29, 30 and 31 reveal the details of a quick connect assembly 62 that may be used to connect or disconnect the fluid conduits 32 & 34 from the turbine housings 20 & 22. In one embodiment of the invention, the quick connect assembly 62 includes two pivoting ball valves 64 located in a housing 66. One of the balls has a mating surface dimple 68, while the other has a mating surface ring 70. The use of the quick connect assembly 62 allows for quick and easy decoupling without repressurizing or bleeding the system. This feature is especially useful when the invention is incorporated with a bicycle, where it is important to be able to remove and to reattach the front or rear wheel frequently.

II. Alternative Embodiments of the Invention

Figure 32:
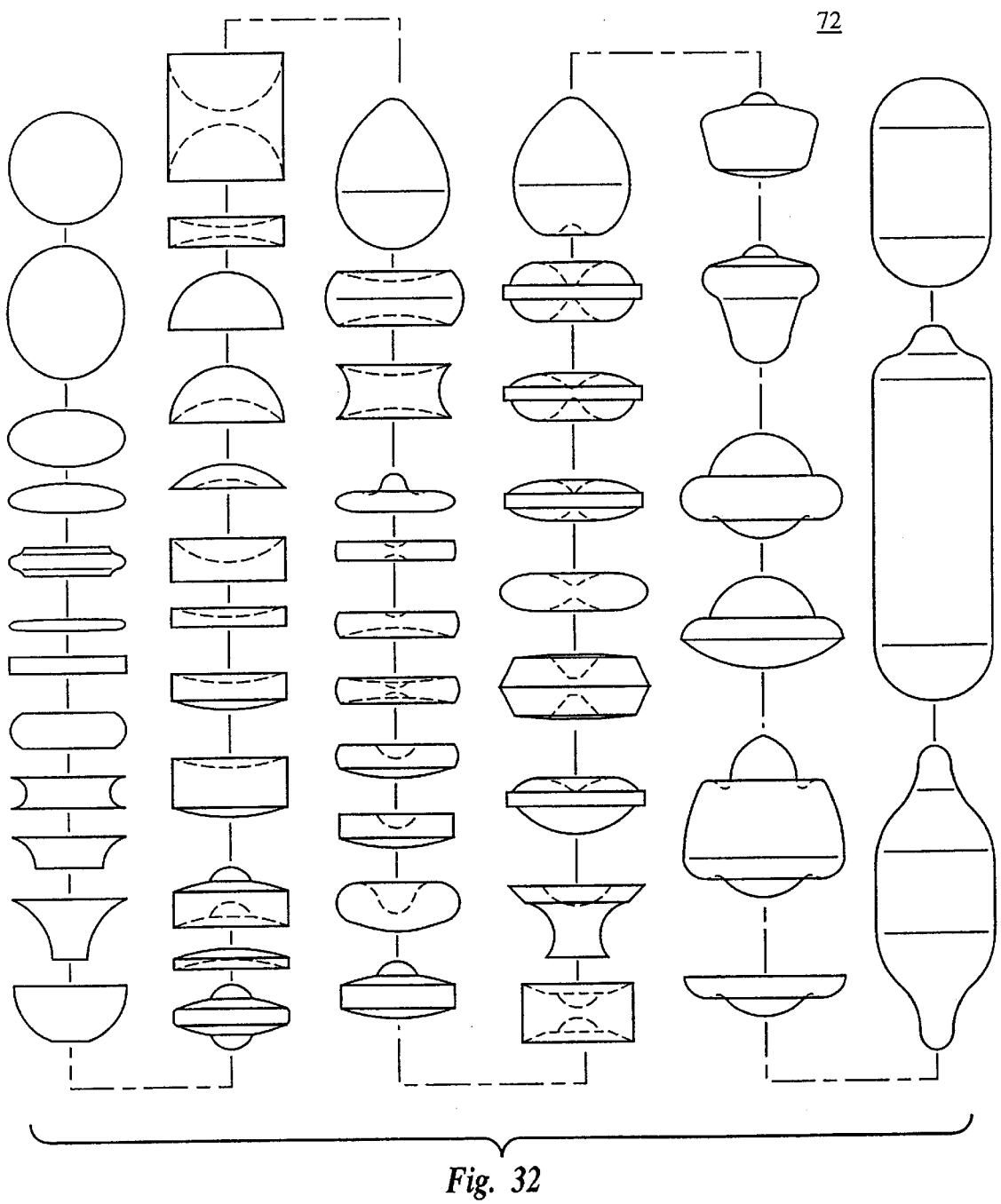

FIG. 32 supplies views of some of the various impeller configurations 72 which may be used to implement the invention. These depictions are provided to educate the reader about the wide variety of embodiments which may be employed to practice the invention, and are not intended to limit the scope of the Claims which follow.

Although one of the preferred embodiments of the invention utilize generally curved vanes 38, the reader should understand that the invention includes many different vane designs. Some vane forms may be based on fractal geometry.

Figure 33:
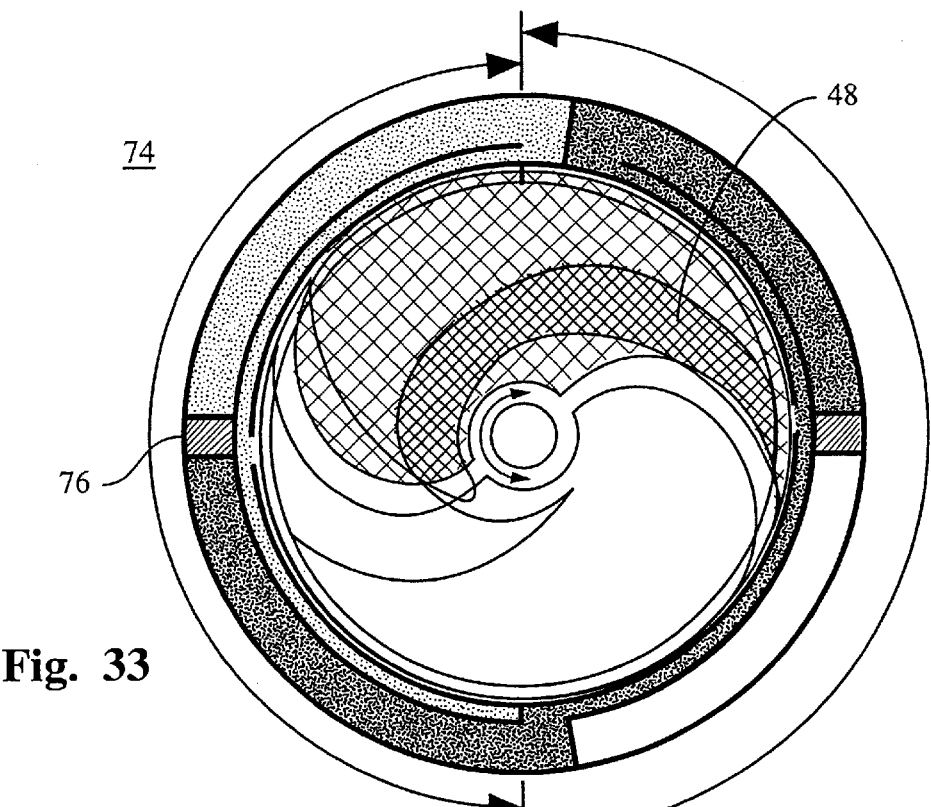
Figure 34:
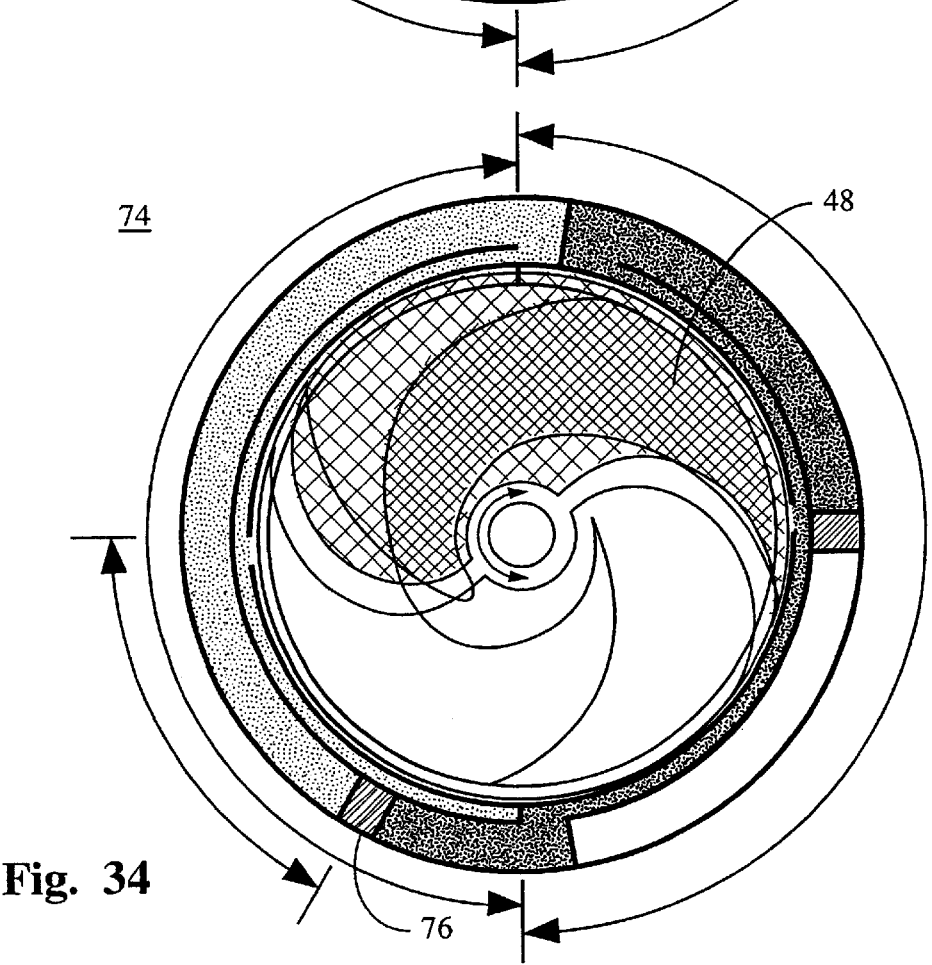

FIGS. 33 and 34 provide illustrations of an auto-dial assembly 74, which is used to adjust the ratio adjustment device to maintain constant torque pressure on the driver turbine. The auto-dial assembly 74 utilizes the pressure differential between the two ports of a housing to automatically control the ratio adjustment device 42. An auto-dial pressure adjuster 76 is moved by increasing the pressure of the fluid flowing through an internal port. This action, in turn, rotates the movable disc 46 of the ratio adjustment device 42.

Figure 35:
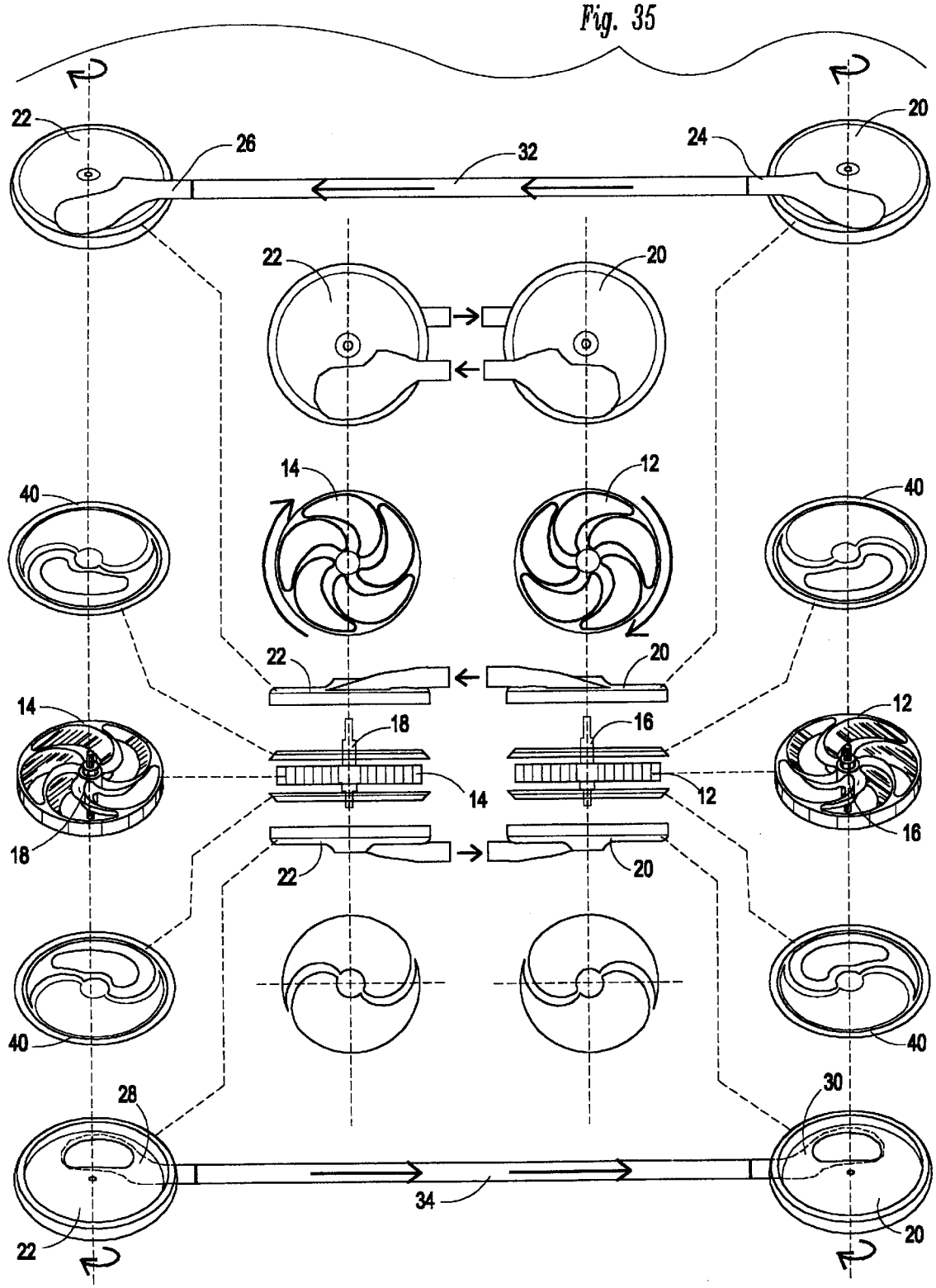

FIG. 35 offers exploded views of the invention, showing the mechanical relationships among the turbines, shafts, volutes, housing, ports and conduits. In alternative embodiments of the invention, the volute may comprise a wide variety of structures. The volute comprises any means which directs the flow of the fluid toward or away from one of the turbines. The volute can be designed as a one piece unit, or may comprise two or more pieces. The volute can be designed as a separate and distinct individual part, or may be integral with a housing. The volute may also be designed to be a replaceable, interchangeable part. The volute may be manufactured from metal, plastic or other materials, and may be cast, molded, injection molded, machined or carved. The volute may have a number of different openings of various size and shape, may include venturi characteristics incorporated into its internal contours, and may include spiral contours incorporated into its internal shape.

When combined with a bicycle, the present invention may utilize any conduit which transfers the fluid from one turbine to another. The conduits may be attached to the bicycle frame, or can be inserted inside the tubular members of the frame. The conduit can be designed to have multiple flow passages to deliver the fluid in more than one direction simultaneously.

In alternative embodiments of the invention, the fluid may comprise any substance which is capable of transferring energy. The invention may be implemented using a liquid, a solid, a semi-solid, a particulate matter suspended in a lubricant, or a plasmatic substance. In one embodiment, the fluid is a light weight, durable, slippery, non-hardening medium, and offers an efficient energy transfer.

Figure 38B:
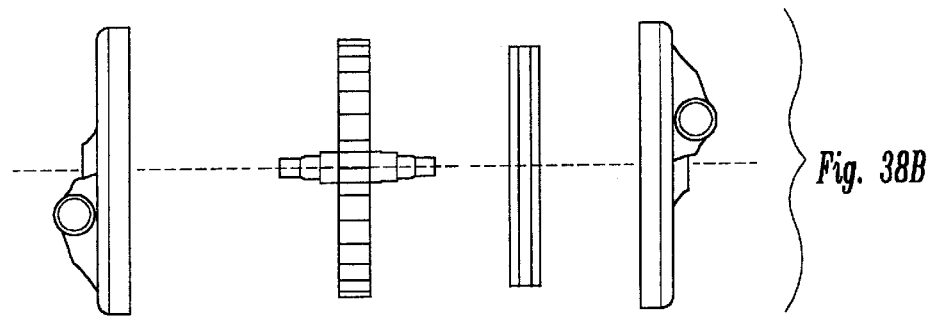
Figure 38C:
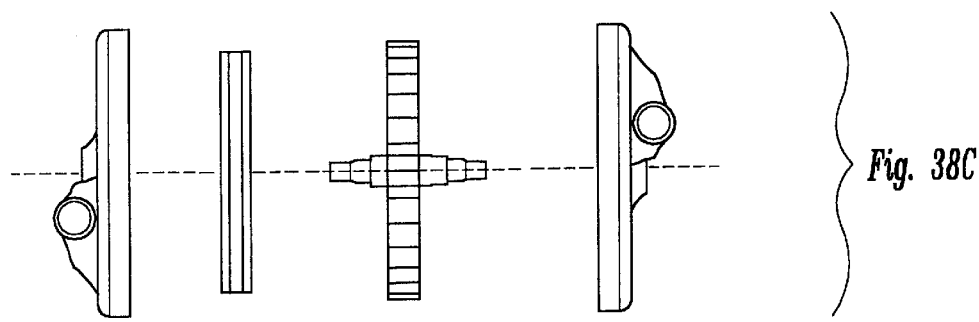
Figure 38D:
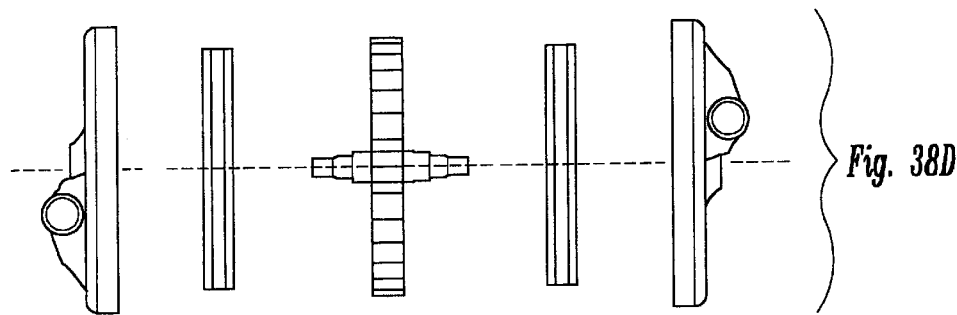
Figure 38E:
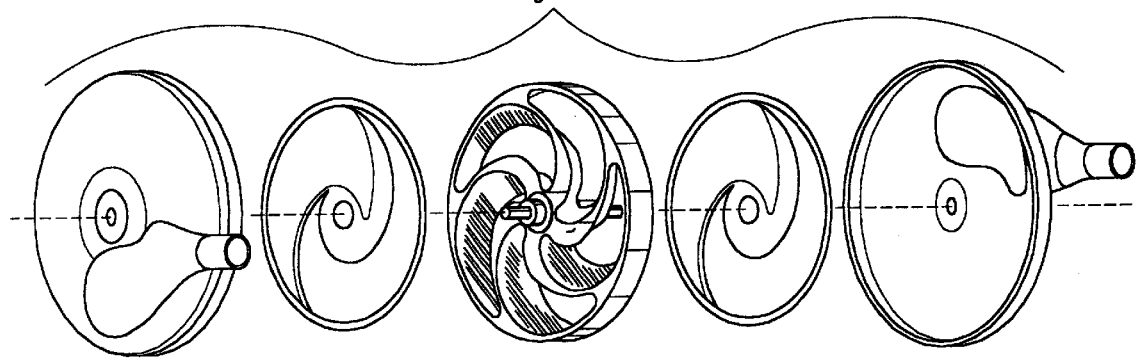
Figure 42:
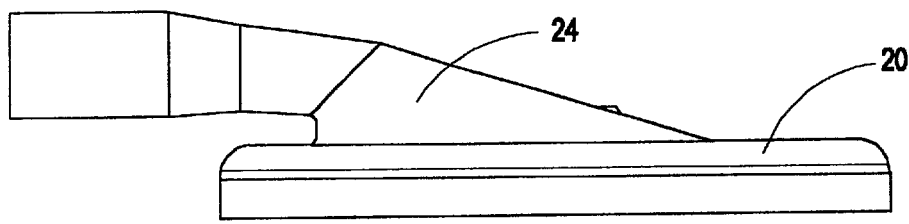
Figure 43:
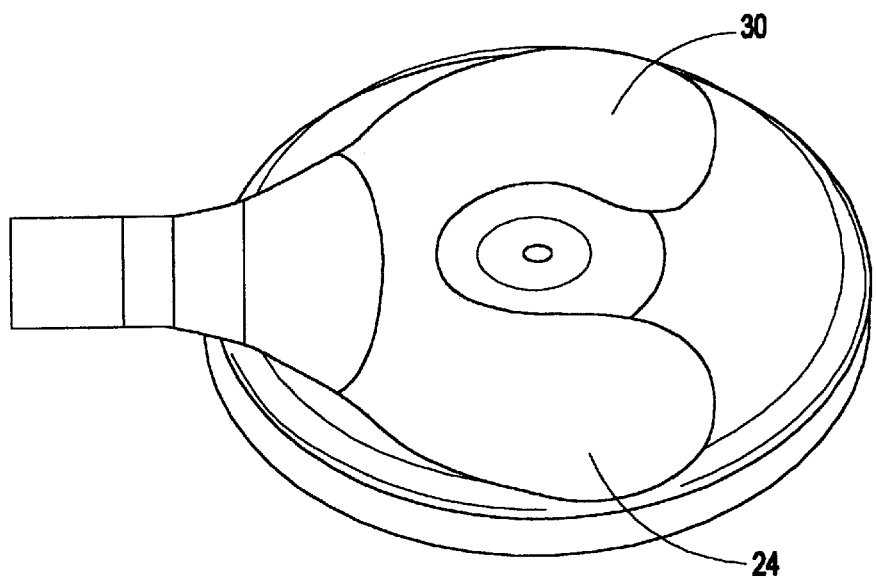
Figure 44:
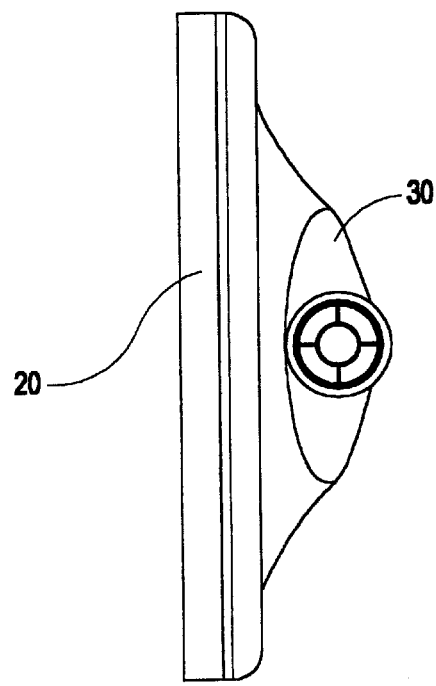

FIGS. 36, 37 and 38A exhibit additional exploded views of the elements depicted in FIG. 35. FIGS. 39, 40 and 41 offer views of a housing with integrally formed ports. FIGS. 42, 43 and 44 supply views of a housing with integrated dual flow ports.

Figure 45A:
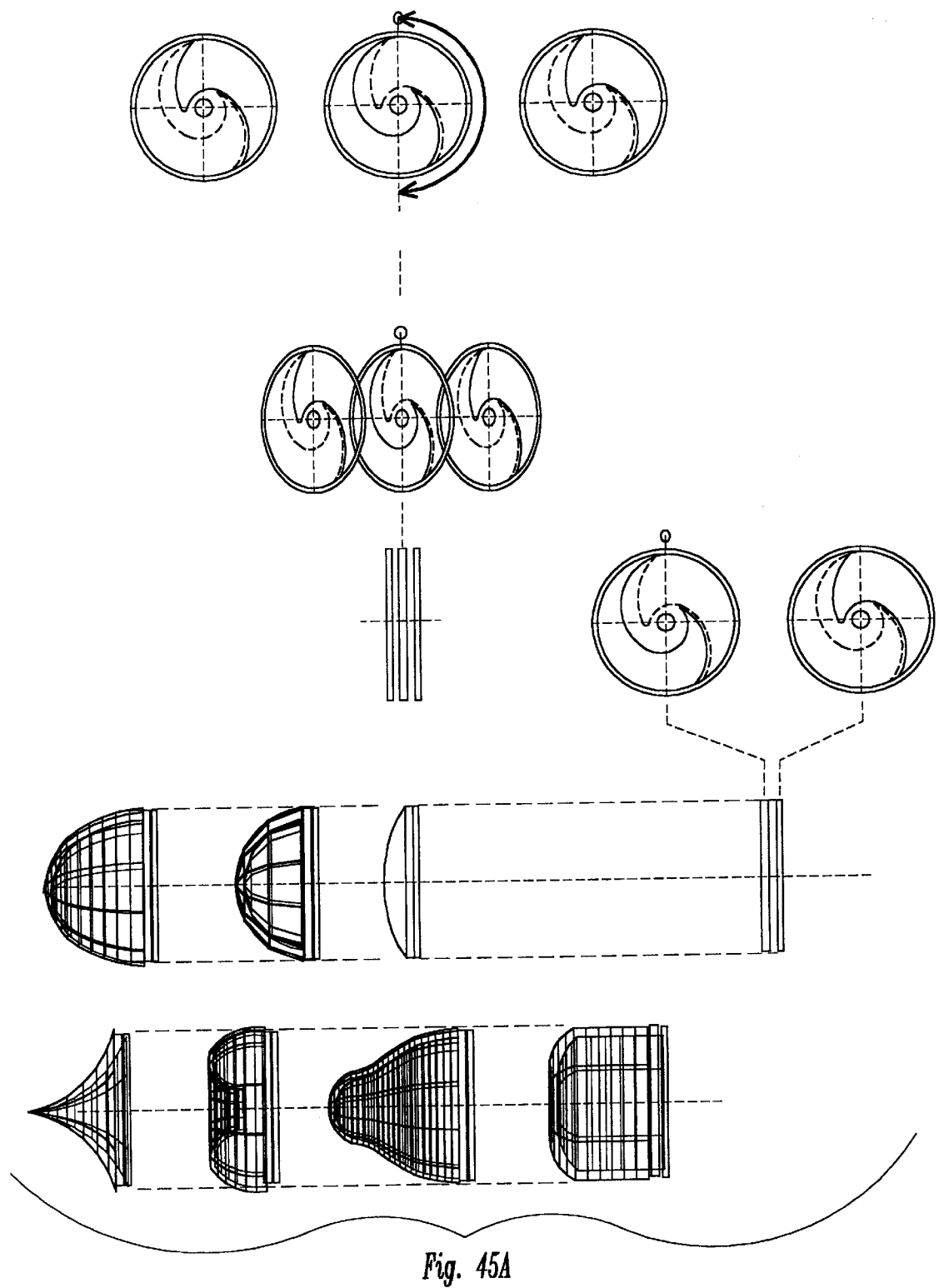
Figure 45B:
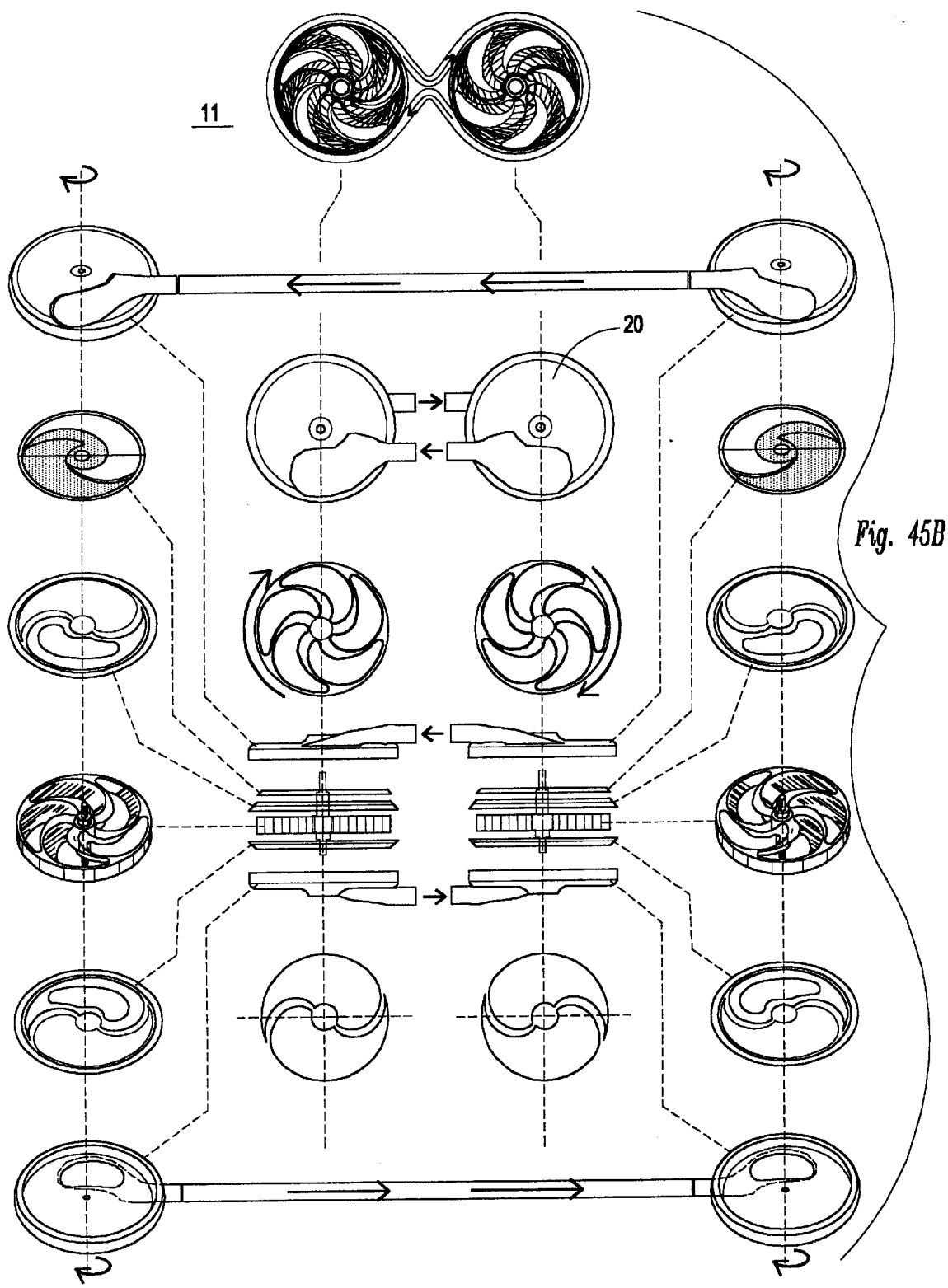
Figure 45C:
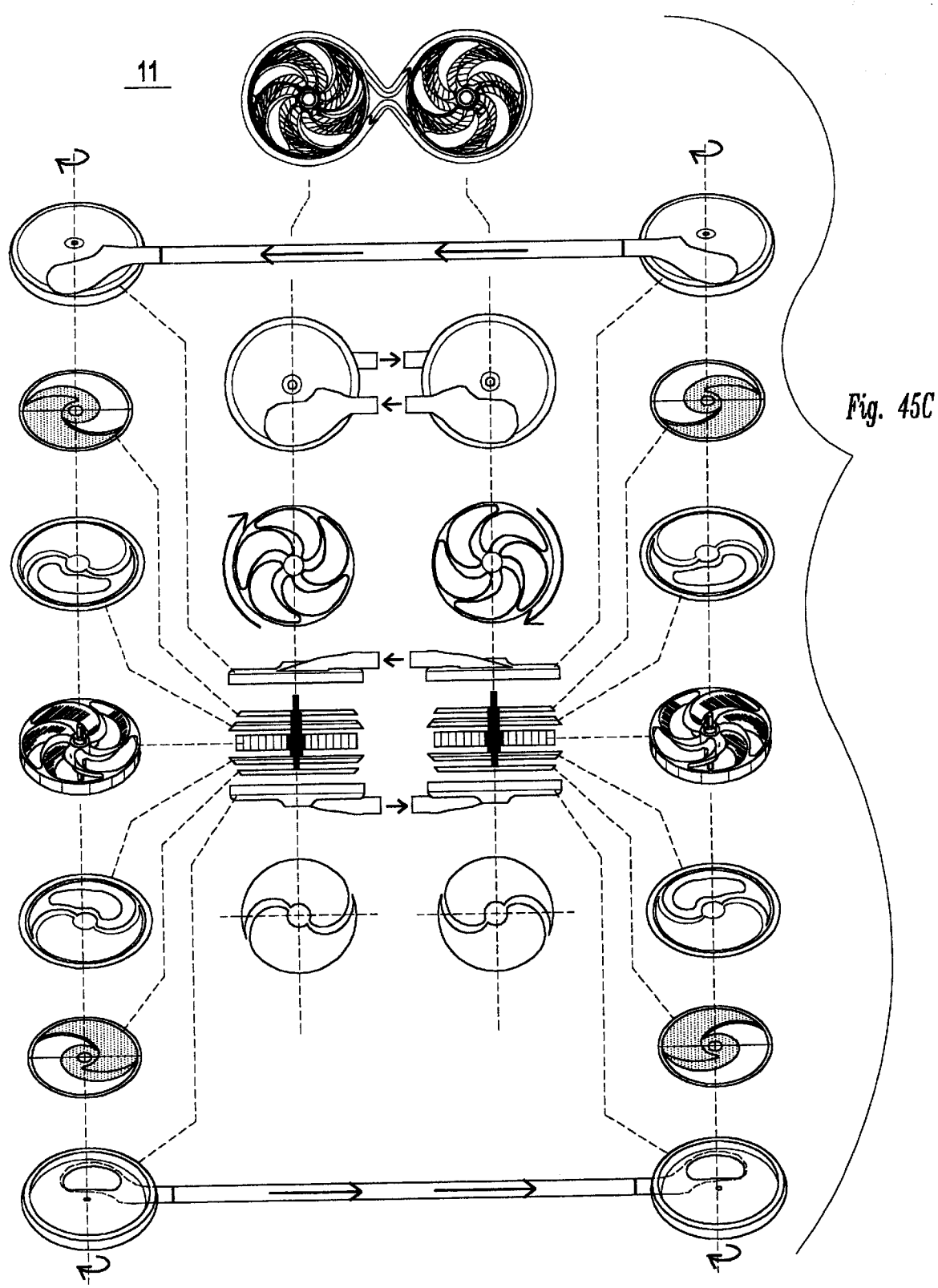

FIG. 45A furnishes exploded views of one embodiment of a ratio adjustment device. FIGS. 45B and 45C contain additional exploded views illustrating the turbine drive system including a ratio adjustment device. The invention many incorporate any ratio adjustment device which serves as an adjustable or variable gate means to vary the flow of fluid within the housings. The ratio adjustment device 42 changes the torque ratio and/or speed of the impeller shaft 16 with respect to the reactor shaft 18 by controlling the flow of the fluid 36 and delivering it to the turbines at various distances from the center of rotation. The ratio adjustment device may be a separate unit or component within the invention, or may be incorporated or integrated with the volute or the housing. In alternative embodiments of the invention, the ratio adjustment device may be configured so that the entire aperture area increases incrementally outward from the center of rotation as the disc is rotated. In another configuration of the ratio adjustment device, the aperture area is moved outwardly from the center as the disc is rotated. In another embodiment, the ratio adjustment device comprises a series of stacked discs with concentric semicircular ring apertures that align and combine to form an aperture. In yet another embodiment, semi-circular ring apertures are rotated 45 degrees from one another to form a roughly spiral shaped aperture from the segmented sections. The ratio adjustment device may also be operated by the auto-dial device, by the posi-trac; device or by the posi-torque device.

The invention may include a pressure adjustment device which changes the working pressure within the invention. The pressure change of the working fluid compensates for various changes in fluid dynamics due to variations in temperature, performance and type of fluid or lubricant. In addition, when impellers and/or housings are changed, it may be useful to vary the system pressure to provide optimum performance or ease of operation. When used in conjunction with a bicycle, the pressure setting is easily adjustable from the seat while riding by either operating a hand pump, or by letting pressure out through the use of a pressure release valve. The pressure adjustment device may be equipped with a gauge to monitor system pressure at a glance. Additionally, the pump may be designed to be used as an emergency road side tire pump in the event of a flat or low tire pressure. The pressure adjustment device may be a separate unit, or may be integrated with the frame of the bicycle. The pressure adjustment device comprises a pressure pump that is capable of delivering adequate pressure against or into an expandable chamber which contacts and applies pressure to the fluid. Other parts of one embodiment of the pressure adjustment device include a housing, a pressure gauge, a pressure release valve, a bladder membrane, an air bleed vent or plug and mounting brackets. In one embodiment of the pressure adjustment device, the pressure adjusting device is a screw type actuator that applies direct pressure against the bladder membrane to cause pressure changes in the system. The pressure adjustment device may be located so that it acts as an accumulator to collect and to trap any air that has become entrained in the fluid. This air can then be eliminated through an air vent or plug.

Figure 45D:
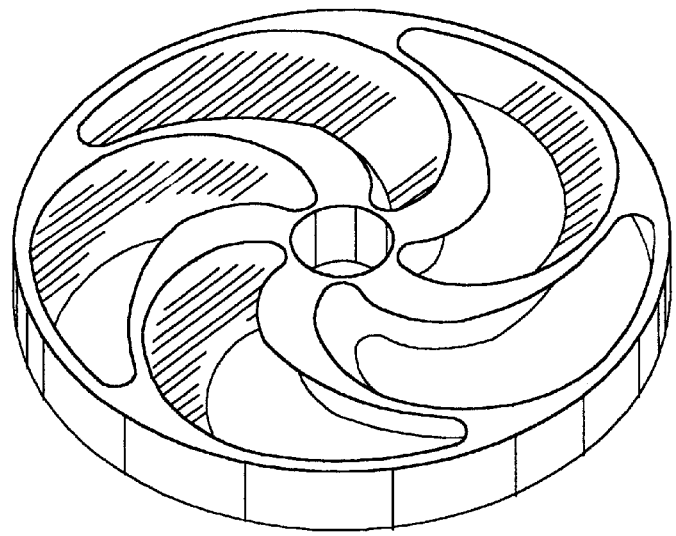
Figure 45E:
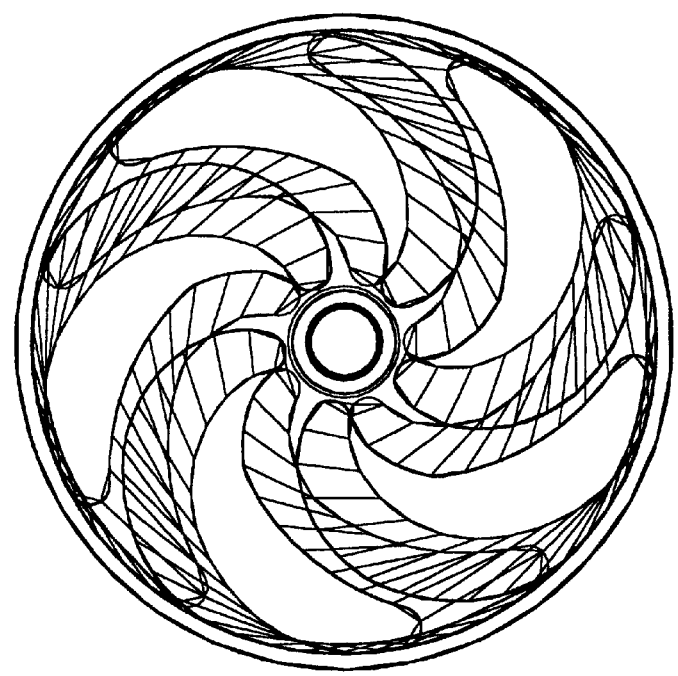
Figure 45F:
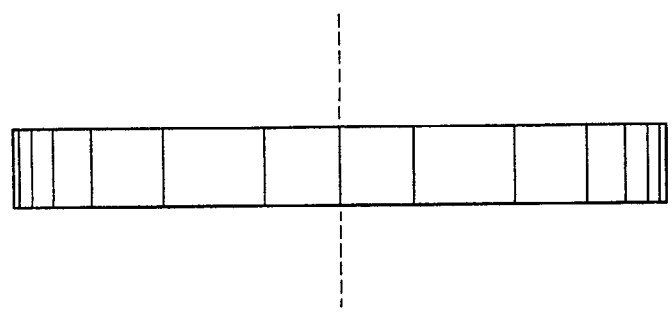
Figure 46:
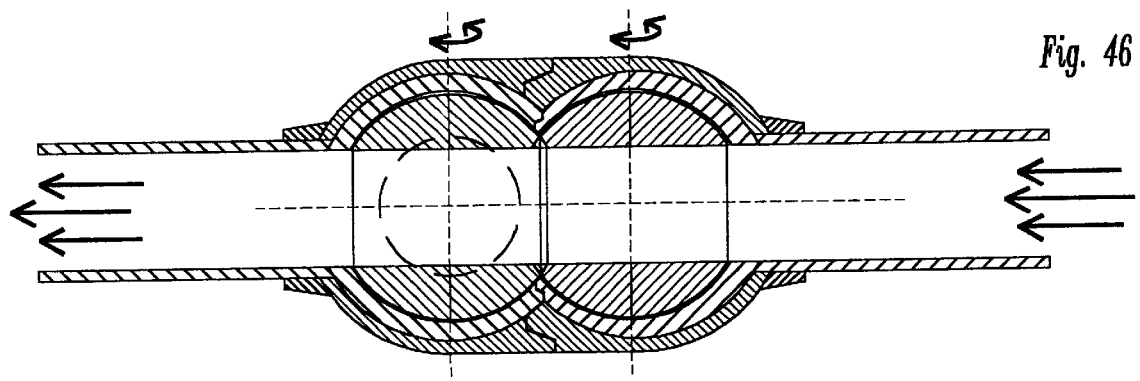
Figure 47:
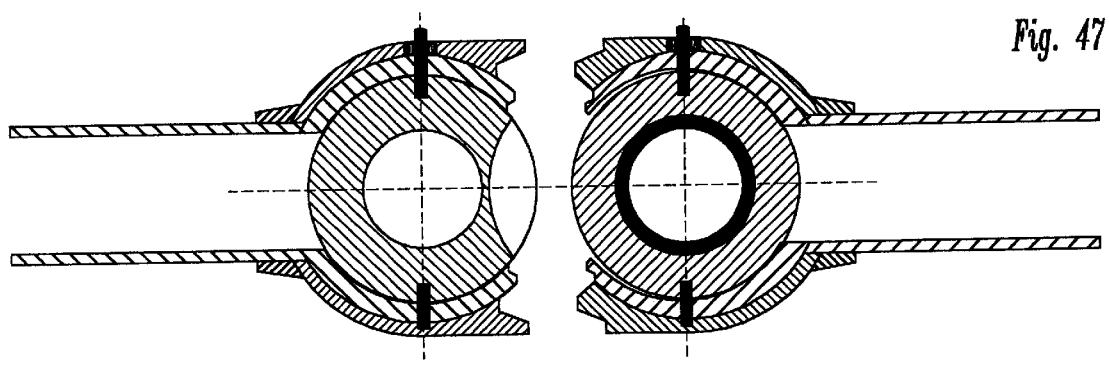
Figure 48:
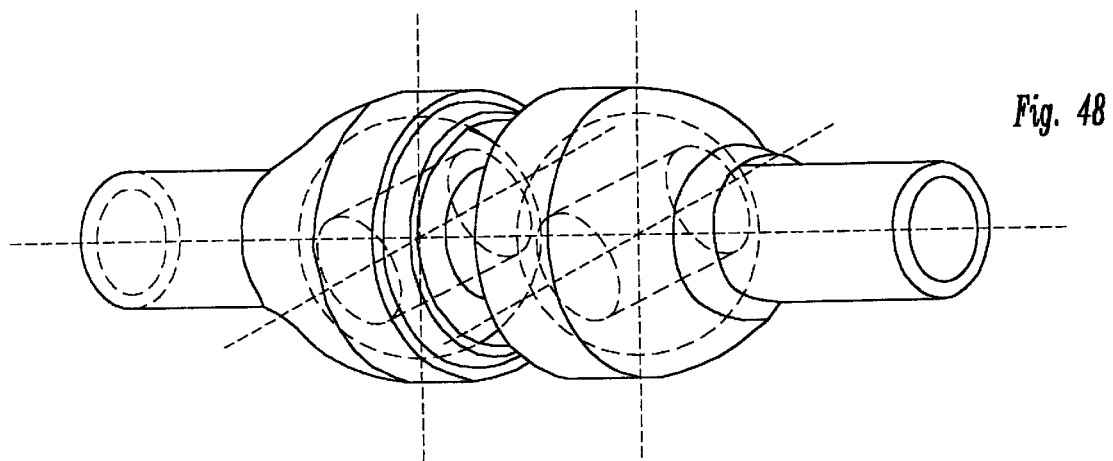
Figure 49:
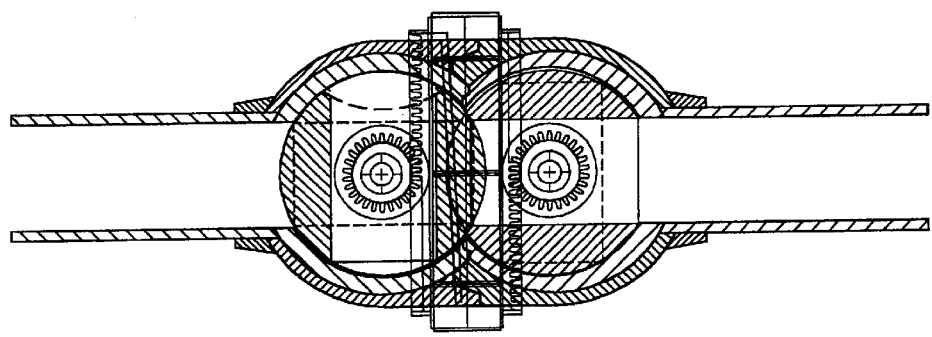
Figure 50:
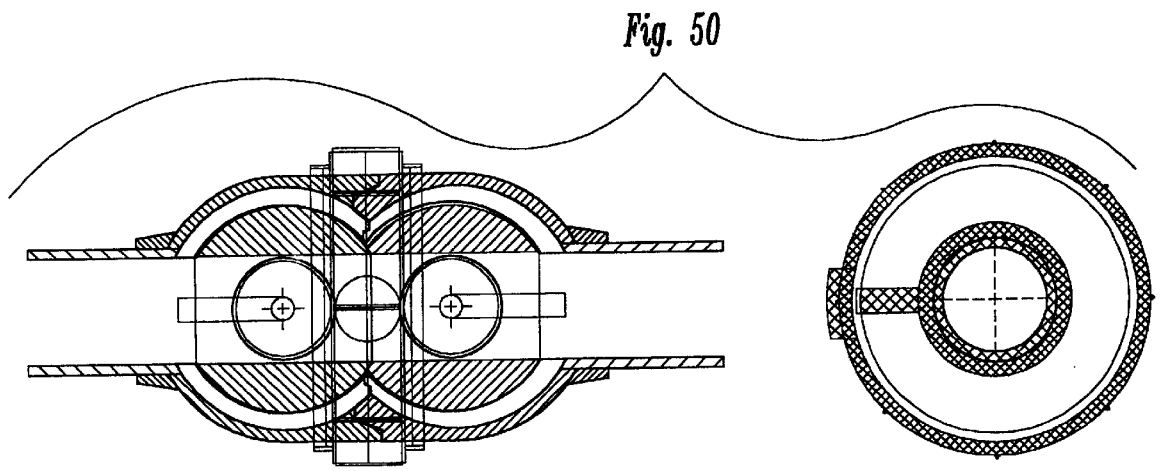
Figure 51:
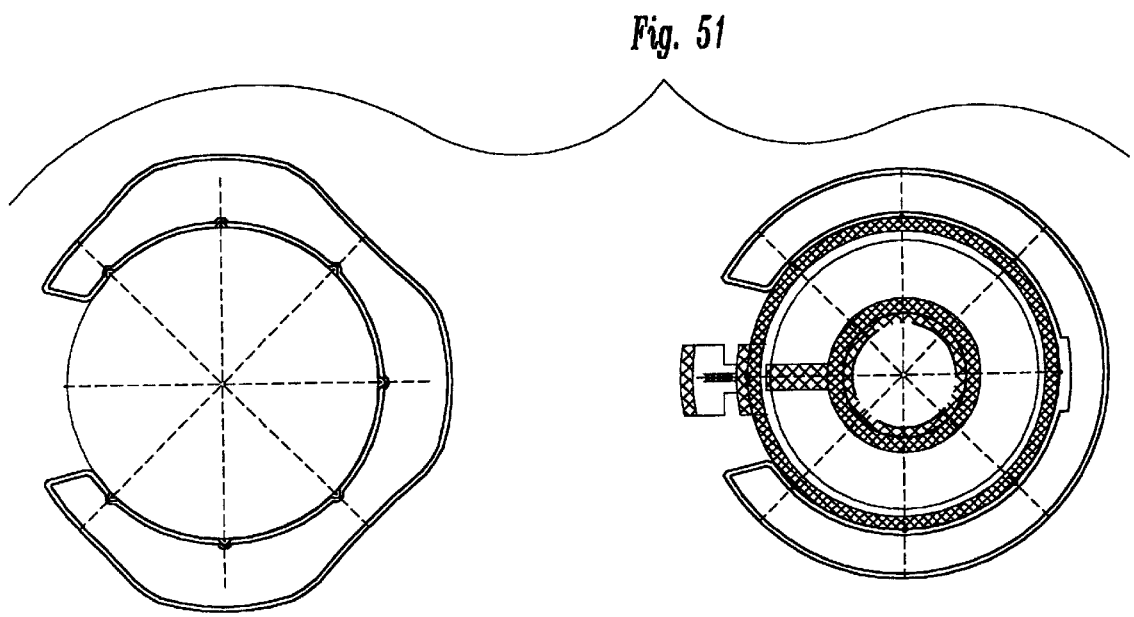

FIGS. 45D, 45E and 45F present views of one example of a turbine. The turbines used in conjunction with the present invention may be manufactured using a wide variety of designs. Essentially, the invention may be practiced using any turbine which is capable of transferring energy to the fluid, or which is capable of rotating in reaction to the action of the fluid. The vanes may be straight or curved. The turbines may be composed of plastic, a metal or other material, and may be fabricated with a variety of different surface textures or finishes.

FIGS. 46, 47, 48, 49, 50 and 51 provide detailed depictions of a quick connect and disconnect device. In one embodiment of the invention, the quick connect device comprises a pivoting ball valve and fitting assembly designed to quickly and easily connect and/or disconnect the fluid conduits. Rotating ball valves are mechanically linked within a housing located in line along one of the conduits. In the bicycle embodiment, the quick disconnect device enables the user to quickly and easily remove the front and/or rear wheel of a bicycle without affecting the pressure within the housing. This allows for the quick and easy replacement without requiring air-elimination, bleeding or re-pressurization of the system.

In one embodiment of the quick connect assembly 62, part of the assembly is incorporated into the housing port 24, 26, 28 or 30 and part of the assembly is incorporated into the end of the conduit 32 or 34.

Figure 52:
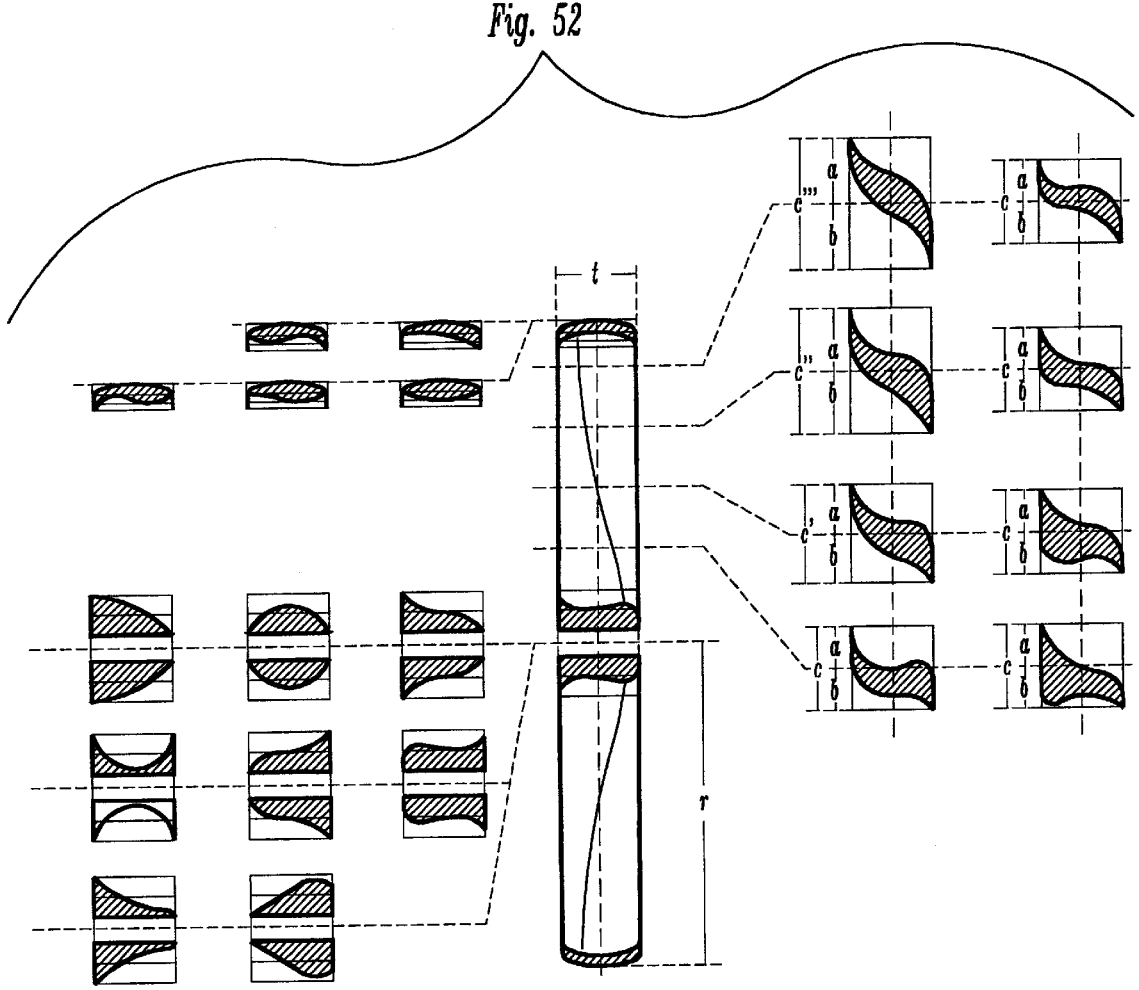
Figure 53:
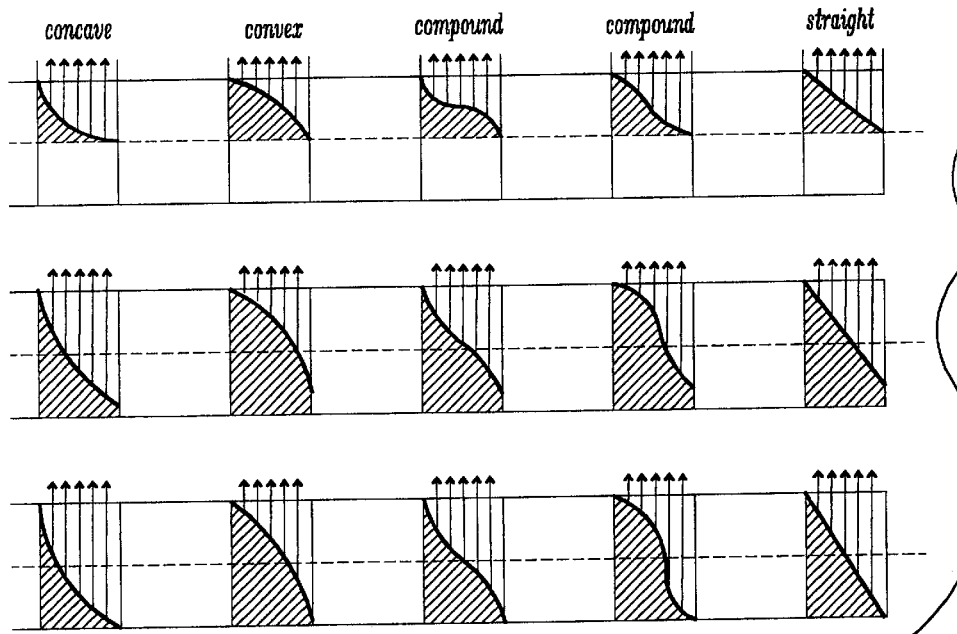
Figure 54:
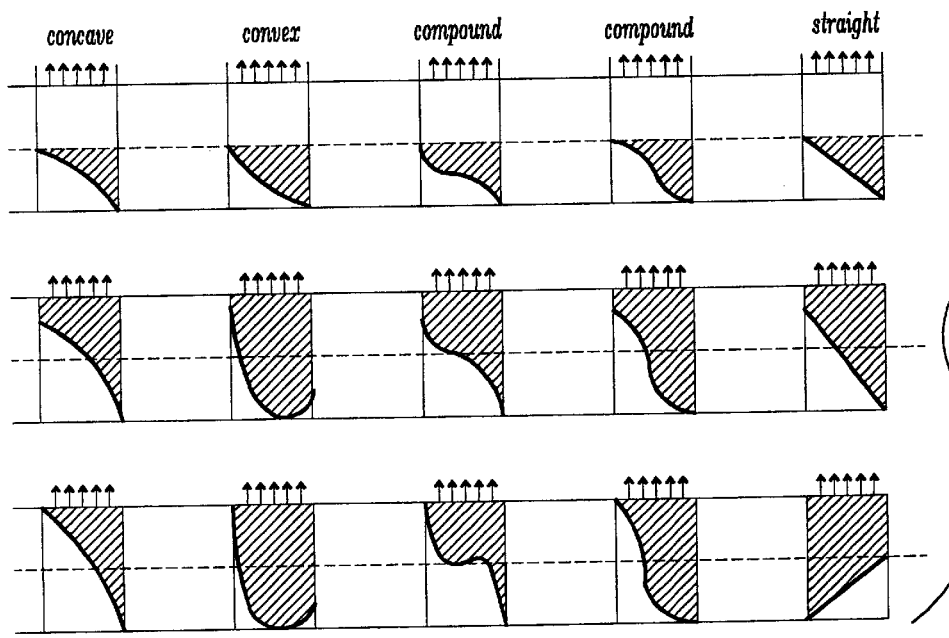
Figure 55:
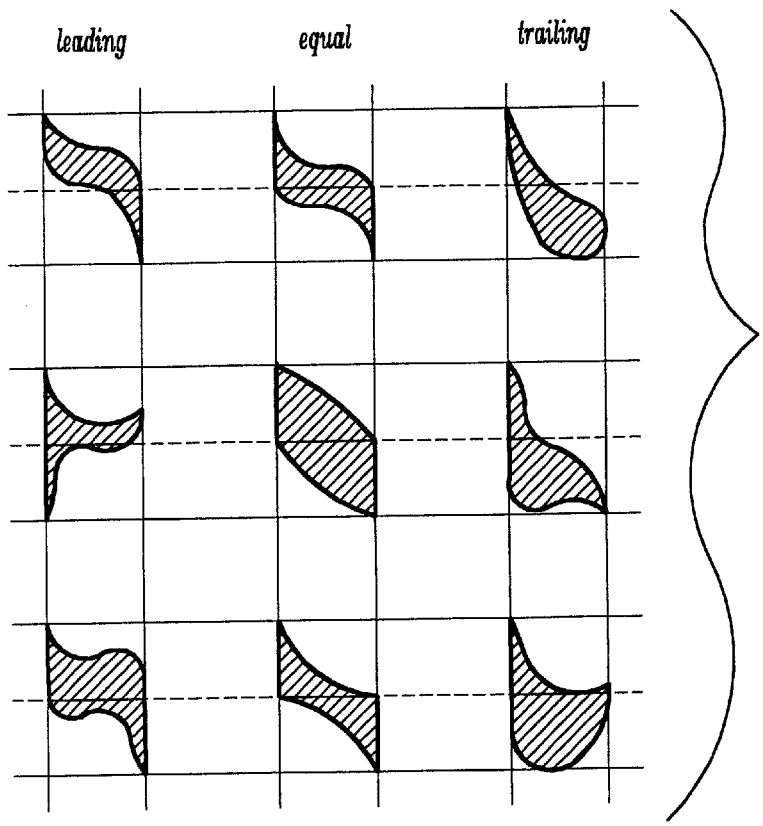
Figure 56:
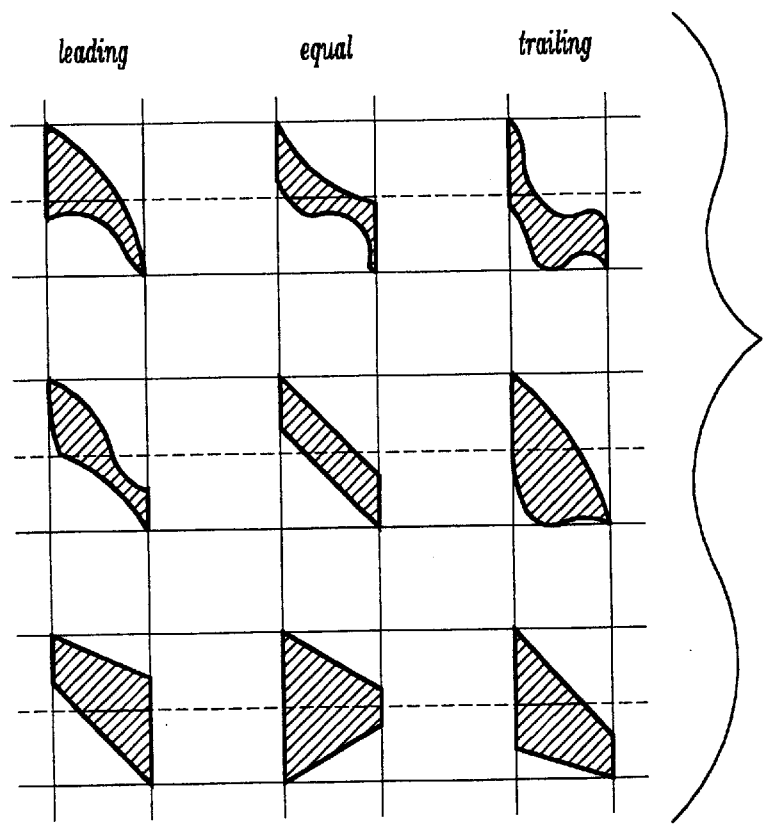
Figure 57:
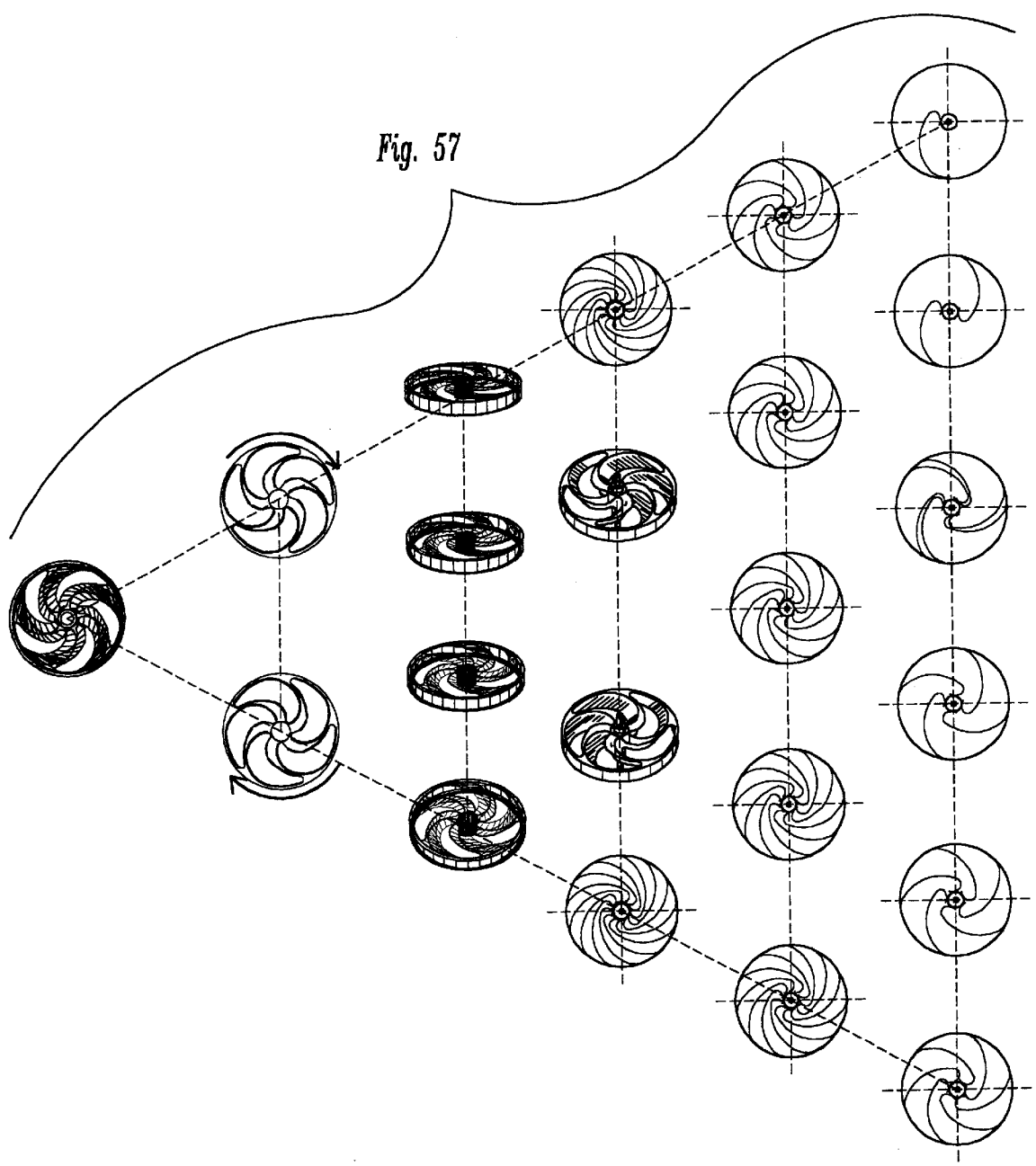
Figure 57A:
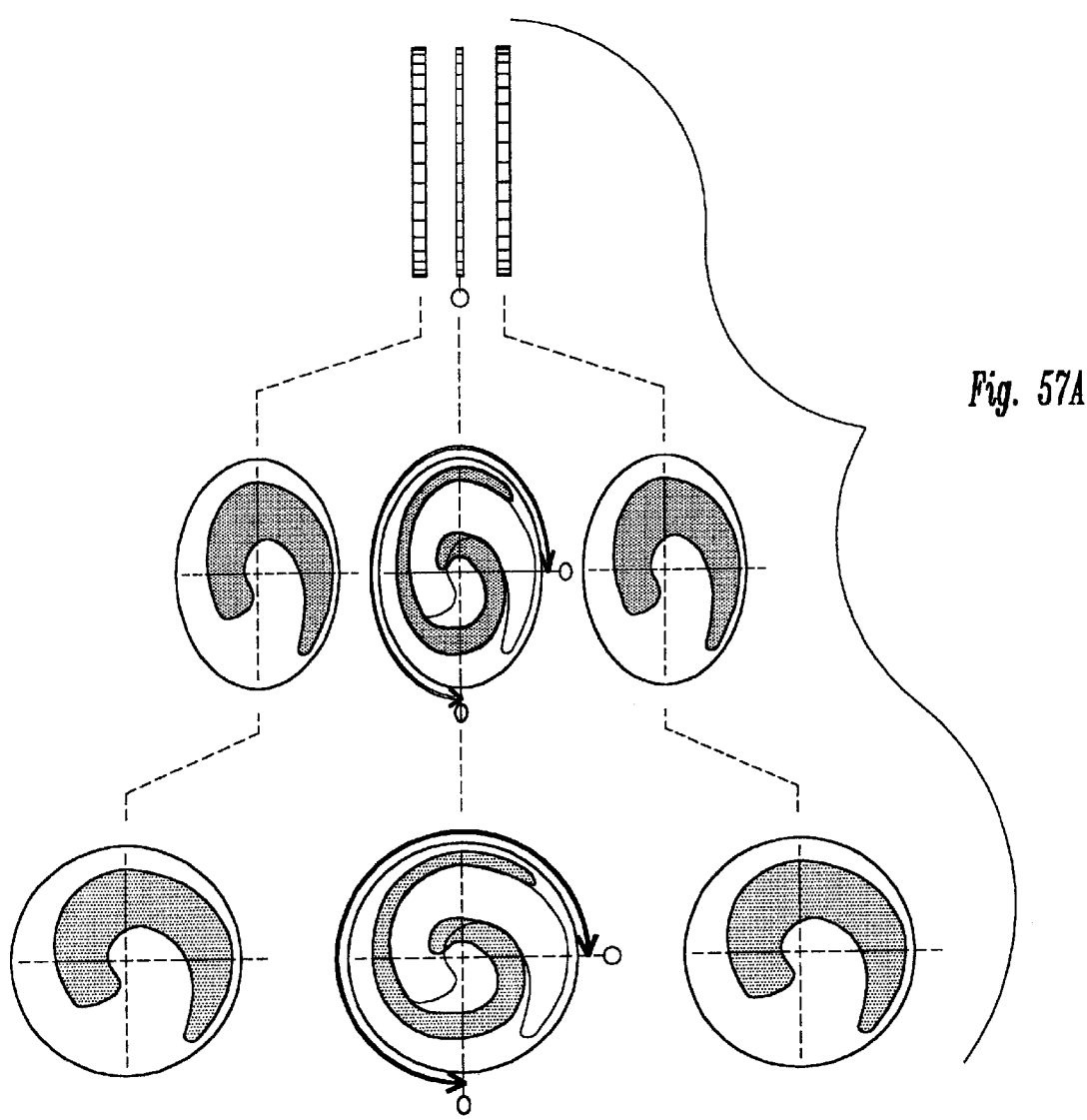
Figure 57B:
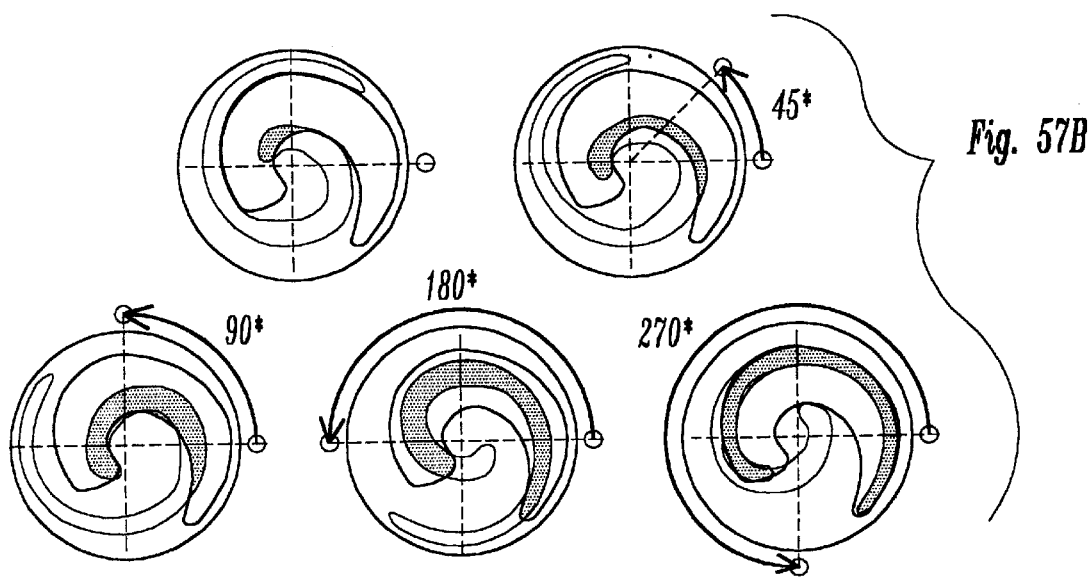
Figure 58A:
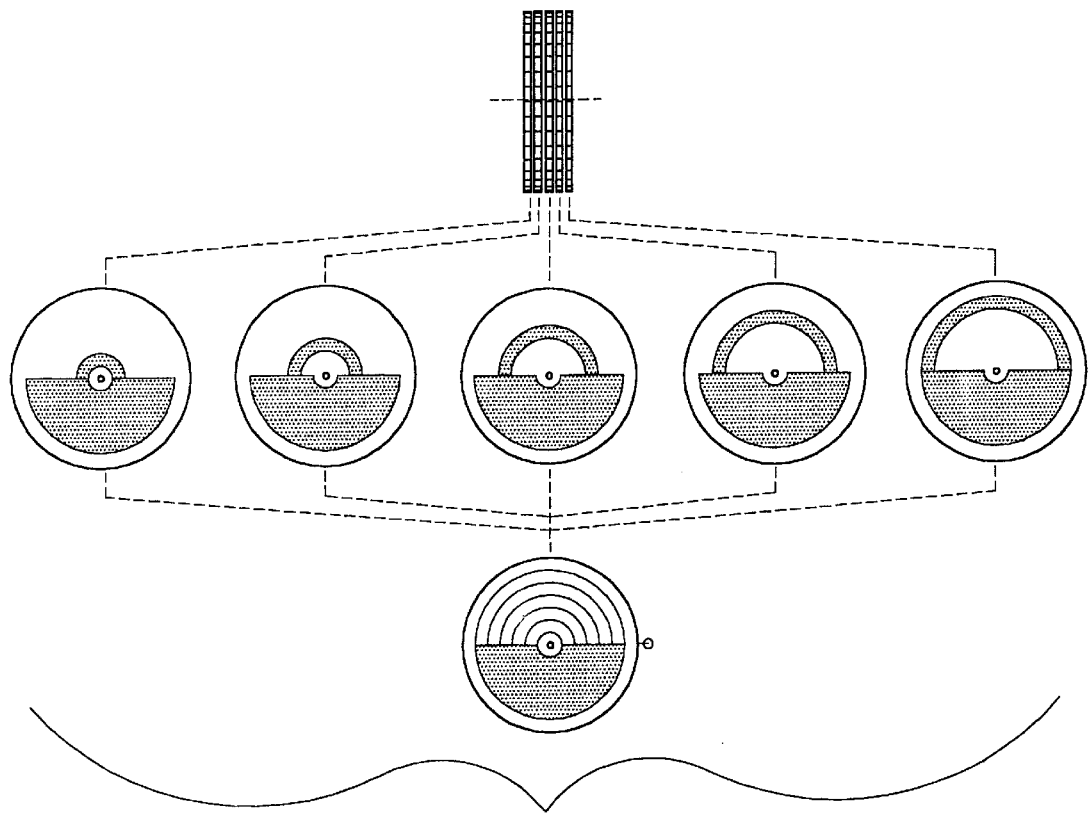
FIGS. 58A and 58B illustrate a stacked disc ratio adjustment device.
Figure 58B:
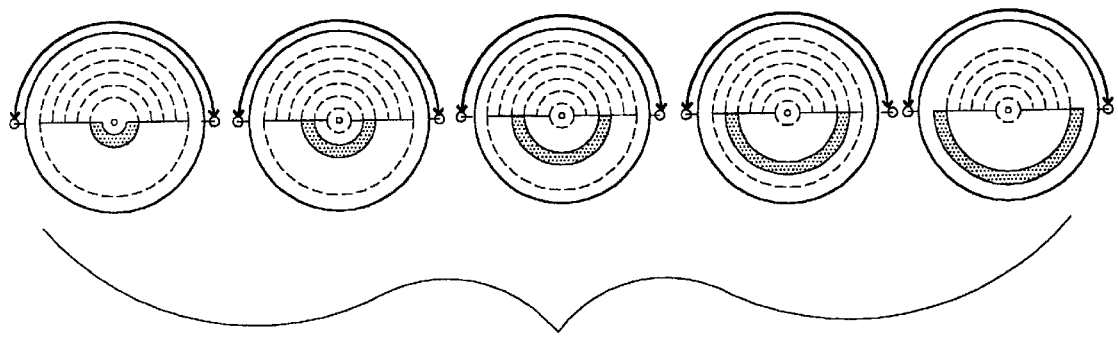
Figure 61:
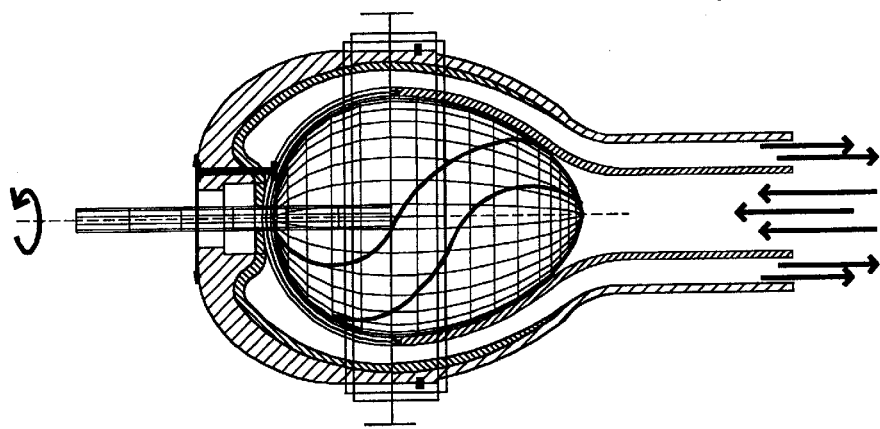
Figure 62:
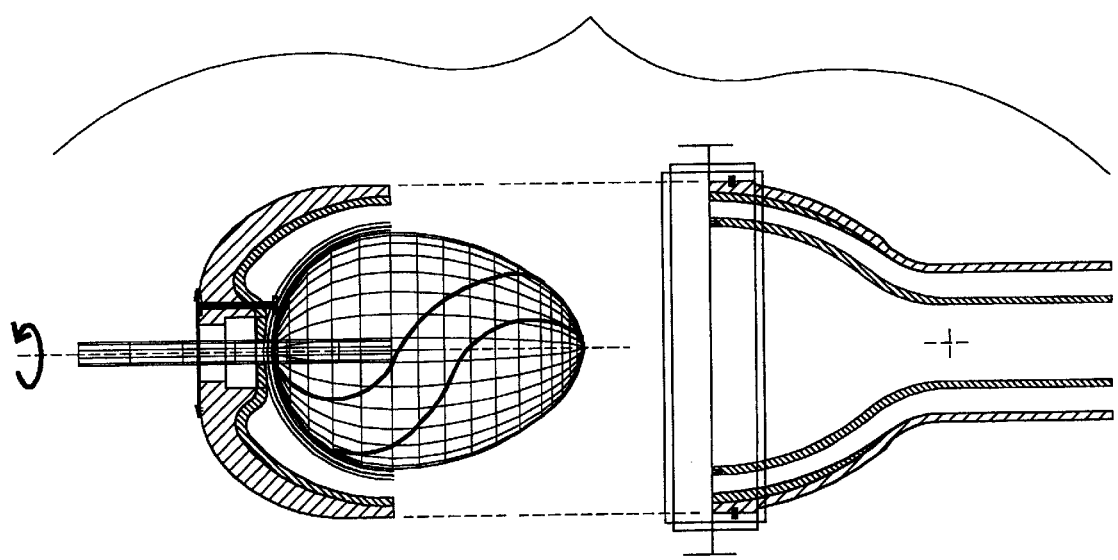

FIG. 52 supplies examples of turbine cross-sections. FIG. 53 portrays various leading edge vane contours, while FIG. 54 portrays trailing edge vane contours. FIGS. 55 and 56 furnish views of various turbine vane shape cross-sections, while FIG. 57 furnishes views of a variety of turbine vane arrays. FIGS. 57A and 57B illustrates of one embodiment of the ratio adjustment device. FIGS. 58A and 58B illustrate a stacked disc ratio adjustment device. FIGS. 59 and 60 illustrate a spiral section ratio adjustment device.

Figure 65:
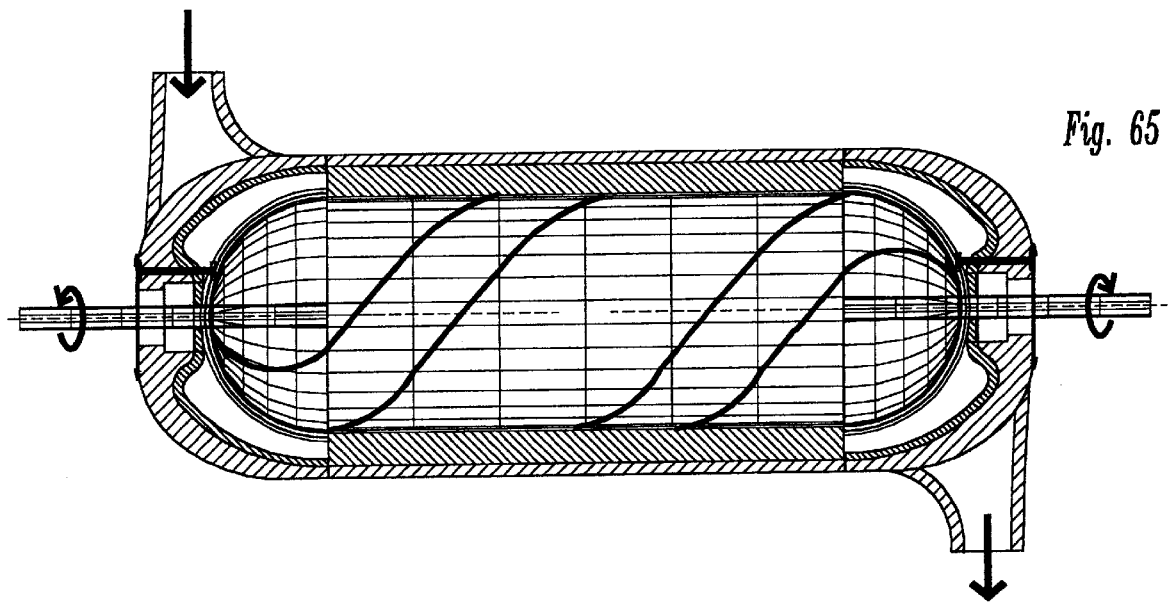
FIGS. 65 and 66 show the details of a drive tube assembly.
Figure 66:
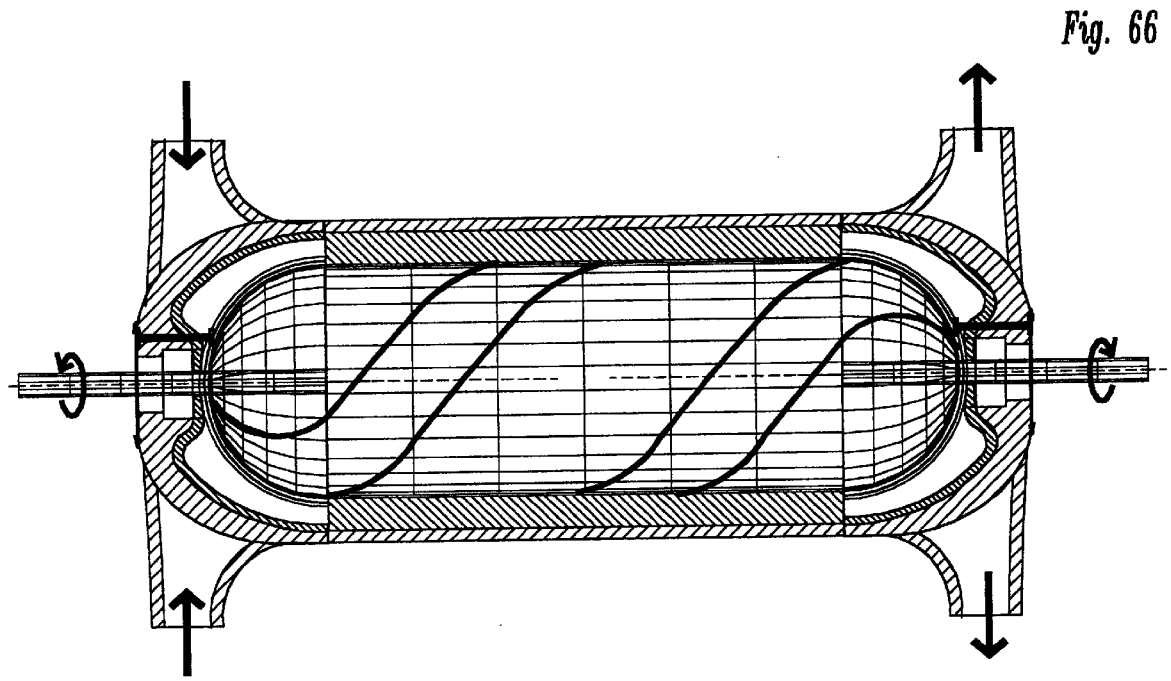
Figure 67:
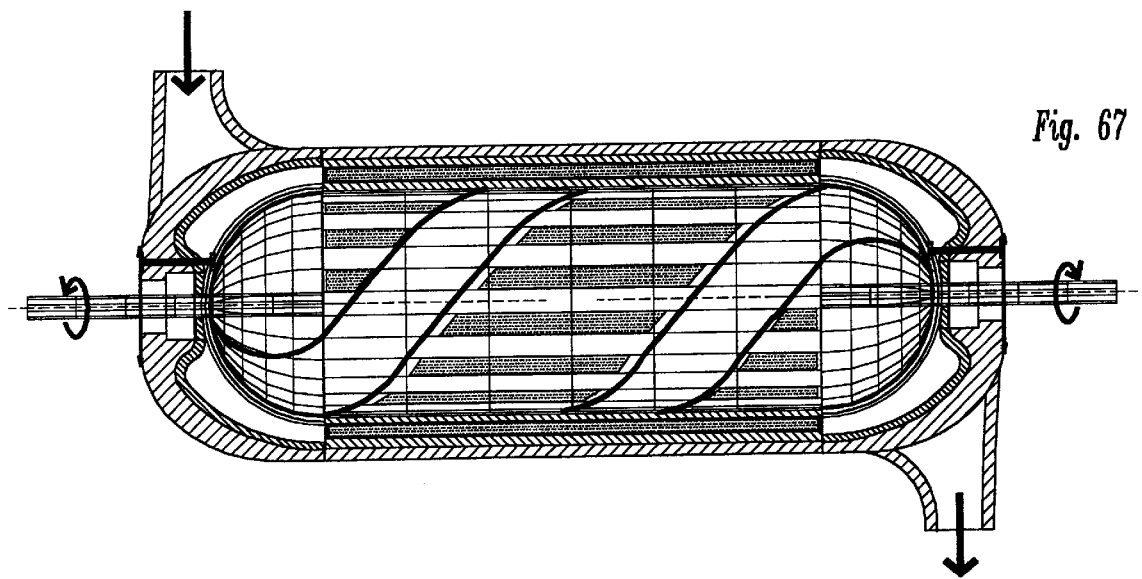
FIGS. 67 and 68 show the details of a drive motor assembly.
Figure 68:
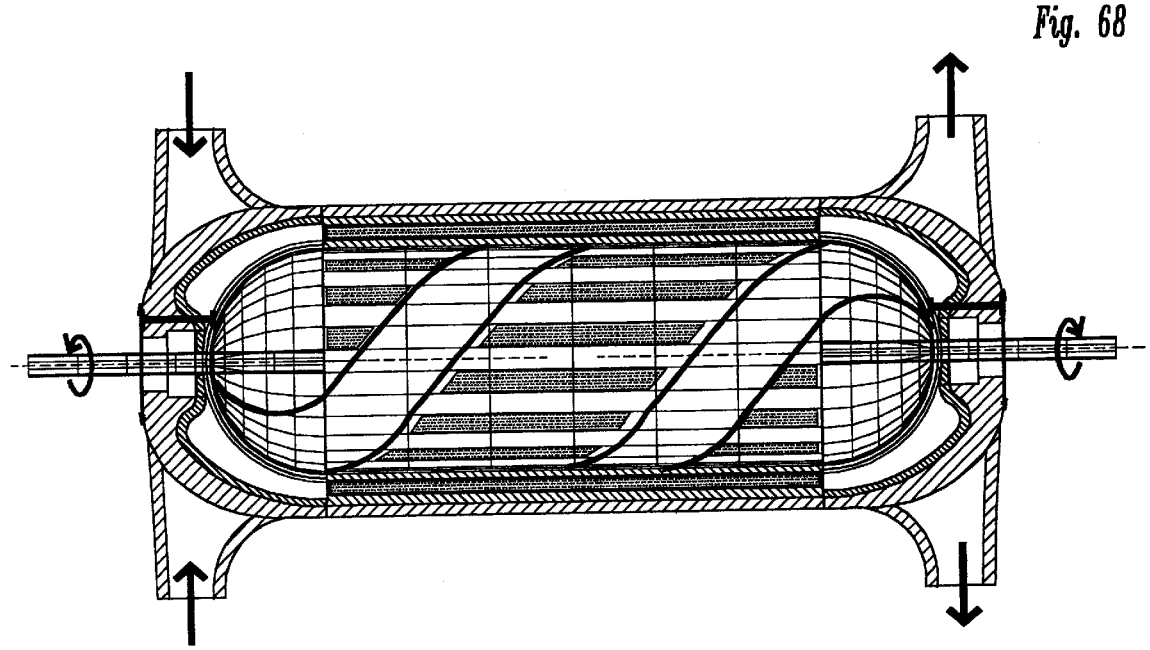
Figure 69A:
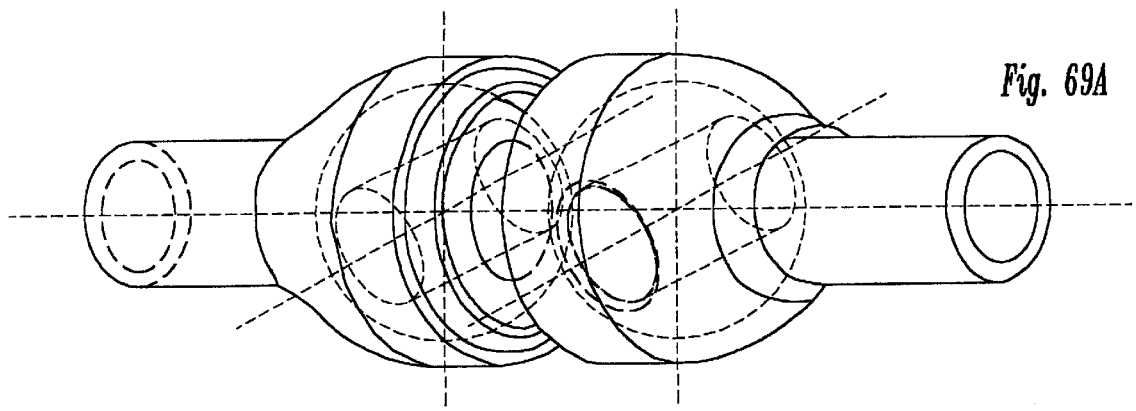
FIGS. 69A, 69B, 69C, 70, 71, 72, 73, 74, 75, 76, 77, 78 and 79 show various features of quick connect assemblies.
Figure 69B:
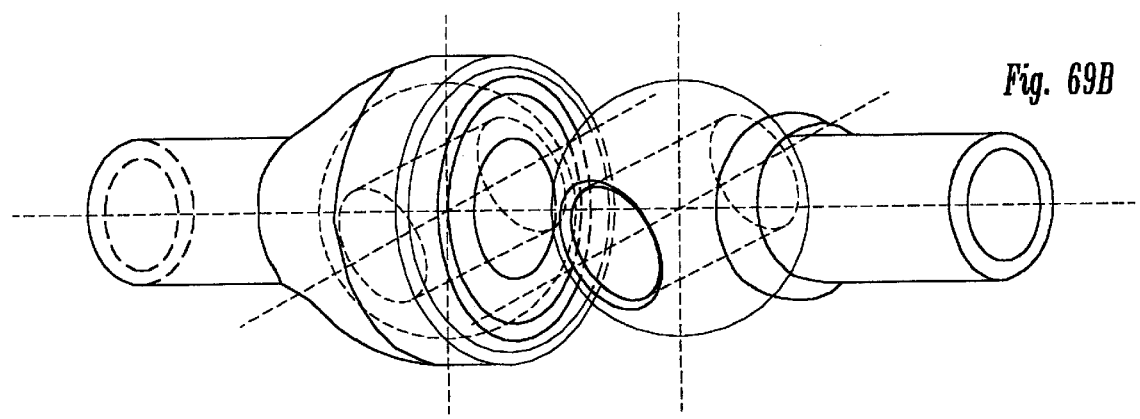
Figure 69C:
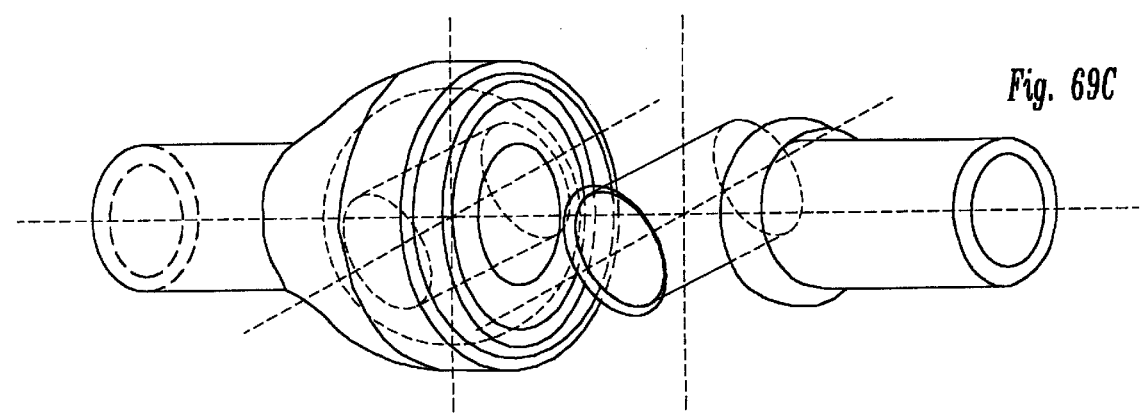
Figure 70:
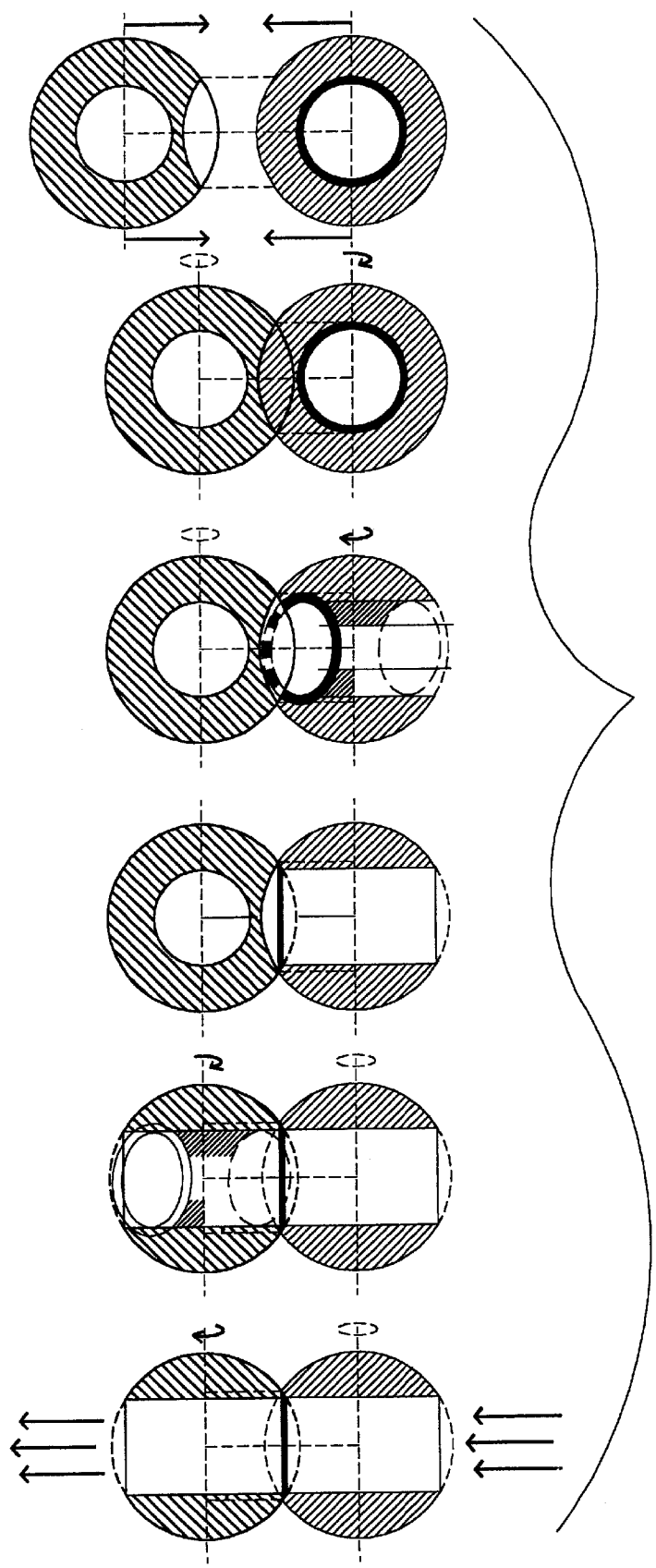
Figure 71:
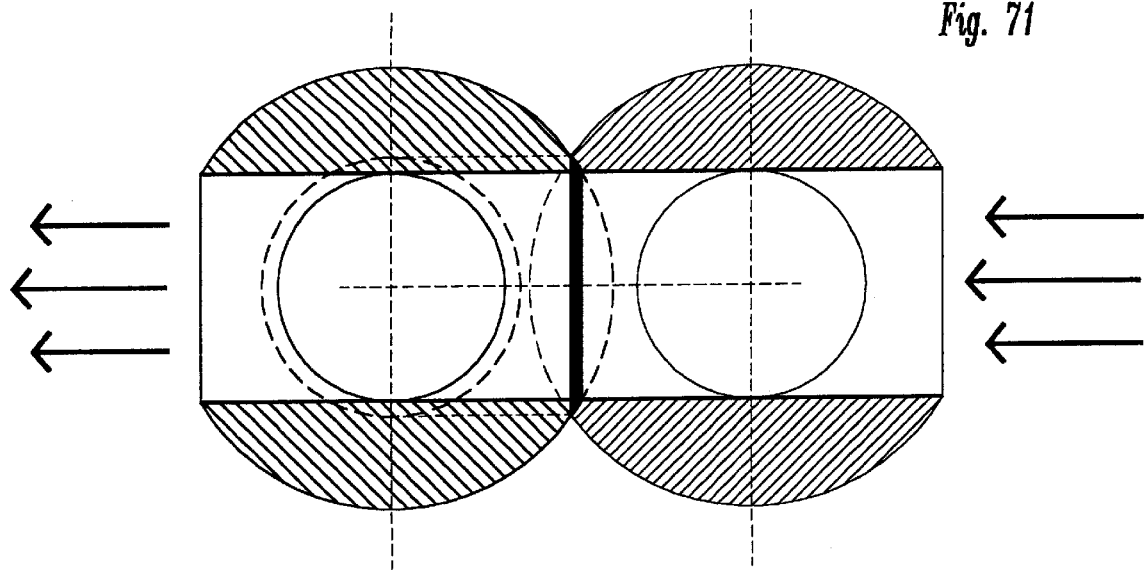
Figure 72:
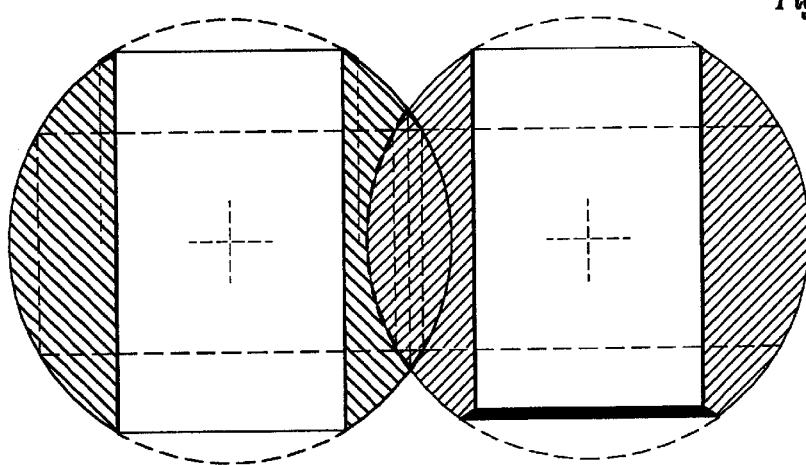
Figure 73:
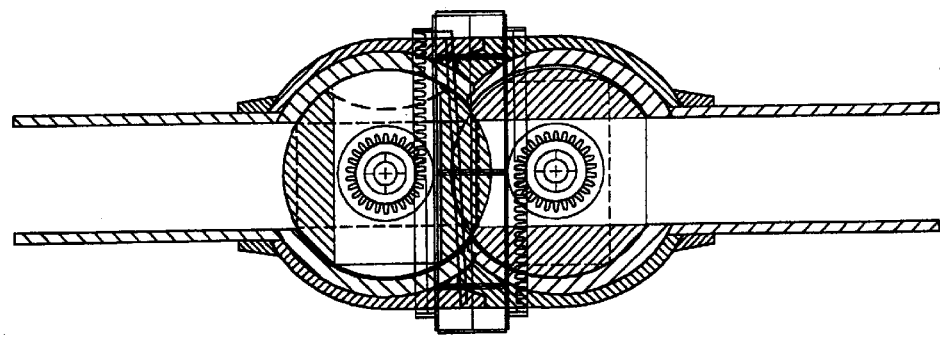
Figure 74:
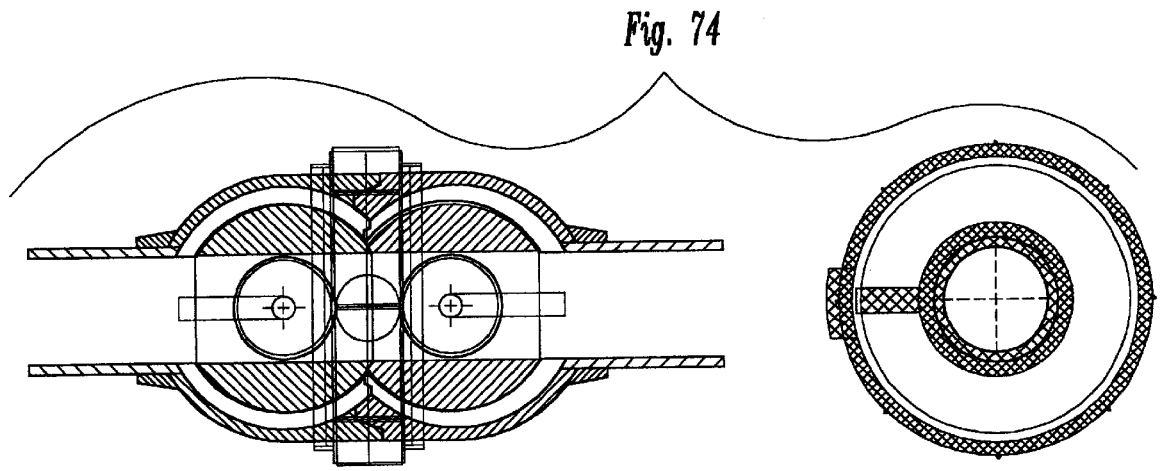
Figure 75:
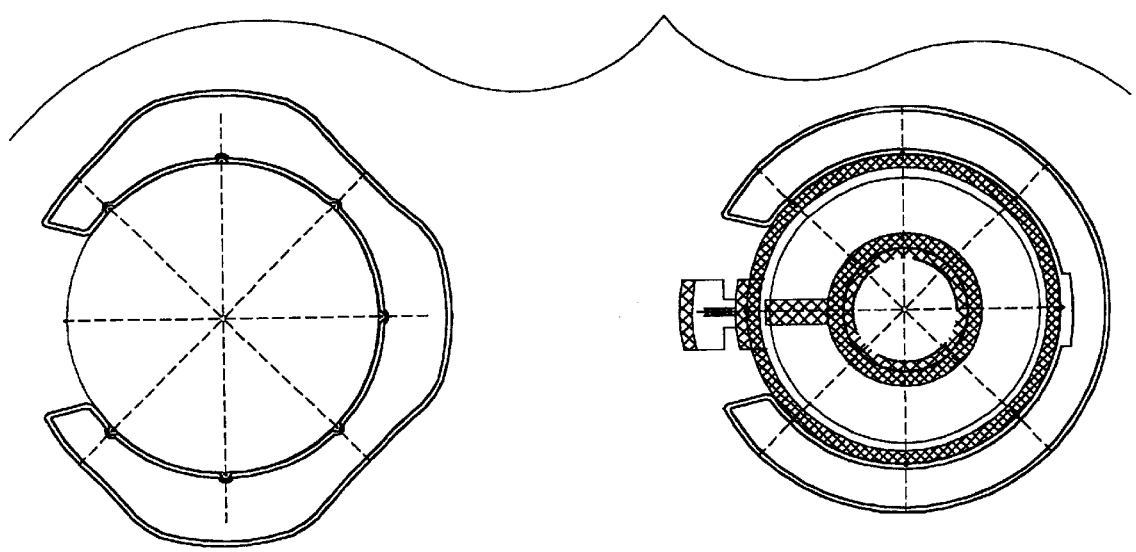
Figure 76:
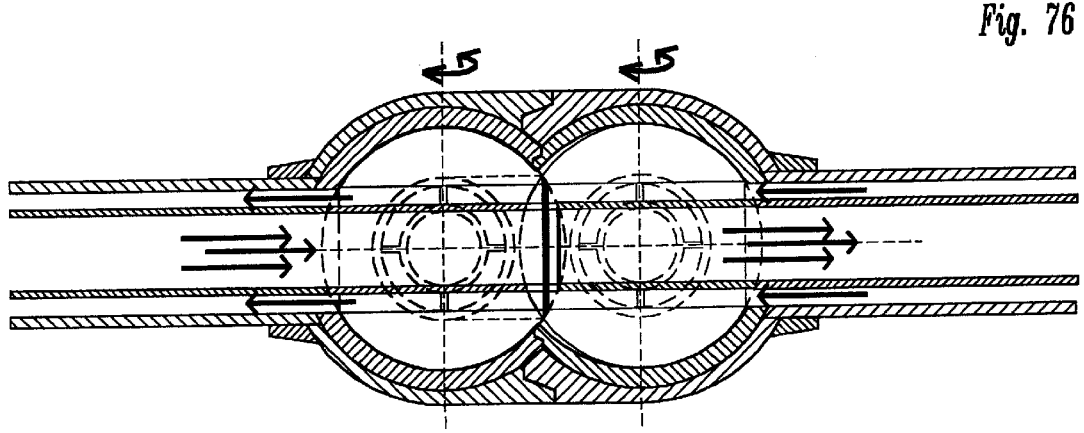
Figure 77:
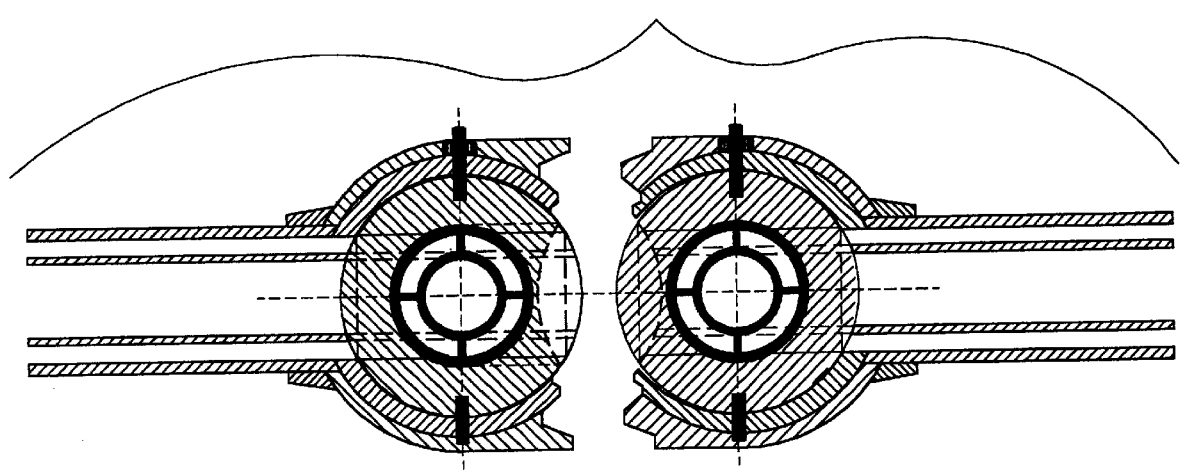
Figure 78:
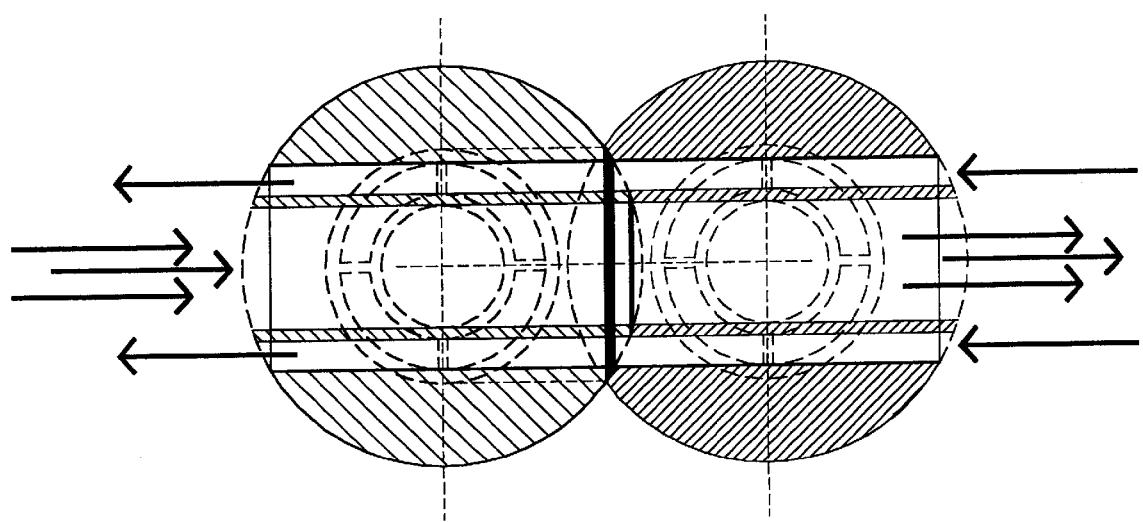
Figure 79:
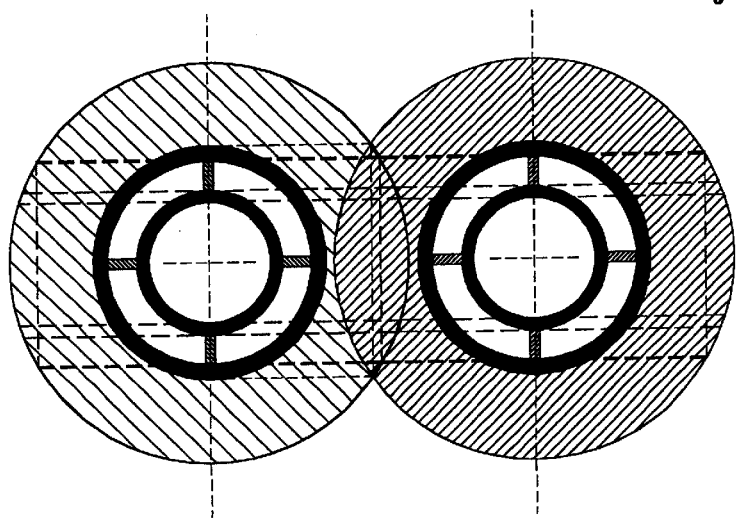
Figure 80:
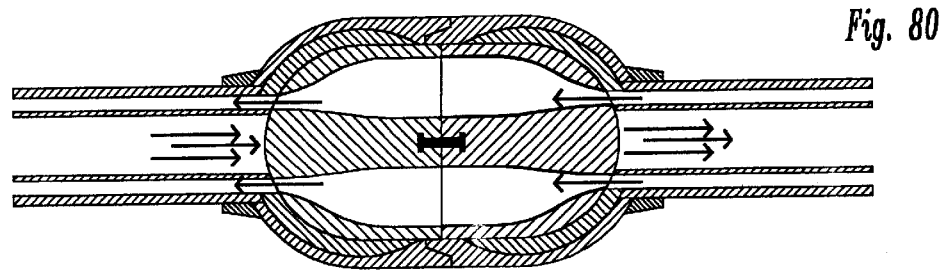
FIGS. 80, 81, 82 and 83 show details of a reversing valve assembly.
Figure 81:
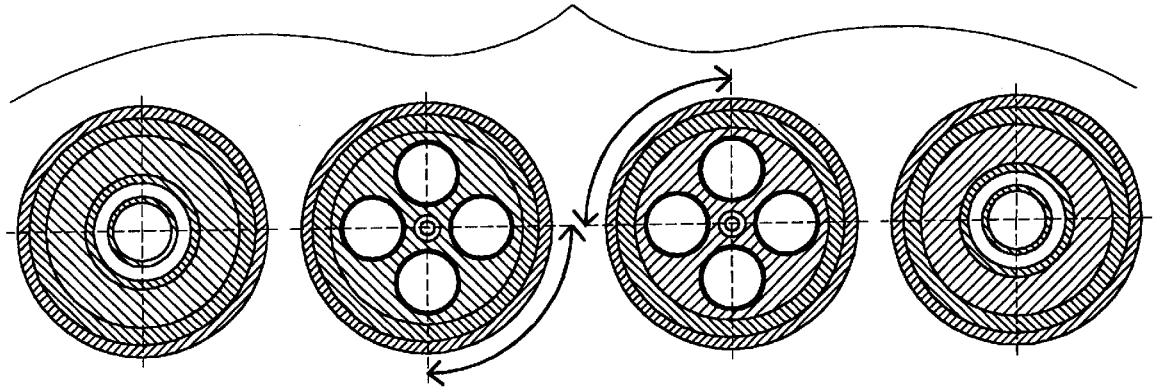
Figure 82:
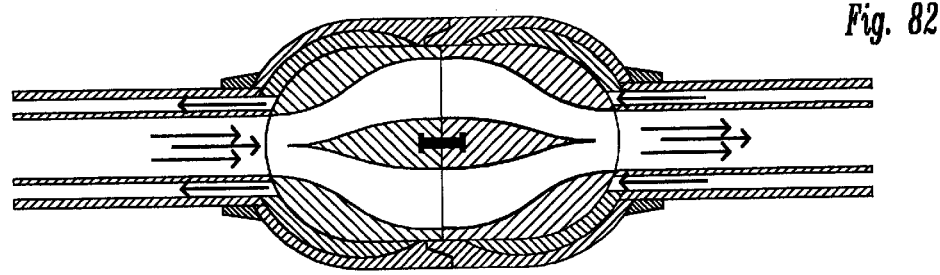
Figure 83:
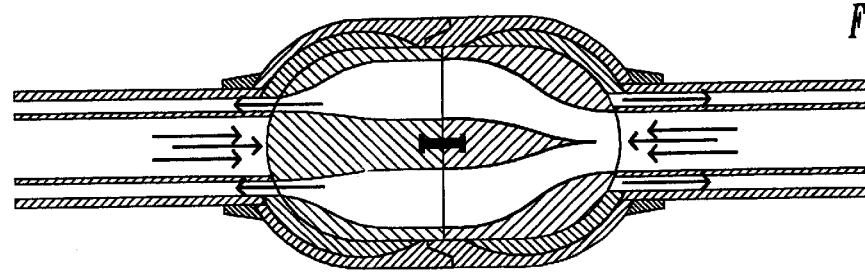

FIGS. 61, 62, 63 and 64 show the details of a drive end assembly. FIGS. 65 and 66 show the details of a drive tube assembly. FIGS. 67 and 68 show the details of a drive motor assembly. The invention may include a drive motor assembly which includes permanent magnets that are incorporated into the impeller. Together with an armature and field windings, the drive motor is capable of creating an electric motor that is integrated with a torque converting drive tube assembly. The purpose of the drive motor assembly provides an integral power drive source to propel fluid through the invention.

FIGS. 69A, 69B, 69C, 70, 71, 72, 73, 74 and 75 show various features of quick connect assemblies.

FIGS. 76, 77, 78 and 79 show details of a dual flow quick connect assembly.

FIGS. 80, 81, 82 and 83 show details of a reversing valve assembly. The invention may also include a reversing valve 84 which redirects the direction of fluid flow through the housings 20 & 22. The reversing valve enables the user to instantly reverse the flow of the fluid by rotating reversing valve outer housings one quarter of a turn in opposite directions. This rotational action realigns internal fluid passageways within the reversing valve rotating valve body which redirects the flow of fluid to the inner and outer connecting conduits respectively. The reversing valve may be used to operate reversible power tools or equipment, reverse the direction of a vehicle, reverse motion in robotics, reverse direction of exertion in exercise equipment, reverse direction of power train or conveyor systems or reverse direction of door or window operating systems.

Figure 84:
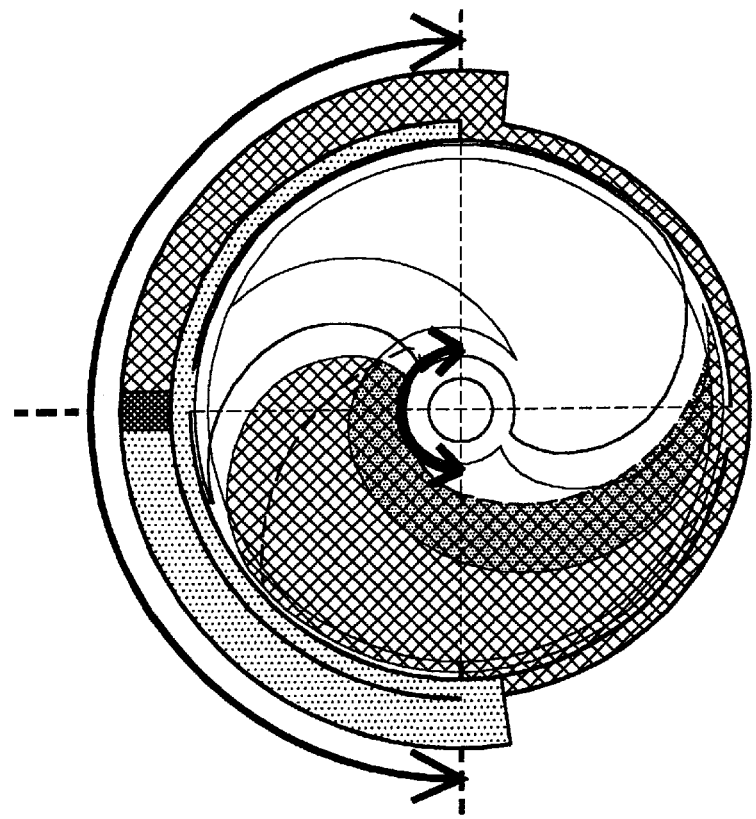
FIGS. 84 and 85 show details of a posi-trac assembly.
Figure 85:
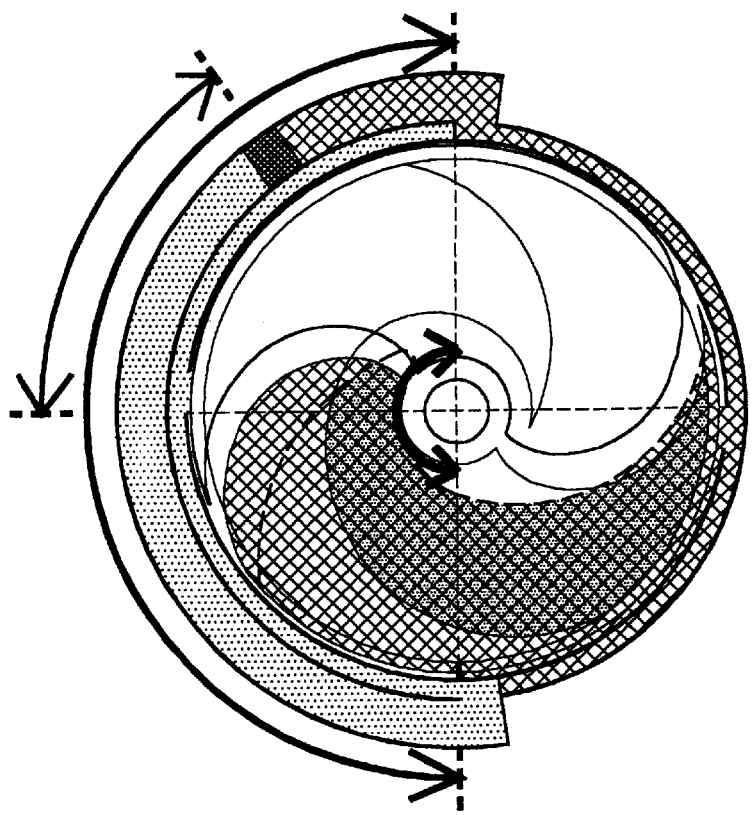
Figure 86:
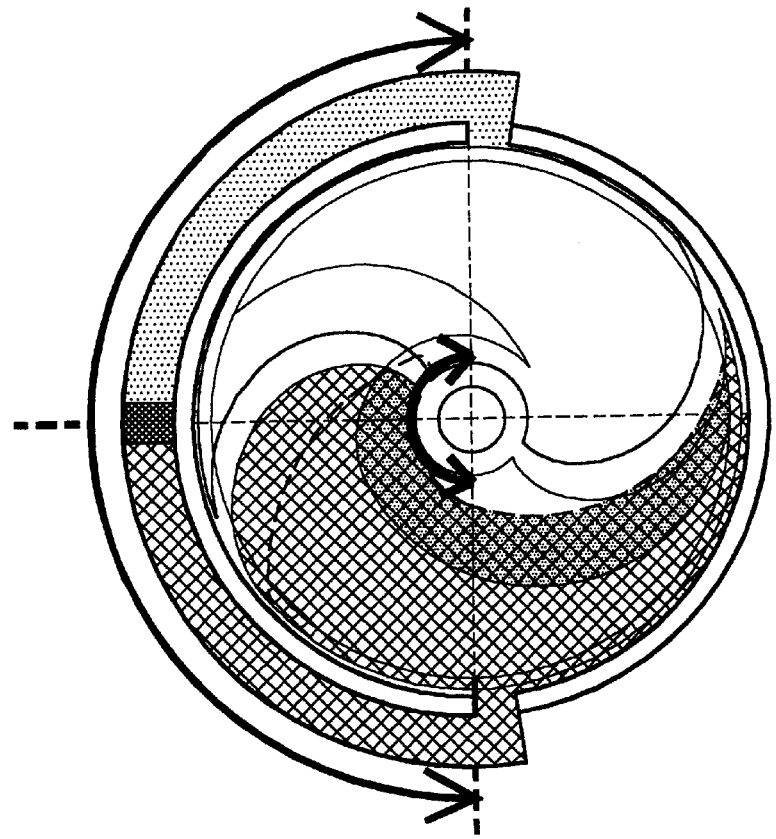
FIGS. 86 and 87 show details of a posi-torque assembly.
Figure 87:
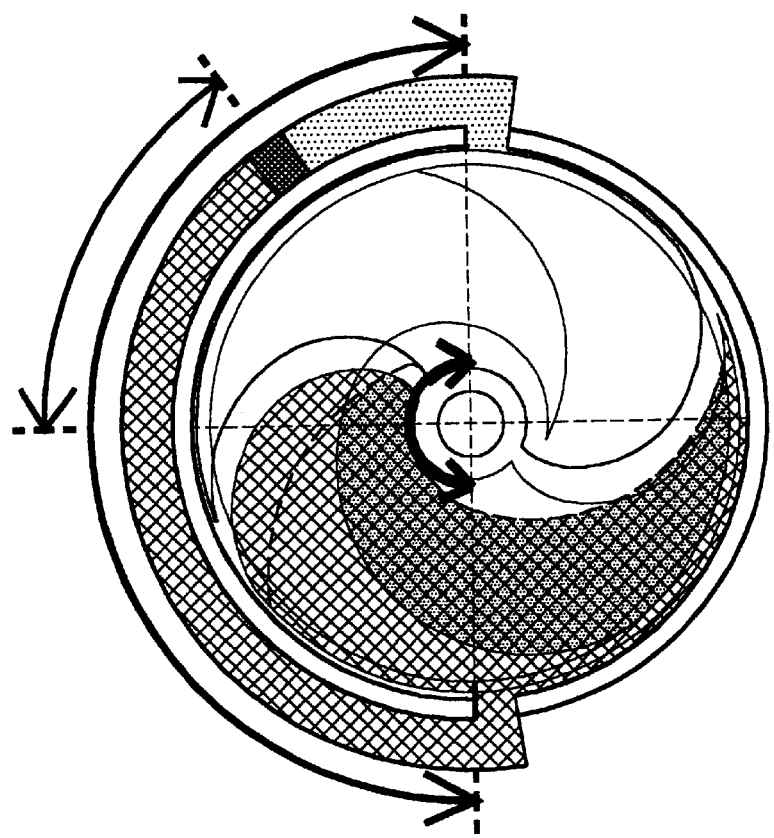

FIGS. 84 and 85 show details of a posi-trac assembly. FIGS. 86 and 87 show details of a posi-torque assembly. The invention may also include a torque adjustment device 78 which uses the pressure differential of the fluid at the two ports on a housing to automatically adjust the ratio adjustment device 42. When fluid pressure at an internal inlet falls, fluid is forced from the outlet side into internal fluid expansion chamber 80 forcing a torque adjuster 82 and the fluid within the expansion, chamber 80 to alter the position of the rotatable disc 46 of the ratio adjustment device 42. In one embodiment, the invention includes posi-trac and posi-torque devices to use the pressure differential between the input and output sides of the housings as an indicator to actuate and to automatically adjust the ratio adjustment device. This function maintains traction or increases the torque on the shafts.

Figure 88:
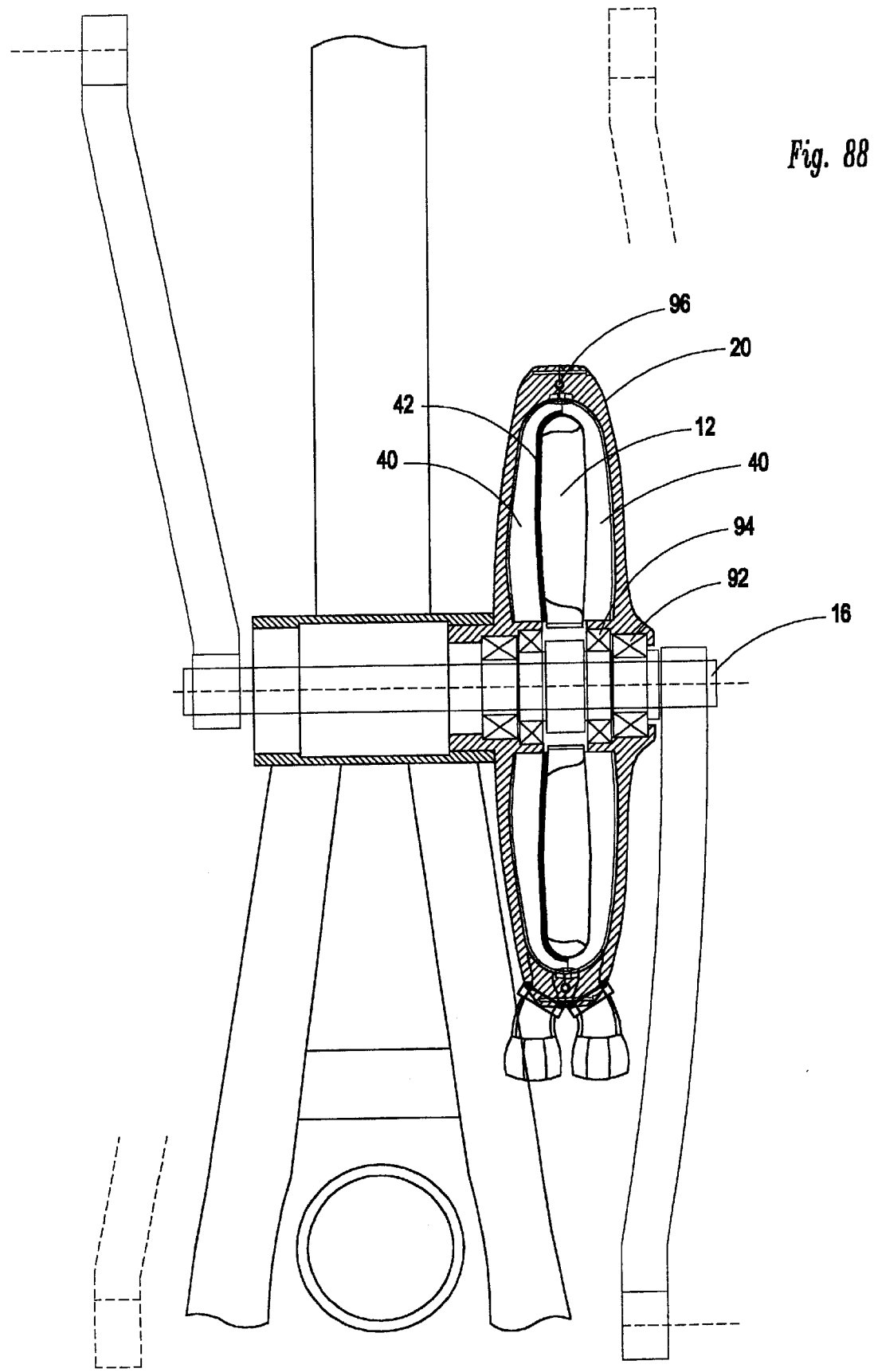
FIG. 88 illustrates a cross section of the invention showing the locations of shaft bearings, shaft seals and housing seals.
Figure 89:
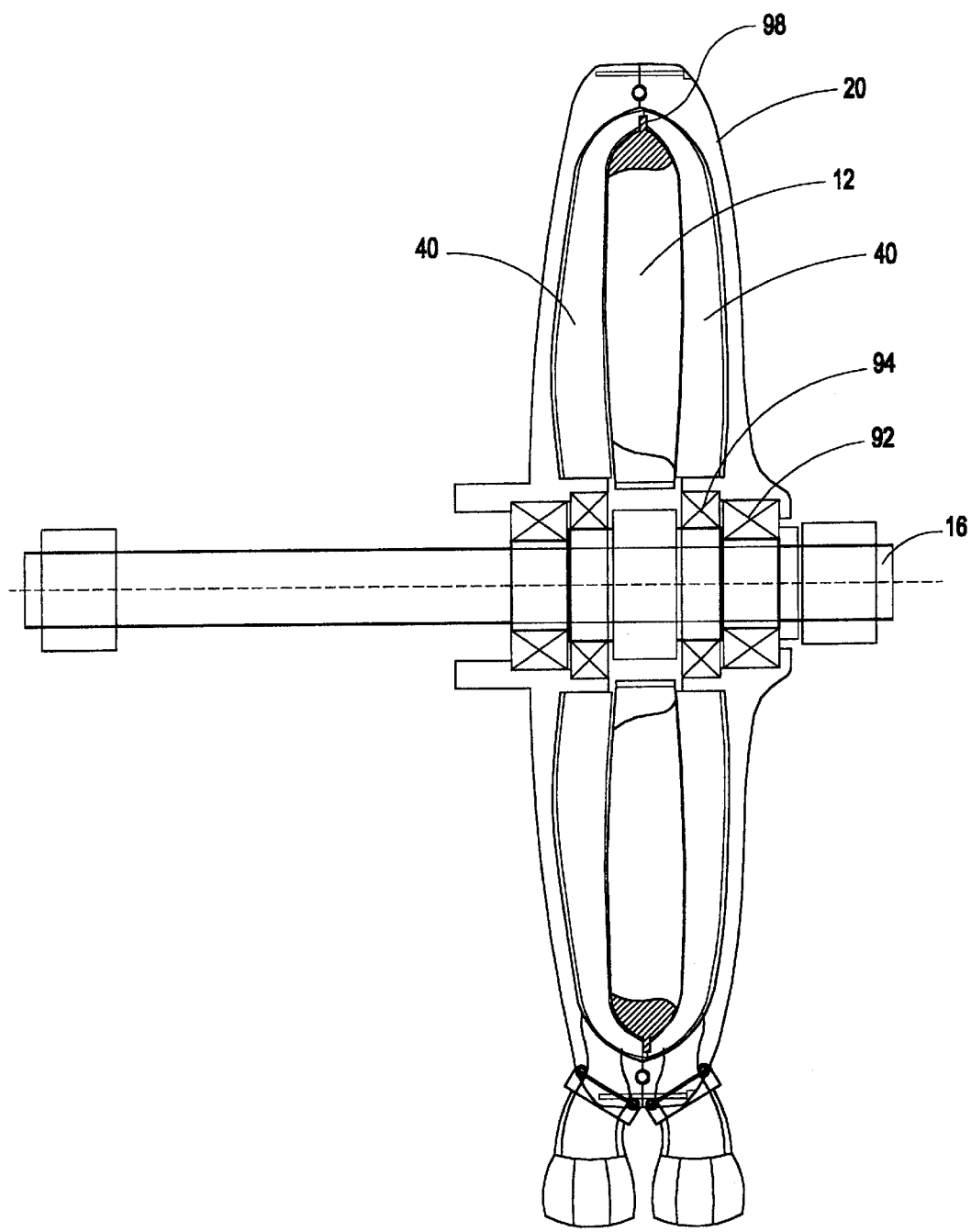
FIG. 89 illustrates a cross section of the invention showing the locations of an alignment bearing ring.

FIG. 88 illustrates a cross section of one embodiment of the invention showing the locations of shaft bearings 92, shaft seals 94 and housing seals 96. FIG. 89 illustrates a cross section of one embodiment of the invention showing the locations of an alignment bearing ring 98.

Figure 90:
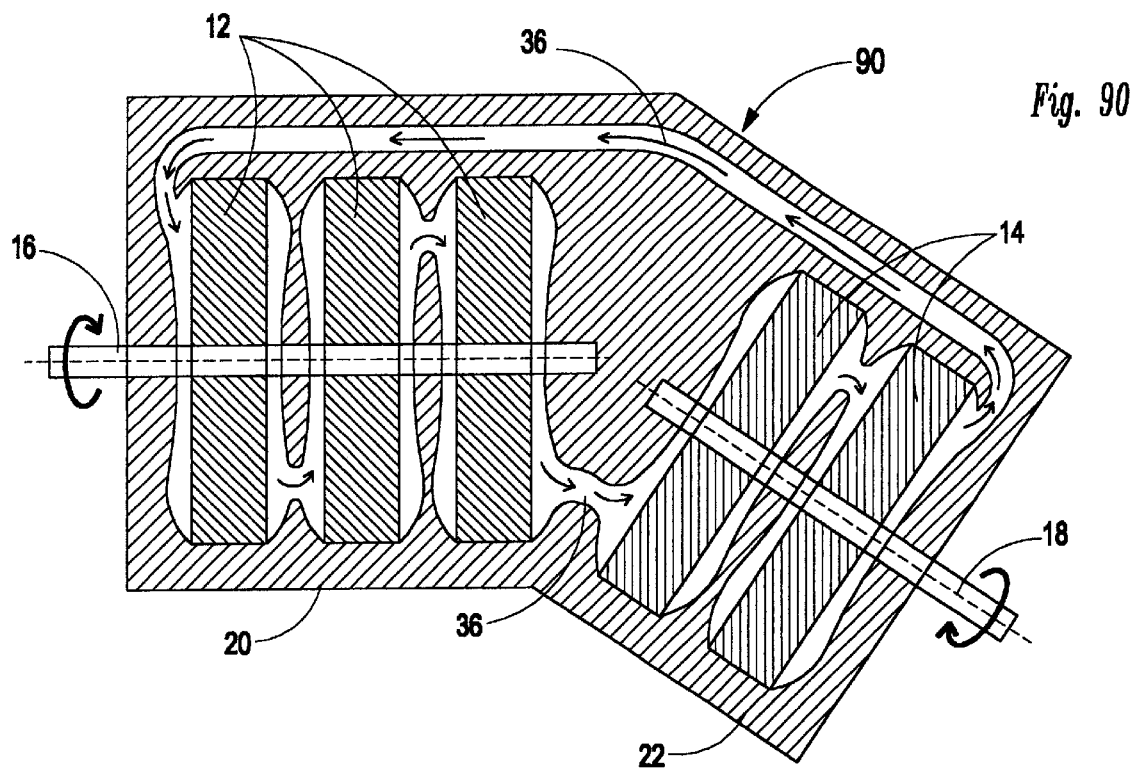
FIG. 90 illustrates a reduction or step-up conversion device with multiple turbines in a fixed housing.
Figure 91A:
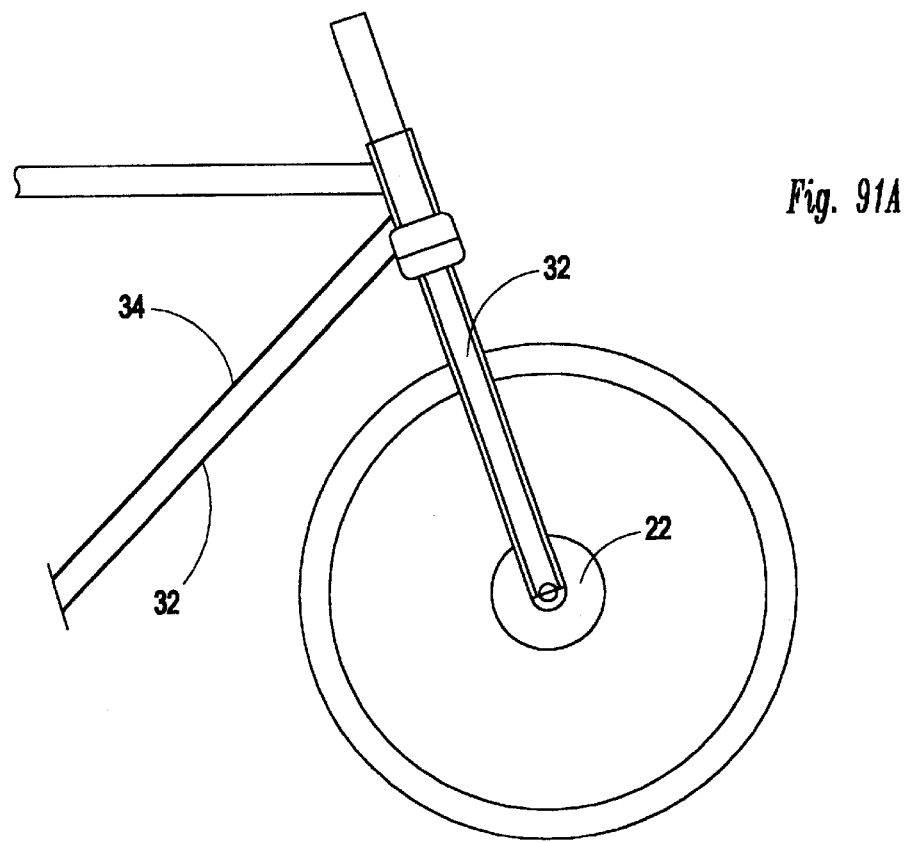
FIG. 91 shows views of a front fork assembly and swivel means integral with conduits.
Figure 91B:
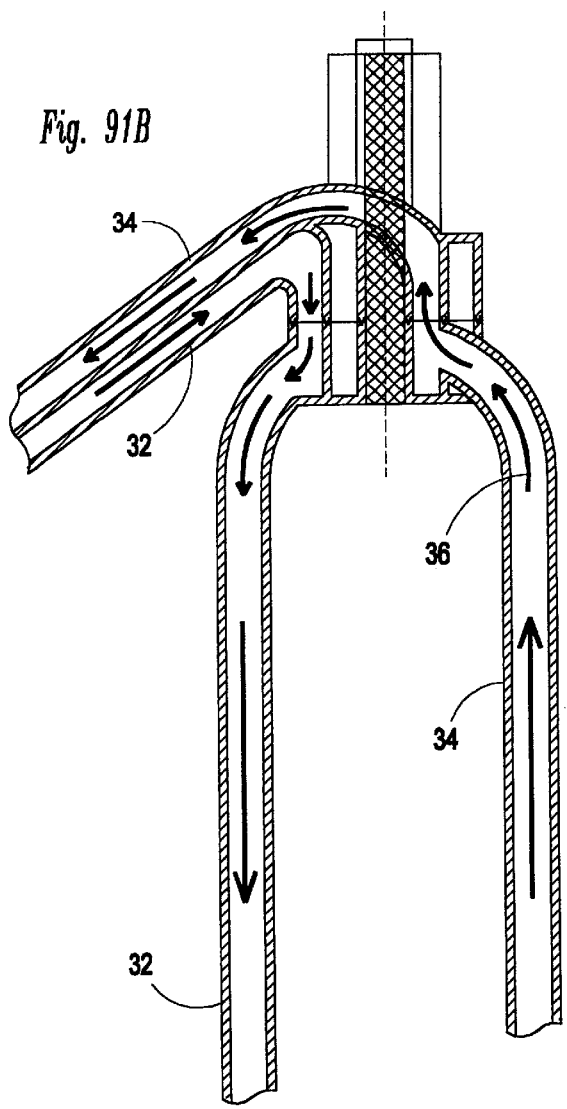
Figure 91C:
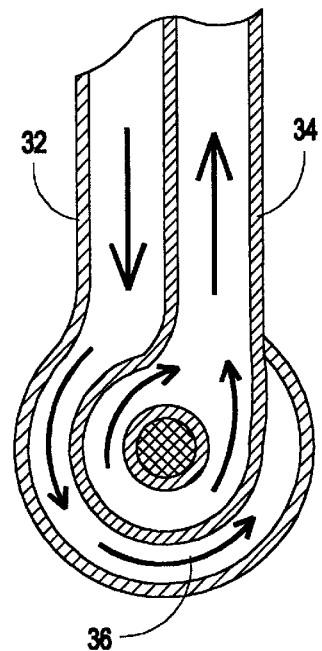
Figure 91D:
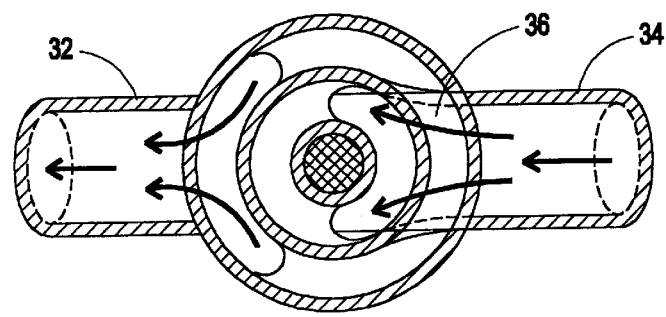
Figure 92:
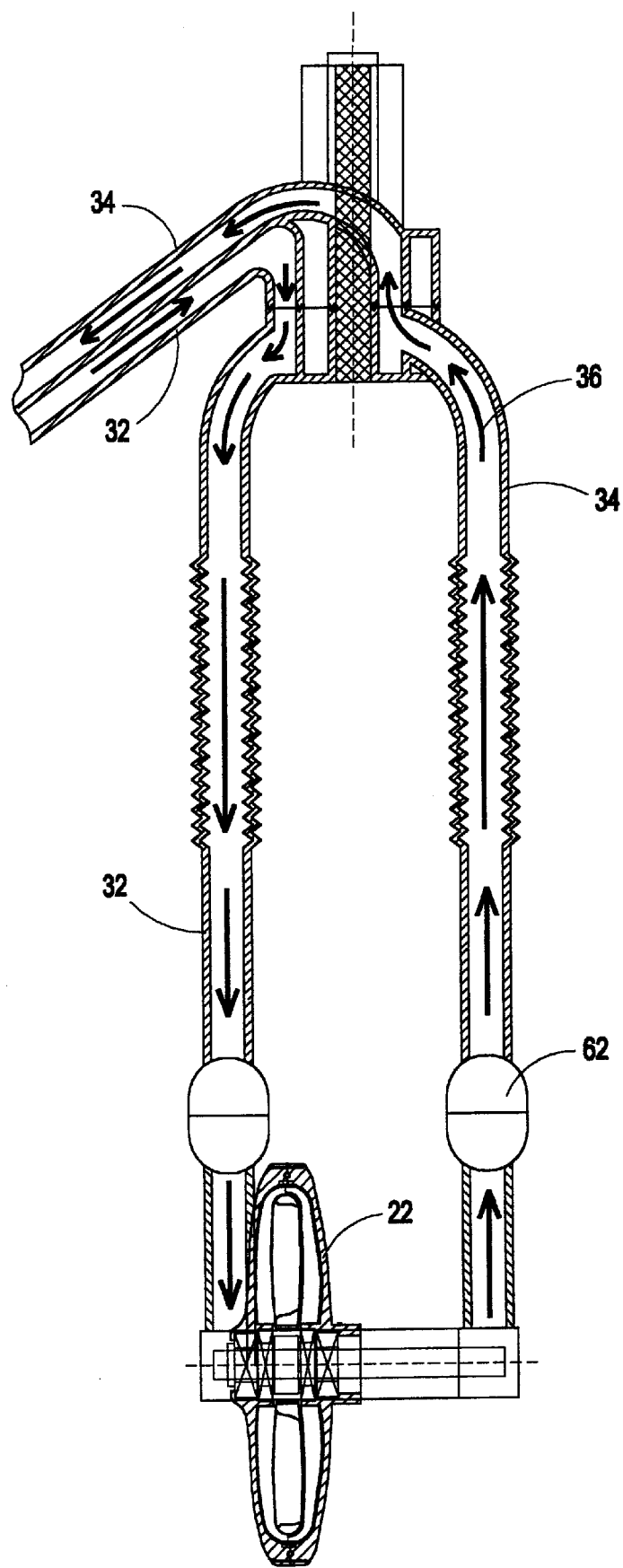
FIG. 92 shows views of a shock absorbing front fork assembly and swivel means integral with conduits.

FIG. 90 illustrates one embodiment of a reduction or step-up conversion device 90 with multiple turbines 12 and 14 in a fixed housing 20 and 22 to provide shaft speed and angle change with respect to a series of shafts 16 and 18. FIG. 91 illustrates views of a front fork assembly and swivel means integral with conduits 32 and 34 to conduct drive fluid 36 to a front steerable wheel without external fluid conduits. FIG. 92 illustrates views of a shock absorbing front fork assembly and swivel means integral with conduits 32 and 34 to conduct drive fluid 35 to a front steerable wheel.

The invention may also include an auto-shift device that utilizes the pressure differential between the input and output sides of the housings to automatically adjust the ratio adjustment device. An auto-dial pressure adjuster is moved by increasing pressure on the input or output side of a turbine housing, rotating the ratio adjustment device disc to increase or decrease the aperture. When used with a bicycle, this feature may be utilized as an automatic transmission.

III. Use of the Invention With a Bicycle

The invention may be utilized with a conventional street or mountain bicycle. The invention may power either the front wheel, the back wheel or both wheels. The use of the present invention eliminates the need for a chain, which is replaced by the fluid traveling through the conduits. The conduits may be mounted within the bicycle frame itself. There is no need to align the crank with the axles. The crank assembly acts upon the fluid in a continuous fashion, forcing the fluid through the conduits so that the fluid turns the reactor turbine, its shaft and the wheel mounted on the attached shaft.

In an alternative embodiment of the invention, one or more impeller turbine and one or more reactor turbines may be linked together in a common system. An example of this might be a two wheel drive bicycle which uses one common crank and two (one front and one rear) reactor turbines connected together in a closed system. The torque ratio of the crank can be changed to independently affect the output at both reactor turbines simultaneously. The ratios of the reactor turbines (front and rear) can be changed independently, which may control the application of torque to the roadway.

IV. Other Applications of the Invention

The invention may also be employed in an assembly line or conveyor system where a number of different operations are linked together by a common impeller turbine and the rotational speed of the various drive assemblies can be varied or adjusted independently in a step-less fashion, allowing individual adjustment at various locations independent of each other.

The invention provides several advantages over transmissions that use conventional transmission means that include chains which come off, get caught, break, get loose, jam, wear out, accumulate dirt, require lubrication or become misaligned. The present invention does not require exposed gears or chains that could cause physical harm or injury.

In another embodiment of the invention, a Radial Torque Drive System may be employed to reduce, step-up or change the angle of rotation with respect to a series, or rotating shafts. This feature provides an efficient, durable, easily manufactured, easily retrofitted rotational energy conversion device.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the Claims that follow. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Radial torque drive system
11 Generalized embodiment of the invention
12 Impeller turbine
14 Reactor turbine
16 Impeller turbine shaft
18 Reactor turbine shaft
20 Impeller turbine housing
22 Reactor turbine housing
24 Impeller housing outlet port
26 Reactor housing inlet port
28 Reactor housing outlet port
30 Impeller housing inlet port
32 Driver conduit
34 Return conduit
36 Fluid
38 Vanes
40 Volute
41 Volute opening
42 Ratio adjustment device
44 Fixed disc
46 Rotating disc
48 Aperture
50 Pressure adjustment device
52 Housing
53 Pumping mechanism
54 Gauge
56 Release valve
58 Bladder membrane
60 Vent
62 Quick disconnect assembly
64 Ball valves
66 Housing
68 Mating surface dimple
70 Mating surface ring
72 Examples of impeller configurations
74 Auto-dial device
76 Pressure adjuster
78 Torque adjustment device
80 Expansion chamber
82 torque adjuster
84 Reversing valve
86 Dual flow conduit
88 Dual flow quick connect assembly
90 Reduction or step-up conversion device
92 Shaft bearing
94 Shaft seal
96 Housing seal
98 Alignment bearing ring
B Bicycle

What is claimed is:

1. An apparatus comprising:
   a first turbine means (12) for converting an external torque to a pressure imposed on a fluid (36); said first turbine means (12) including a shaft means (16) for transferring said external torque and a first housing means (20) for enclosing said fluid (36); said first housing means (20) including an outlet port (24) and an inlet port (30) arranged to optimize the transfer of said external torque to said fluid (36);
   a second turbine means (14) for converting a pressure imposed on said fluid (36) to rotational energy; said second turbine means (14) including a second shaft means (18) for transferring said rotational energy and a second housing means (22) for enclosing said fluid (36); said second housing means (22) including an inlet port (26) and an outlet port (28) arranged to optimize the transfer of the pressure of said fluid (36) to said rotational energy;
   said fluid (36) being applied to a side surface of both of said first and second turbine means; and
   a first and a second conduit means (32 & 34) for conveying said fluid (36) between said first and second housing means (20 & 22);
   wherein said second conduit means (34) connects said outlet port (28) of said second housing (22) to said inlet port (30) of said first housing (20).

2. An apparatus as claimed in claim 1, in which said first and second turbine means (12 & 14) are generally disc-shaped.

3. An apparatus as claimed in claim 1, in which said first and second turbine means (12 & 14) are formed with generally spiral-shaped vanes (38).

4. An apparatus as claimed in claim 1, in which said first conduit means (32) connects outlet port (24) of first housing means (20) to inlet port (26) of said second housing means (22).

5. An apparatus as claimed in claim 1, further comprising a volute means (40) for directing the flow of the fluid (36) within said first and second housing means (20, 22) to optimize the transfer of power to and from said first and second turbine means (12, 14).

6. An apparatus as claimed in claim 5, in which said volute means (40) is an integral part of one of said housing means (20, 22).

7. An apparatus as claimed in claim 5, in which said volute means (40) is generally disc-shaped.

8. An apparatus as claimed in claim 5, in which said volute means (40) includes an opening (41) formed on its side.

9. An apparatus as claimed in claim 1, in which said fluid (36) is a lubricant which withstands high temperatures and which has a very low freezing temperature.

10. An apparatus as claimed in claim 1, in which said turbine means is used in combination with a bicycle.

11. An apparatus as claimed in claim 1, in which said turbine means is used in combination with a motorcycle.

12. An apparatus as claimed in claim 1, in which said turbine means is used in combination with an automobile.

13. An apparatus as claimed in claim 1, in which said first and second turbine means are used for step-up conversion of the speed of said first shaft means to said second shaft means.

14. An apparatus as claimed in claim 1, in which said turbine means is used in combination with a shaft bearing (92) to mobilize a shaft within a housing.

15. An apparatus as claimed in claim 1, in which said turbine means is used in combination with a shaft seal (94) to prevent said fluid from leaking.

16. An apparatus as claimed in claim 1, in which said turbine means is used in combination with a housing seal (96) to prevent said fluid from leaking.

17. An apparatus as claimed in claim 1, in which said fluid is generally elastic.

18. An apparatus as claimed in claim 1, in which said housing means (20) is integral with a bicycle frame.

19. An apparatus as claimed in claim 1, in which said conduit means (32, 24) is integral with a bicycle frame.

20. An apparatus comprising:
   a first turbine means (12) for converting an external torque to a pressure imposed on a generally incompressible fluid (36); said first turbine means (12) including a shaft means (16) for transferring said external torque and a first housing means (20) for enclosing said fluid (36); said first housing means (20) including an outlet port (24) and an inlet port (30) arranged to optimize the transfer of said external torque to said fluid (36);
   a second turbine means (14) for converting a pressure imposed on said fluid (36) to rotational energy; said second turbine means (14) including a second shaft means (18) for transferring said rotational energy and a second housing means (22) for enclosing said fluid (36); said second housing means (22) including an inlet port (26) and an outlet port (28) arranged to optimize the transfer of the pressure of said fluid (36) to said rotational energy;
   said fluid (36) being applied to a side surface of both of said first and second turbine means; and
   a first and a second conduit means (32 & 34) for conveying said fluid (36) between said first and second housing means (20 & 22).

21. An apparatus as claimed in claim 20, in which said first and second turbine means (12 & 14) are generally disc-shaped.

22. An apparatus as claimed in claim 20, in which said first and second turbine means (12 & 14) are formed with generally spiral-shaped vanes (38).

23. An apparatus as claimed in claim 20, in which said first conduit means (32) connects outlet port (24) of first housing means (20) to inlet port (26) of said second housing means (22).

24. An apparatus as claimed in claim 20, wherein said second conduit means (34) connects said outlet port (28) of said second housing (22) to said inlet port (30) of said first housing (20).

25. An apparatus as claimed in claim 20, further comprising a volute means (40) for directing the flow of the fluid (36) within said first and second housing means (20, 22) to optimize the transfer of power to and from said first and second turbine means (12, 14).

26. An apparatus as claimed in claim 25, in which said volute means (40) is an integral part of one of said housing means (20, 22).

27. An apparatus as claimed in claim 25, in which said volute means (40) is generally disc-shaped.

28. An apparatus as claimed in claim 25, in which said volute means (40) includes an opening (41) formed on its side.

29. An apparatus as claimed in claim 25, in which said fluid (36) is a lubricant which withstands high temperatures and which has a very low freezing temperature.

30. An apparatus as claimed in claim 20, in which said turbine means is used in combination with a bicycle.

31. An apparatus as claimed in claim 20, in which said turbine means is used in combination with a motorcycle.

32. An apparatus as claimed in claim 20, in which said turbine means is used in combination with an automobile.

33. An apparatus as claimed in claim 20, in which said first and second turbine means are used for step-up conversion of the speed of said first shaft means to said second shaft means.

34. An apparatus as claimed in claim 20, in which said turbine means is used in combination with a shaft bearing (92) to mobilize a shaft within a housing.

35. An apparatus as claimed in claim 20, in which said turbine means is used in combination with a shaft seal (94) to prevent said fluid from leaking.

36. An apparatus as claimed in claim 20, in which said turbine means is used in combination with a housing seal (96) to prevent said fluid from leaking.

37. An apparatus as claimed in claim 20, in which said fluid is generally elastic.

38. An apparatus as claimed in claim 20, in which said housing means (20) is integral with a bicycle frame.

39. An apparatus as claimed in claim 20, in which said conduit means (32, 24) is integral with a bicycle frame.

40. An apparatus comprising:
   a first turbine means (12) for converting an external torque to a pressure imposed on a fluid (36); said first turbine means (12) including a shaft means (16) for transferring said external torque and a first housing means (20) for enclosing said fluid (36); said first housing means (20) including an outlet port (24) and an inlet port (30) arranged to optimize the transfer of said external torque to said fluid (36);
   a second turbine means (14) for converting a pressure imposed on said fluid (36) to rotational energy; said second turbine means (14) including a second shaft means (18) for transferring said rotational energy and a second housing means (22) for enclosing said fluid (36); said second housing means (22) including an inlet port (26) and an outlet port (28) arranged to optimize the transfer of the pressure of said fluid (36) to said rotational energy;
   said fluid (36) being applied to a side surface of both of said first and second turbine means; and
   a first and a second conduit means (32 & 34) for conveying said fluid (36) between said first and second housing means (20 & 22); and
   a volute means (40) for directing the flow of the fluid (36) within said first and second housing means (20, 22) to optimize the transfer of power to and from said first and second turbine means (12, 14), wherein said volute means (40) includes an opening (41) formed on its side.

41. An apparatus as claimed in claim 40, in which said first and second turbine means (12 & 14) are generally disc-shaped.

42. An apparatus as claimed in claim 40, in which said first and second turbine means (12 & 14) are formed with generally spiral-shaped vanes (38).

43. An apparatus as claimed in claim 40, in which said first conduit means (32) connects outlet port (24) of first housing means (20) to inlet port (26) of said second housing means (22).

44. An apparatus as claimed in claim 40, in which said volute means (40) is an integral part of one of said housing means (20, 22).

45. An apparatus as claimed in claim 40, in which said volute means (40) is generally disc-shaped.

46. An apparatus as claimed in claim 40, in which said fluid (36) is a lubricant which withstands high temperatures and which has a very low freezing temperature.

47. An apparatus as claimed in claim 40, in which said turbine means is used in combination with a bicycle.

48. An apparatus as claimed in claims 40, in which said turbine means is used in combination with a motorcycle.

49. An apparatus as claimed in claim 40, in which said turbine means is used in combination with an automobile.

50. An apparatus as claimed in claim 40, in which said first and second turbine means are used for step-up conversion of the speed of said first shaft means to said second shaft means.

51. An apparatus as claimed in claim 40, which said turbine means is used in combination with a shaft bearing (92) to mobilize a shaft within a housing.

52. An apparatus as claimed in claim 40, in which said turbine means is used in combination with a shaft seal (94) to prevent said fluid from leaking.

53. An apparatus as claimed in claim 40, in which said turbine means is used in combination with a housing seal (96) to prevent said fluid from leaking.

54. An apparatus as claimed in claim 40, in which said fluid is generally elastic.

55. An apparatus as claimed in claim 40, in which said housing means (20) is integral with a bicycle frame.

56. An apparatus as claimed in claim 40, in which said conduit means (32, 24) is integral with a bicycle frame.

* * * * *